(12) United States Patent
De Rossi et al.

(10) Patent No.: US 9,454,019 B2
(45) Date of Patent: Sep. 27, 2016

(54) PROGRESSIVE OPHTHALMIC LENS

(75) Inventors: Helene De Rossi, Charenton le Pont (FR); Jerome Moine, Charenton le Pont (FR); Carlos Rego, Charenton le Pont (FR); Matthieu Guillot, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 119 days.

(21) Appl. No.: 14/007,721

(22) PCT Filed: Mar. 22, 2012

(86) PCT No.: PCT/EP2012/055146
§ 371 (c)(1),
(2), (4) Date: Sep. 26, 2013

(87) PCT Pub. No.: WO2012/130736
PCT Pub. Date: Oct. 4, 2012

(65) Prior Publication Data
US 2014/0016088 A1 Jan. 16, 2014

(30) Foreign Application Priority Data

Mar. 31, 2011 (EP) .................................... 11305381

(51) Int. Cl.
*G02C 7/06* (2006.01)
*G02C 7/02* (2006.01)

(52) U.S. Cl.
CPC ............... *G02C 7/021* (2013.01); *G02C 7/024* (2013.01); *G02C 7/027* (2013.01); *G02C 7/06* (2013.01); *G02C 7/061* (2013.01); *G02C 7/063* (2013.01); *G02C 7/068* (2013.01)

(58) Field of Classification Search
CPC ...... G02C 7/021; G02C 7/024; G02C 7/027; G02C 7/06; G02C 7/061; G02C 7/063; G02C 7/068
USPC ..................................................... 359/159.42
See application file for complete search history.

(56) References Cited

U.S. PATENT DOCUMENTS

| 5,715,032 A | * | 2/1998 | Isenberg ................... 351/159.42 |
| 6,116,734 A | | 9/2000 | Pedrono et al. |
| 6,139,148 A | | 10/2000 | Menezes |
| 2002/0171803 A1 | * | 11/2002 | Ahsbahs et al. .............. 351/169 |

FOREIGN PATENT DOCUMENTS

| EP | 1 688 781 | 8/2006 |
| WO | 00/72051 | 11/2000 |

(Continued)

OTHER PUBLICATIONS

International Search Report dated Sep. 14, 2012, corresponding to PCT/EP2012/055146.

*Primary Examiner* — Bumsuk Won
*Assistant Examiner* — Grant Gagnon
(74) *Attorney, Agent, or Firm* — Young & Thompson

(57) ABSTRACT

Disclosed is a progressive ophthalmic lens including a front surface and a rear surface, each surface having in each point an altitude, a mean sphere value and a cylinder value, the front surface of the lens including: —a far vision zone having a far vision reference point; —a near vision zone having a near vision reference point; —a main meridian, wherein the front surface is regressive and has: —a sphere gradient normalized value of less than $7.50 \cdot 10^{-1}$ mm$^{-1}$ at any point in a central portion of the lens including a portion of the main meridian (32), the far vision reference point (FV) and the near vision reference point (NV); —a cylinder gradient normalized value of less than 1.45 mm$^{-1}$ at any point in the central portion of the lens.

18 Claims, 80 Drawing Sheets

(56) References Cited

FOREIGN PATENT DOCUMENTS

| WO | 2008/089996 | 7/2008 |
| WO | 2010/072749 | 7/2010 |
| WO | 2010/093664 | 8/2010 |

* cited by examiner

PROGRESSIVE OPHTHALMIC LENS

FIELD OF THE INVENTION

The invention relates to a progressive ophthalmic lens. The invention also relates to a semi-finished lens blank having a first aspherical surface and a second unfinished surface that is intended to be further machined to form a progressive ophthalmic lens. The invention also relates to a method for manufacturing such a progressive ophthalmic lens and such a semi-finished lens blank.

BACKGROUND OF THE INVENTION

A wearer may be prescribed a positive or negative optical power correction. The ophthalmic prescription can include a power and/or an astigmatism prescription. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable being progressive multifocal lenses.

The ophthalmic prescription can include an astigmatism prescription. Such a prescription is produced by the ophthalmologist in the form of a pair formed by an axis value (in degrees) and an amplitude value (in diopters). The amplitude value represents the difference between minimal and maximal power in a given direction which enables to correct the visual defect of a wearer. According to the chosen convention, the axis represents the orientation of one of two powers with relation to a reference axis and in the sense of rotation chosen. Usually, the TABO convention is used. In this convention, the reference axis is horizontal and the sense of rotation is anticlockwise for each eye, when looking to the wearer. An axis value of +45° therefore represents an axis oriented obliquely, which when looking to the wearer, extends from the quadrant located up on the right to the quadrant located down on the left. Such an astigmatism prescription is measured on the wearer looking in far vision. The term <<astigmatism>> is used to designate the pair (amplitude, angle); despite this use not being strictly correct, this term is also used to refer to the amplitude of the astigmatism. The person skilled in the art can understand from the context which meaning is to be considered. It is also known for the person skilled in the art that the prescribed power and astigmatism of a wearer are usually called sphere SPH, cylinder CYL and axis.

To obtain a progressive ophthalmic lens corresponding to a wearer prescription, a semi-finished ophthalmic lens blank can be provided by a lens manufacturer. Generally, a semi-finished ophthalmic lens blank comprises a first surface corresponding to an optical reference surface, for example a progressive surface in the case of traditional progressive addition lenses, and a second unfinished surface. A semi-finished lens blank having suitable optical characteristics is selected based on the wearer prescription and the unfinished surface is machined and polished by a prescription laboratory so as to obtain a lens complying with the prescription. The semi-finished lens blank may be produced by molding or by digital surfacing. The unfinished surface can be machined by digital surfacing.

A progressive ophthalmic lens may also be obtained by directly machining both surfaces using digital surfacing equipments. A row lens blank is provided; a first aspheric surface is machined and a second aspheric surface is machined, the second aspheric surface being determined by optical optimization based on data relative to the first aspheric surface and on data relative to the wearer. An ophthalmic lens complying with the prescription is thus obtained.

Whatever technology is used—starting from a semi-finished lens blank or machining both surfaces by digital surfacing—accurate positioning of the lens on the digital surfacing machine is required to ensure that the optical characteristics of the lens are fulfilled.

WO-A-2010/072749 discloses a method of manufacturing an ophthalmic lens by digital surfacing and identifies the issue of accurate positioning of the lens member on a blocker.

SUMMARY OF THE INVENTION

The invention aims to facilitate manufacturing of a progressive ophthalmic lens while maintaining the optical quality of the lens.

This object is achieved with a progressive ophthalmic lens comprising a front surface and a rear surface, each surface having in each point an altitude, a mean sphere value and a cylinder value, the front surface of the lens comprising:
  a far vision zone having a far vision reference point;
  a near vision zone having a near vision reference point;
  a main meridian,
  wherein the front surface is regressive and has:
    a sphere gradient normalized value of less than $7.50 \cdot 10^{-1}$ mm$^{-1}$ at any point in a central portion of the lens including a portion of the main meridian, the far vision reference point and the near vision reference point;
    a cylinder gradient normalized value of less than $1.45$ mm$^{-1}$ at any point in the central portion of the lens.

According to an embodiment, the front surface of the lens further has a fourth derivative with respect to altitude normalized value of less than $5.0 \cdot 10^{-5}$ mm$^{-2} \cdot$diopter$^{-1}$ at any point in the central portion of the lens.

The object of the invention is also achieved with a progressive ophthalmic lens comprising a front surface and a rear surface, each surface having in each point an altitude, a mean sphere value and a cylinder value, the front surface of the lens comprising:
  a far vision zone having a far vision reference point;
  a near vision zone having a near vision reference point;
  a main meridian,
  wherein the front surface is regressive and has a fourth derivative with respect to altitude normalized value of less than $5.0 \cdot 10^{-5}$ mm$^{-2} \cdot$diopter$^{-1}$ at any point in a central portion of the lens including a portion of the main meridian, the far vision reference point and the near vision reference point.

According to an embodiment, at least one surface of the lens comprises two micro-markings and a central point located at the center of a segment linking the two micro-markings, the central portion of the lens being a circle of 40 mm diameter centered on the central point.

The object of the invention is also achieved with a semi-finished spectacle lens blank having a first regressive surface and a second unfinished surface, the first regressive surface having in each point an altitude, a mean sphere value and a cylinder value, wherein the first regressive surface comprises a far vision zone having a far vision reference point, a near vision zone having a near vision reference point, a main meridian, and wherein the first regressive surface has a fourth derivative with respect to altitude normalized value of less than $5.0 \cdot 10^{-5}$ mm$^{-2} \cdot$diopter$^{-1}$ at any point in at least a central portion of the blank including a portion of the main meridian, the far vision reference point and the near vision reference point.

According to an embodiment, the first regressive surface further has:
- a sphere gradient normalized value of less than $7.50 \cdot 10^{-1}$ mm$^{-1}$ at any point in the central portion; and
- a cylinder gradient normalized value of less than 1.45 mm$^{-1}$ at any point in the central portion.

The object of the invention is also achieved with a semi-finished spectacle lens blank having a first regressive surface and a second unfinished surface, the first regressive surface having in each point an altitude, a mean sphere value and a cylinder value, wherein the first regressive surface comprises a far vision zone having a far vision reference point, a near vision zone having a near vision reference point, a main meridian, and wherein the first regressive surface has:
- a sphere gradient normalized value of less than $7.50 \cdot 10^{-1}$ mm$^{-1}$ at any point in a central portion including a portion of the main meridian, the far vision reference point and the near vision reference point; and
- a cylinder gradient normalized value of less than 1.45 mm$^{-1}$ at any point in the central portion.

According to an embodiment, the blank has markings defining a position of a central point of the blank, the central portion of the blank being a circle of 40 mm diameter centered on the central point.

The invention also relates to a method for manufacturing semi-finished lens blank, comprising the steps of:
- defining a first surface and a second unfinished surface, the first surface having in each point an altitude, a mean sphere value and a cylinder value;
- defining a far vision zone having a far vision reference point, a near visions zone having a near vision reference point, a main meridian and a central portion of the first surface including a portion of the main meridian, the far vision reference point and the near vision reference point;
- determining the first surface having:
  - a regression of the mean sphere value between at least a portion of the far vision zone and at least a portion of the near visions zone; and
  - a fourth derivative with respect to altitude normalized value of less than $5.0 \cdot 10^{-5}$ at any point in the central portion;
- surfacing or molding the first surface.

The invention further relates to a method for manufacturing semi-finished lens blank, comprising the steps of:
- defining a first surface and a second unfinished surface, the first surface having in each point an altitude, a mean sphere value and a cylinder value;
- defining a far vision zone having a far vision reference point, a near visions zone having a near vision reference point, a main meridian and a central point of the first surface including a portion of the main meridian, the far vision reference point and the near vision reference point;
- determining the first surface having:
  - a regression of the mean sphere value between at least a portion of the far vision zone and at least a portion of the near visions zone; and
  - a sphere gradient normalized value of less than $7.50 \cdot 10^{-1}$ mm$^{-1}$ at any point in the central portion; and
  - a cylinder gradient normalized value of less than 1.45 mm$^{-1}$ at any point in the central portion;
- surfacing or molding the first surface.

The invention further relates to a method for manufacturing a progressive ophthalmic lens, comprising the steps of:
- providing data relative to a wearer,
- selecting a semi-finished lens blank according to the invention;
- carrying out an optical optimization of the lens based on the data relative to the wearer and on data relative to the first regressive surface of the blank,
- providing the selected semi-finished lens blank and surfacing or molding the unfinished surface of the blank according to the result of the optical optimization.

The invention further relates to a method for manufacturing a progressive ophthalmic lens, comprising the steps of:
- providing data relative to a wearer,
- defining far vision zone having a far vision reference point, a near vision zone having a near vision reference point, a main meridian,
- defining a first surface of the lens having:
  - a regression of the mean sphere value between at least a portion of the far vision zone and at least a portion of the near visions zone;
  - a sphere gradient normalized value of less than $7.50 \cdot 10^{-1}$ mm$^{-1}$ at any point in a central portion of the lens including a portion of the main meridian, the far vision reference point and the near vision reference point;
  - a cylinder gradient normalized value of less than 1.45 mm$^{-1}$ at any point in the central portion of the lens;
- carrying out an optical optimization of the lens based on the data relative to the wearer and on data relative to the first surface of the lens;
- determining a second surface of the lens according to the result of the optical optimization;
- surfacing or molding the first and second surfaces.

The invention also relates to a method for manufacturing a progressive ophthalmic lens, comprising the steps of:
- providing data relative to a wearer,
- defining far vision zone having a far vision reference point, a near vision zone having a near vision reference point, a main meridian,
- defining a first surface of the lens having:
  - a regression of the mean sphere value between at least a portion of the far vision zone and at least a portion of the near visions zone;
  - a fourth derivative with respect to altitude normalized value of less than $5.0 \cdot 10^{-5}$ at any point in a central portion of the lens including a portion of the main meridian, the far vision reference point and the near vision reference point;
- carrying out an optical optimization of the lens based on the data relative to the wearer and on data relative to the first surface of the lens;
- determining a second surface of the lens according to the result of the optical optimization;
- surfacing or molding the first and second surfaces.

The invention also relates to a set of apparatuses for manufacturing a progressive ophthalmic lens and/or a semi-finished lens blank, wherein the apparatuses are adapted to carry out steps of the method according to the invention.

The invention further relates to a computer program product comprising one or more stored sequence of instruction that is accessible to a processor and which, when executed by the processor, causes the processor to carry out the steps of the method according to the invention. The invention also relates to a computer readable medium carrying out one or more sequences of instructions of the computer program product of the invention.

The far vision reference point (resp. the near vision reference point) can be, for example, a control point. More generally, the far vision reference point (resp. the near vision reference point) can be any other point of the front surface in the far vision zone (resp. in the near vision zone).

As variations of sphere and cylinder (also called gradients of sphere and gradients of cylinder) and/or acceleration of the sphere and cylinder variations are controlled on the front surface of the progressive ophthalmic lens according to the invention, it is thus possible to ensure an enhanced technical feasibility of the machining with a digital surfacing machine of the rear surface while maintaining the optical quality of the lens.

Further features and advantages of the invention will appear from the following description of embodiments of the invention, given as non-limiting examples, with reference to the accompanying drawings listed hereunder.

It can be appreciated that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF PREFERRED EMBODIMENTS

A progressive lens comprises two non-rotationally symmetrical aspheric surfaces, for instance but not limited to, progressive surface, regressive surface, toric or atoric surfaces.

As is known, each point of an aspherical surface has an altitude z. For each point of the surface, a minimum curvature $CURV_{min}$ is given by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspherical surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures CURV$_{min}$ and CURV$_{max}$ are also identical.

From these expressions of the minimum and maximum curvatures CURV$_{min}$ and CURV$_{max}$, the minimum and maximum spheres labelled SPH$_{min}$ and SPH$_{max}$ can be deduced according to the kind of surface considered.

When the surface considered is the object side surface—also called front surface, the expressions are the following:

$$SPH_{min} = (n-1) * CURV_{min} = \frac{n-1}{R_{max}}$$

and $$SPH_{max} = (n-1) * CURV_{max} = \frac{n-1}{R_{min}}$$

where n is the index of the constituent material of the lens.

If the surface considered is an eyeball side surface—also called rear surface, the expressions are the following:

$$SPH_{min} = (1-n) * CURV_{min} = \frac{1-n}{R_{max}}$$

and $$SPH_{max} = (1-n) * CURV_{max} = \frac{1-n}{R_{min}}$$

where n is the index of the constituent material of the lens.

As is known, a mean sphere SPH$_{mean}$ at any point on an aspherical surface can also be defined by the formula:

SPH$_{mean}$=½(SPH$_{min}$+SPH$_{max}$)

A cylinder CYL is also defined by the formula CYL=SPH$_{max}$−SPH$_{min}$.

The characteristics of any complex face of the lens may be expressed by means of the local mean spheres and cylinders. A surface can be considered as locally aspherical when the cylinder is at least 0.25 diopters.

Figure 79:
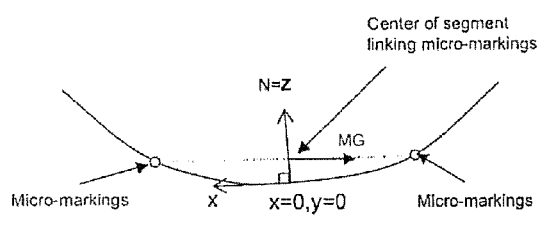
FIGS. 79 and 80 show referential defined with respect to micro-markings, for a surface bearing micro-markings and for a surface not bearing the micro-markings respectively.
Figure 80:
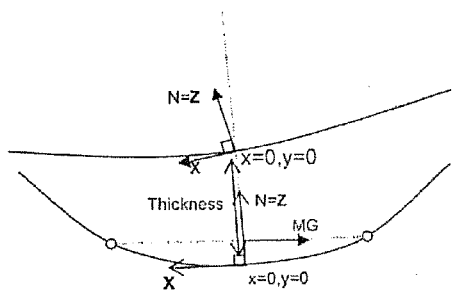

Whenever a lens is characterized by reference to one of its aspherical surfaces, a referential is defined with respect to micro-markings as illustrated in FIGS. 79 and 80, for a surface bearing micro-markings and for a surface not bearing the micro-markings respectively.

Progressive lenses comprise micro-markings that have been made mandatory by a harmonized standard ISO 8990-2. Temporary markings may also be applied on the surface of the lens, indicating positions of control points on the lens, such as a control point for far vision, a control point for near vision, a prism reference point and a fitting cross for instance. If the temporary markings are absents or have been erased, it is always possible to a skilled person to position the control points on the lens by using a mounting chart and the permanent micro-markings. The lens manufacturer has to guarantee prescription at the control points.

The micro-markings also make it possible to define referential for both surfaces of the lens.

FIG. 79 shows the referential for the surface bearing the micro-markings. The center of the surface (x=0, y=0) is the point of the surface at which the normal N to the surface intersect the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis.

FIG. 80 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses. Reference can be made to EP-A-0 927 377, EP-A-0 990 939 or WO-A-2010/100528 for instance defining a lens with optical characteristics.

As known per se, it is possible to define a wearer optical power and astigmatism, in each viewing direction.

Possible definitions of the optical power and the astigmatism of the lens, in the wearing conditions, can be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Wearing conditions may be calculated from a ray-tracing program, for a given lens. Further, the optical power and the astigmatism may be calculated so that the prescription is fulfilled for a wearer wearing his spectacles in the wearing conditions. Optical power and astigmatism can also be measured by a frontofocometer.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 79 and 80, and preferably to a value along the y axis inferior to the y_value at the fitting cross.

Figure 81:
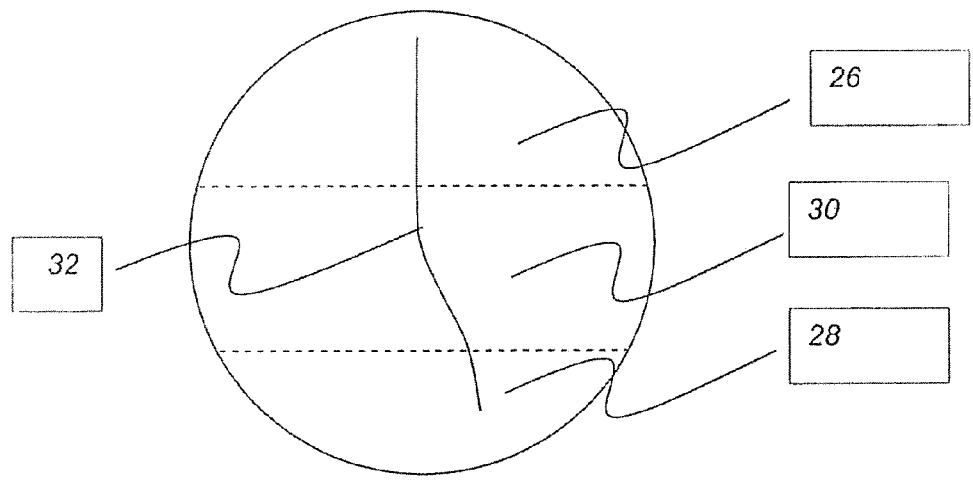
FIG. 81 is a schematic illustration of a multifocal progressive lens.

The visual field zones seen through a lens are schematically illustrated in FIG. 81. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side. Typically, the far vision zone 26 includes a far vision control point FV and the near vision zone 28 includes a near vision control point NV. When a surface of the lens is considered, the far vision zone and the near vision zone can be defined as the projection of the above defined zones on the surface. When the surface of a lens or of a semi-finished lens blank is considered, the far vision zone, respectively the near vision zone, can be defined as the zones that contribute to the far vision field zone, respectively the near vision field zone, when the lens is used.

For the purpose of the invention, the meridian line 32 of a progressive lens is defined as follow: for each lowering of the view of an angle $\alpha=\alpha_1$ between the gaze direction corresponding to the fitting cross and a gaze direction being in the near vision zone, the gaze direction $(\alpha_1, \beta_1)$ is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line 32 of a surface of the lens can be defined as follow: each gaze direction $(\alpha, \beta)$ belonging to the optical meridian line of the lens intersects the surface in a point (x, y). The meridian line of the surface is the set of points corresponding to the gaze directions of the meridian line of the lens. The meridian line 32 of an aspheric surface of the lens—or of an aspheric surface of a semi-finished lens blank—may also be defined as follow: for each line y between the center of the referential of the surface (x=0 mm; y=0 mm) and the bottom of the surface, the point (x, y) is searched for which the local cylinder is minimum.

As shown in FIG. 81, the meridian 32 separates the lens in a nasal area and a temporal area. As expected, the nasal area is the area of the lens which is between the meridian and the nose of the wearer whereas the temporal area is the area which is between the meridian and the temple of the wearer.

The invention relies on a study by the applicant of the distortion. Notably, the applicant has established that a regressive front surface improves optical distortion in peripheral vision on the final lens. The applicant has observed that the more regressive the front surface was, the better the distortion was compensated.

By "regressive surface" is meant a continuous aspheric surface having a far vision zone, a near vision zone and a zone of decreasing mean sphere value connecting the far vision and near vision zones. By "progressive surface" is meant a continuous aspheric surface having a far vision zone, a near vision zone and a zone of increasing mean sphere value connecting the far vision and near vision zones.

The "addition of a surface" may be defined as the mean sphere variation between the near vision reference point (NV) belonging to the near vision zone and the far vision reference point (FV) belonging to the far vision zone. Reference points can be for instance, but not limited to, control points. The addition of the surface can be expressed as:

$$Add_{surface}=SPH_{mean}(NV)-SPH_{mean}(FV);$$

If $Add_{surface}>0$, the surface is a progressive surface;
If $Add_{surface}<0$, the surface is a regressive surface.

When the far vision reference point and the near vision reference point are selected in the far and the near vision zones such that the absolute value of the addition of the surface is maximized, this addition value will be called the maximum addition value of the surface.

The regressive surface of the lens blank according to the invention has a mean sphere value in at least a portion of the far vision zone that is more than the mean sphere value in at least a portion of the near vision zone.

However, when the front surface is regressive, i.e. mean sphere value in at least a portion of the far vision zone is more than the mean sphere value in at least a portion of the near vision zone, the rear surface must have an even stronger addition to obtain a positive power addition on the final lens. For a progressive lens suitable for a prescription of 2 diopters of prescribed addition, should the front surface have a negative addition of about 3 diopters for instance, the rear surface should have a positive addition of about 5 diopters to ensure a positive power addition of about 2 diopters the lens.

Such a strong sphere variation on the rear surface will also induce a strong cylinder variation. Strong variations of sphere and cylinder increase complexity when machining the surface.

Indeed, when machining a surface of the lens, a grinding step is first performed wherein material is taken away from the surface of the lens to bring the surface as close as possible to the geometry requested to obtain the surface characteristics sought. Then a polishing step is performed to obtain a transparent surface while preserving the geometry obtained after grinding.

During the grinding step, gradients of sphere and cylinder will impact the acceleration of the machining tool. The stronger the gradients are, the steeper the acceleration is, which can lead to degradation of the surface obtained after grinding and hence to optical performances degradations.

During the polishing step, the gradients tend to be filtered. Whenever gradients values vary sharply, the polishing step will soften this variation, which can lead to degradation of the surface obtained after polishing, notably along the meridian line.

Moreover, high gradients of sphere and cylinder and strong variations of gradients render the surfaces very sensitive to positioning with respect to one another. Positioning errors between both surfaces are caused by manufacturing process, for instance when the lens blank is positioned on a blocker of a digital surfacing machine to create the second surface from the unfinished surface.

Figure 82:
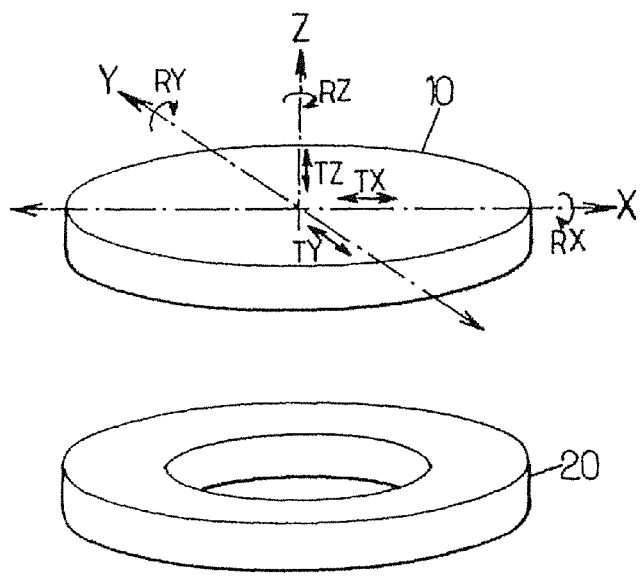
FIG. 82 is a perspective view of a lens blank to be positioned on a blocker.

FIG. 82 illustrates the positioning of a lens blank 10 in a reference frame of a lens blocking device 20 of a digital surfacing machine.

The reference frame of the lens blank 10 in the blocker 20 can be defined by:
  translations $T_X$ and $T_Y$ in a horizontal plane XY with values $T_X$, $T_Y$, defining the offset of the central point O of the lens blank along the X and Y directions respectively in the horizontal plane;
  translation $T_Z$ along a vertical axis Z,
  orientation $R_Z$ of the lens blank about the vertical Z axis, orientation $R_Y$ of the lens blank about the horizontal Y axis, orientation $R_X$ of the lens blank about the horizontal X axis.

An error in the positioning of the lens blank, i.e. a translation and/or rotation will lead to surfacing a second surface with an offset with respect to the first surface and the optical performances of the final lens will not match the nominal performances (nominal performances being the theoretical performances of the lens considering no manufacturing errors). A method for compensating positioning error when manufacturing the lens is disclosed in WO-A-2010/072749. However, whenever a surface has a hard design, i.e. high gradients of sphere and cylinder and strong variations of gradients, even a slight error in positioning will result in stronger optical divergence between the optical performances of the lens and the nominal performances.

Therefore, the invention proposes a semi-finished lens blank with a regressive surface having a very soft design. Such a soft design will ensure that gradients do not change too drastically. Thereby, when the unfinished surface of the blank will be machined to fulfill a target optical design and the wearer's prescription, the values and variations of gradients of sphere and cylinder will also be better controlled.

The invention also proposes a progressive lens with a front regressive surface having a very soft design. In the following, detailed description is given with respect to a first regressive surface of a semi-finished lens blank. Still, the following description could be given in similar terms for the front regressive surface of a progressive lens.

As explained before, an aspherical surface may be locally defined by mean sphere and cylinder.

Gradients of sphere and cylinder may also be defined. Gradient is defined conventionally as the vector the coordinates of which along this axis are respectively equal to the partial derivatives of mean sphere (respectively cylinder) along this axis, and, although this is misuse of language, we call the norm of the gradient vector the gradient. i.e.:

$$GradSPH = \|\overrightarrow{gradSPH}\| = \sqrt{\left(\frac{\partial SPH}{\partial x}\right)^2 + \left(\frac{\partial SPH}{\partial y}\right)^2}$$

$$GradCYL = \|\overrightarrow{gradCYL}\| = \sqrt{\left(\frac{\partial CYL}{\partial x}\right)^2 + \left(\frac{\partial CYL}{\partial y}\right)^2}$$

Gradients of sphere and cylinder are representative of local variations in sphere and cylinder. Gradient of sphere is all the smaller as the addition of the surface is small or slow, i.e. is not sudden. Nevertheless, a progressive or regressive surface necessary has a non zero sphere gradient.

Cylinder is representative of how much the local surface deviates from a spherical surface. Variations in sphere lead of necessity to variations in cylinder, and cylinder cannot be nil over the whole lens surface.

A fourth derivative with respect to altitude z may also be defined in each point of the aspherical surface. Such a fourth derivative can be expressed as follow:

$$D_4(x,y) = \sqrt{\left(\frac{d^4z(x,y)}{dx^4}\right)^2 + \left(\frac{d^4z(x,y)}{dx^3dy}\right)^2 + \left(\frac{d^4z(x,y)}{dx^2dy^2}\right)^2 + \left(\frac{d^4z(x,y)}{dxdy^3}\right)^2 + \left(\frac{d^4z(x,y)}{dy^4}\right)^2}$$

The fourth derivative $D_4$ is representative of the rapidity of change of the gradients values, i.e. acceleration of the sphere and cylinder variations.

The invention proposes to control the value of the fourth derivative $D_4$ over the first surface of the lens blank. Such control will thus contribute to reduce significantly the possible degradation of the surface during the polishing step when machining the second surface of the lens and also when machining this first surface should digital surfacing technique be used as explained in more detail below.

This quantity is controlled, at least over a central portion of the first surface of the lens blank. This central portion includes a portion of the main meridian, a reference point in the far vision zone and a reference point in the near vision zone. The reference points can be the control points defined above, but any other reference points could be chosen. For instance, the value of $D_4$ is controlled within a 40 mm diameter circle—ie within a 20 mm radius around the lens blank center; this amounts to excluding regions at the edge of a lens which are infrequently used by the lens wearer. Optical performances of the lens are typically considered within a central portion for directions of view comprised within a cone of +/−40° aperture centered on the center of rotation of the eye. The invention also proposes normalizing the value of the fourth derivative, to obtain a quantity which is not a function of the addition of the surface. The normalization factor involves the addition value.

Notably, the invention proposes to set a limit value to the fourth derivative $D_4$ when determining the regressive surface of the semi-finished lens blank. More specifically, the normalized value of the fourth derivative $D_4$ is limited to $5.0 \cdot 10^{-5}$ mm$^{-2}$·diopter$^{-1}$ over at least the central portion of the lens blank and preferably is limited to $3.5 \cdot 10^{-5}$ mm$^{-2}$·diopter$^{-1}$ of the blank.

The maximum value of the fourth derivative $D_4$ being located along the meridian line of the aspheric surface of the lens blank, the normalized value of the fourth derivative $D_4$ can be limited to $5.0 \cdot 10^{-5}$ mm$^{-2}$·diopter$^{-1}$—and more preferably limited to $3.5 \cdot 10^{-5}$ mm$^{-2}$·diopter$^{-1}$—over a portion of the lens blank delimited by the meridian line +/−5 mm. However, the value of the fourth derivative $D_4$ can not be nil over this central portion and a minimal value of $1.0 \cdot 10^{-6}$ mm$^{-2}$·diopter$^{-1}$ is to be expected. The normalization factor is equal to the maximum value of the addition of the surface.

The invention also proposes to control the value of the sphere and cylinder gradients over the first surface of the lens blank. Such control will thus contribute to reduce significantly the possible degradation of the surface during the grinding step when machining the second surface of the lens, and also when machining this first surface should digital surfacing technique be used.

Sphere and cylinder gradients are controlled, at least over a central portion of the first surface of the lens blank. For instance, the sphere and cylinder gradients are controlled within the 40 mm diameter circle defined above. The sphere and cylinder gradients limit values can be normalized to obtain a quantity which is not a function of the addition of the surface.

Notably, the invention proposes to set a limit value to the sphere gradient when determining the regressive surface of the semi-finished lens blank. More specifically, the normalized value of the sphere gradient is limited to $7.50 \cdot 10^{-1}$ mm$^{-1}$ over at least the central portion of the lens blank and preferably is limited to $6.50 \cdot 10^{-1}$ mm$^{-1}$ over the central portion of the blank. However, the value of the sphere gradient can not be nil over this central portion and a minimal value of $1.0 \cdot 10^{-2}$ mm$^{-1}$ is to be expected. The normalization factor is equal to the maximum value of the addition of the surface.

Moreover, the invention also proposes to set a limit value to the cylinder gradient when determining the regressive surface of the semi-finished lens blank. More specifically, the normalized value of the cylinder gradient is limited to 1.45 mm$^{-1}$ over at least the central portion of the lens blank and preferably is limited to 1.25 mm$^{-1}$ over the central portion of the blank. However, the value of the sphere gradient can not be nil over this central portion and a minimal value of $1.0 \cdot 10^{-2}$ mm$^{-1}$ is to be expected. The normalization factor is equal to the maximum value of the addition of the surface.

In the following, we shall use an orthonormal co-ordinate system in which the x-axis corresponds to the horizontal axis of the lens and the y-axis to the vertical axis; the center O of the reference frame is the geometric center of the surface of the lens blank as defined with respect to FIGS. 79 and 80. In the description which follows, the axes are graduated in millimeters.

FIGS. 1 to 25 are illustrations of surfaces of semi-finished lens blanks, i.e. front surfaces of the final lenses. FIGS. 1 to 5 and 6 to 10 are illustrations of surfaces according to comparative examples outside the scope of the invention and FIGS. 11 to 15 and 16 to 20 and 21 to 25 are illustrations of surfaces according to three examples of the invention. In the following, reference will be made to Lens 1 and Lens 2 for the two comparative examples and reference will be made to Lens 3, Lens 4 and Lens 5 for the three examples of the invention.

The five examples are given for a lens for a wearer whose prescription would be prescribed optical power in far vision of 0 diopter, prescribed astigmatism in far vision of 0 diopter and prescribed addition of 2.5 diopters for semi-finished lens blanks of 60 mm diameter. The mean sphere value at the far vision control point is 4.72 diopters.

Figure 1:
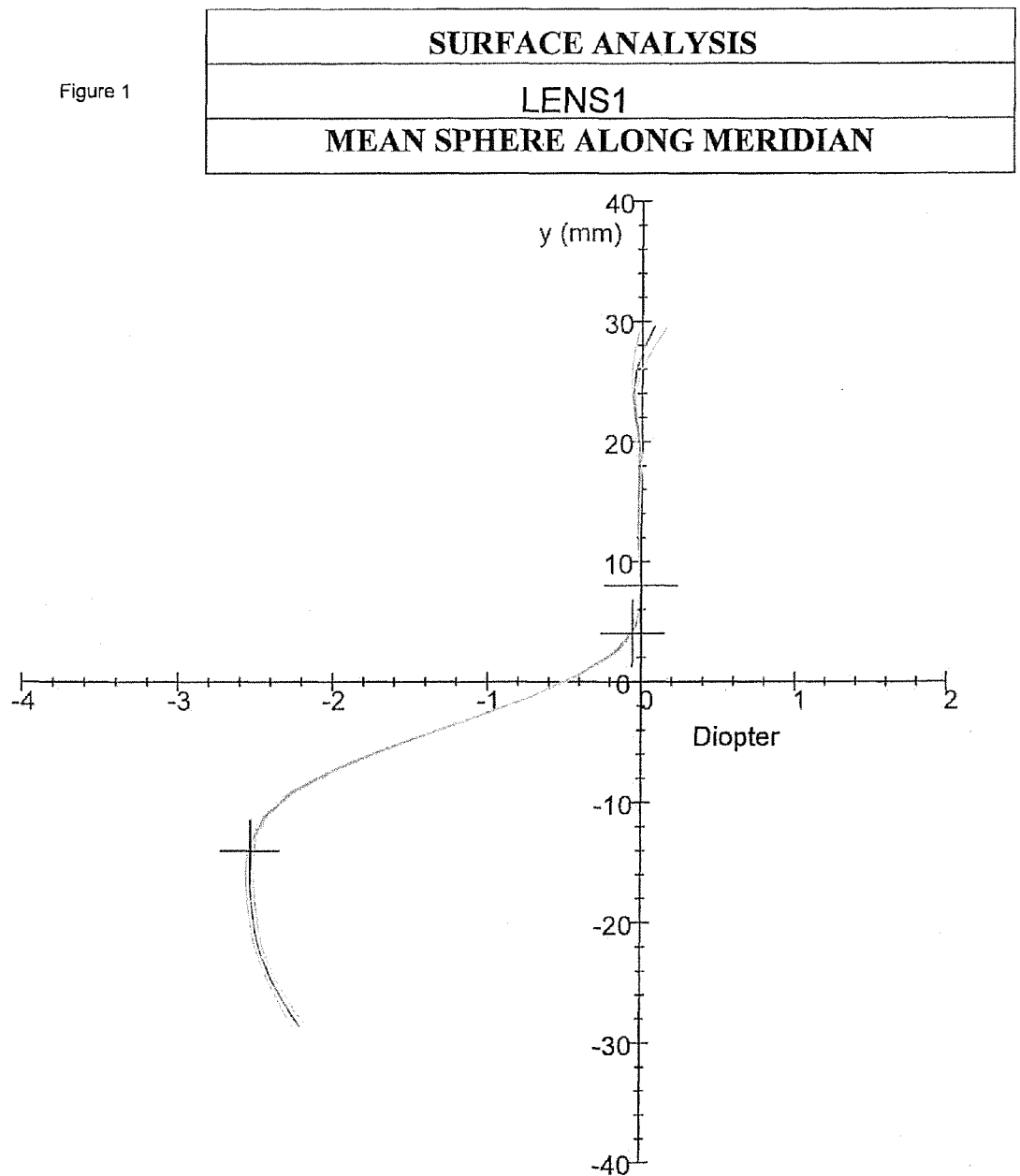
FIGS. 1 to 5 are a graph of mean sphere along the meridian, a map of mean sphere, a map of cylinder, a map of sphere gradient and a map of cylinder gradient respectively of a front surface of a semi-finished lens blank, according to a first comparative example.
Figure 2:
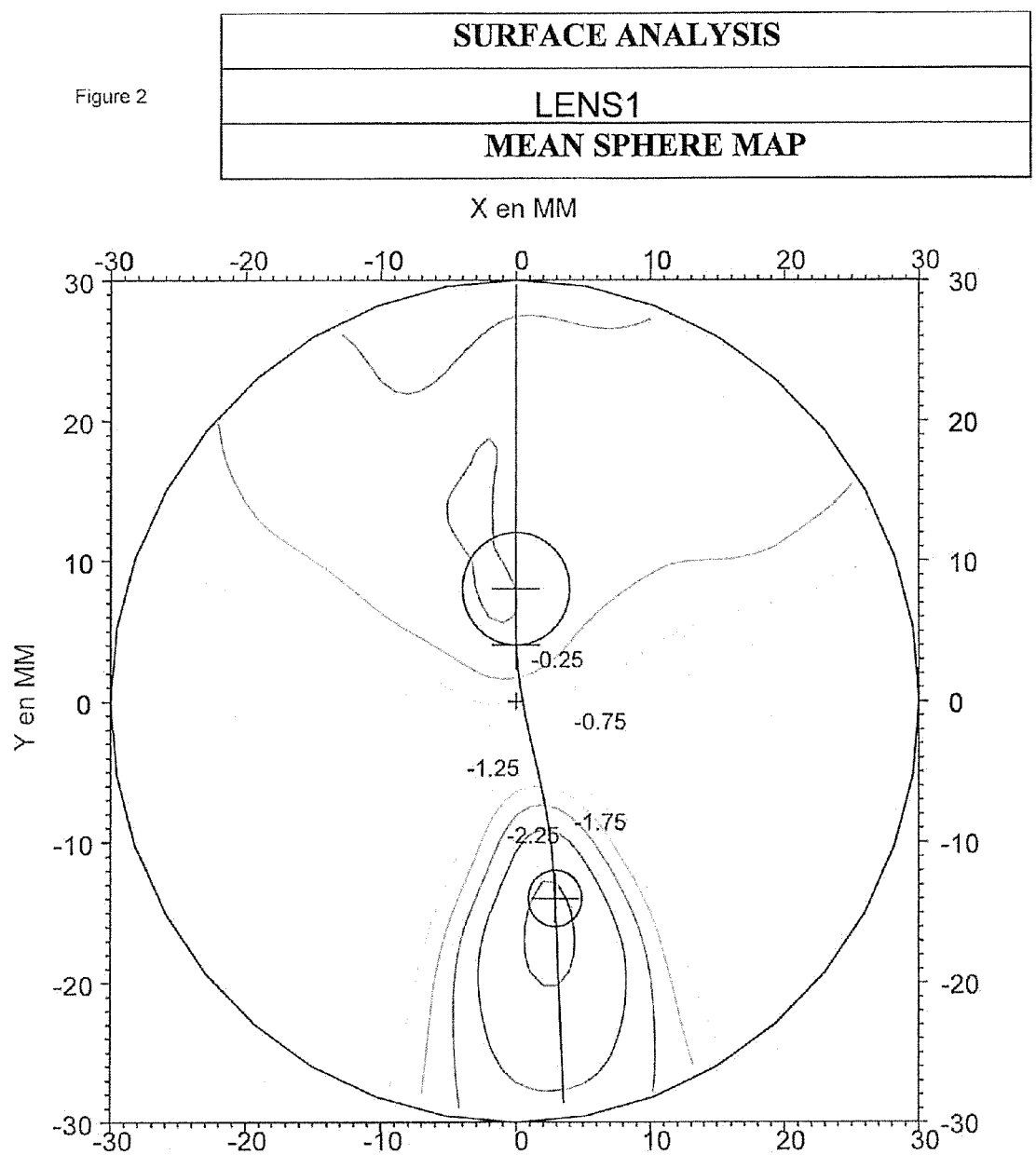
Figure 3:
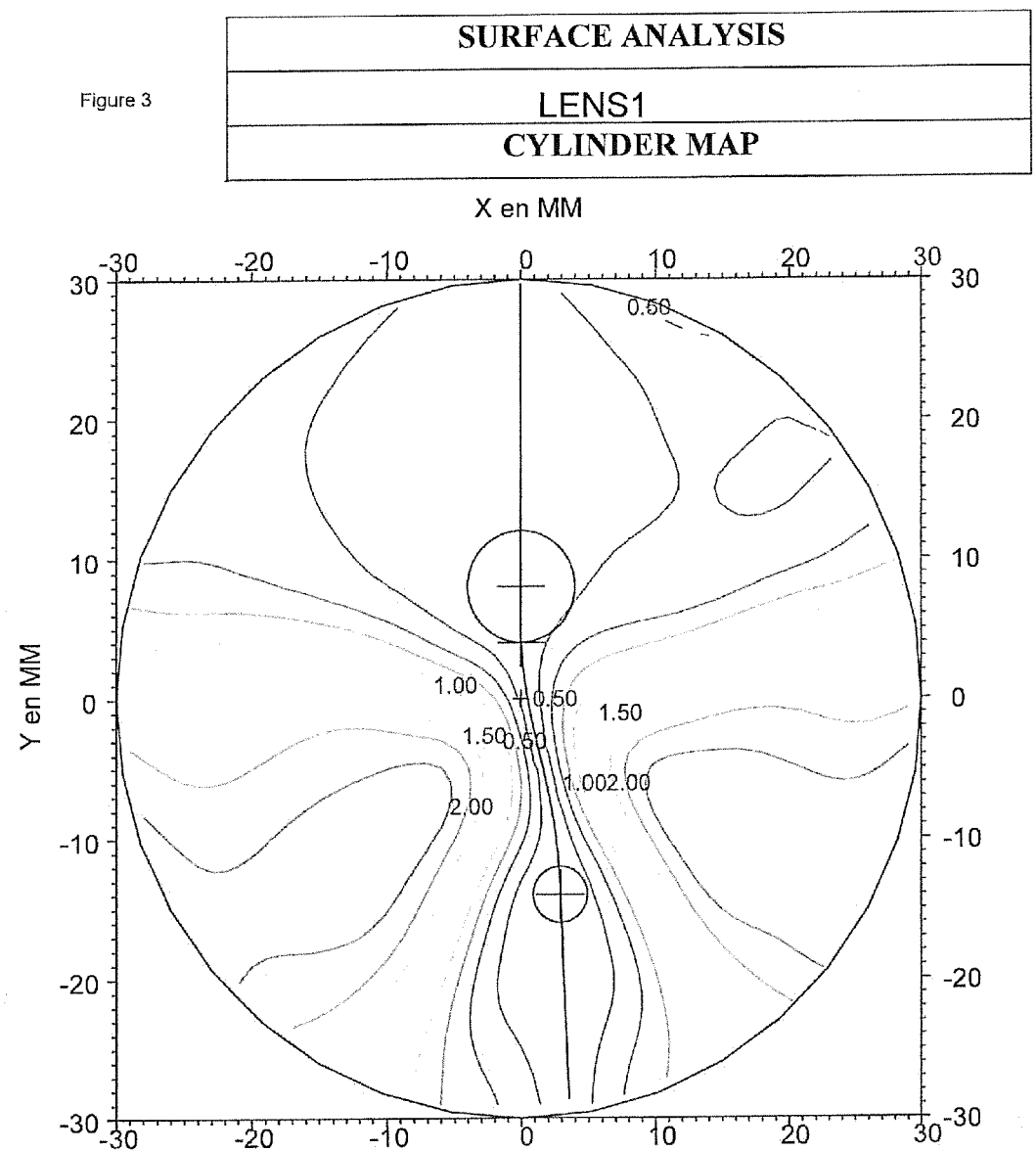
Figure 4:
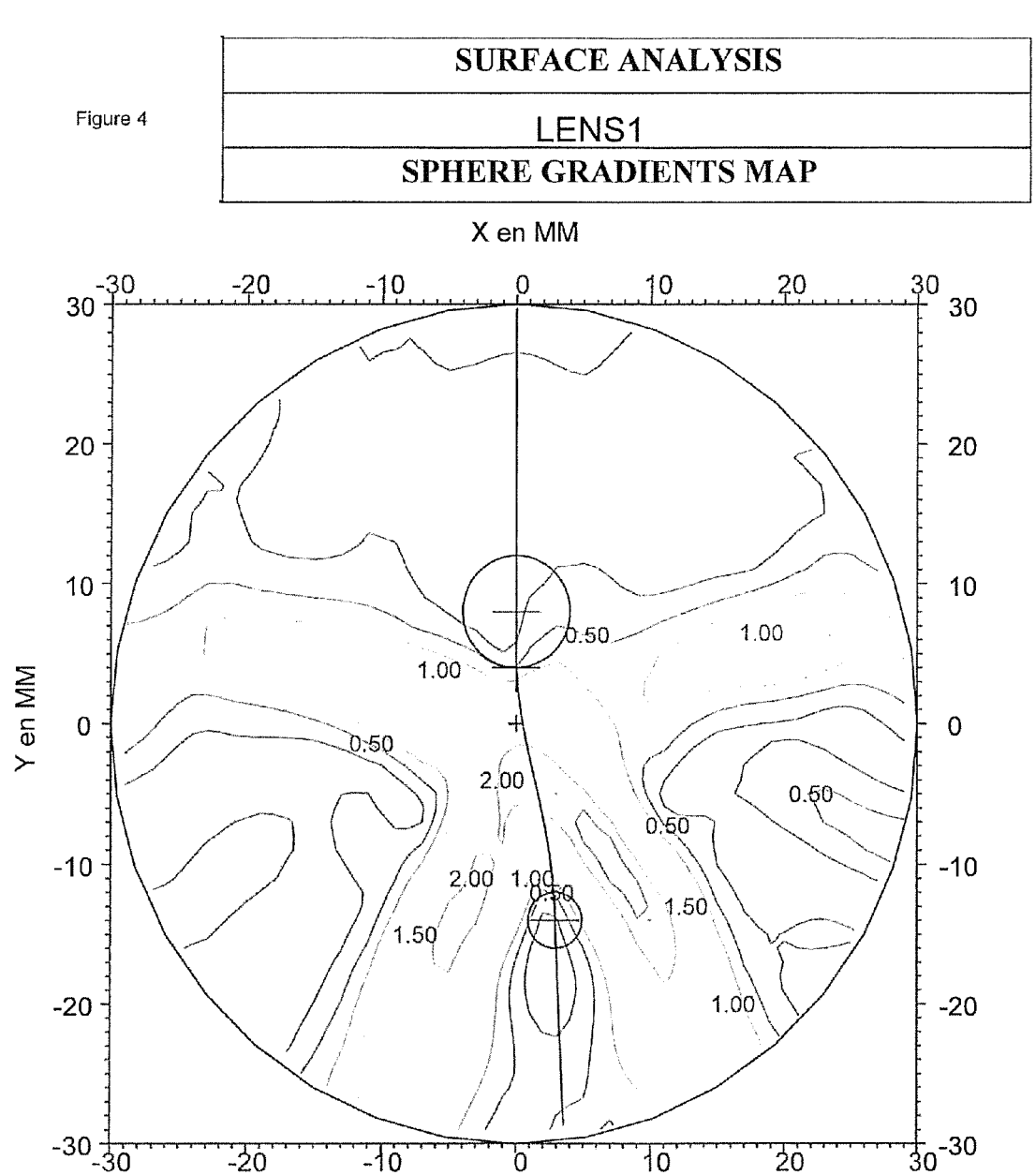
Figure 5:
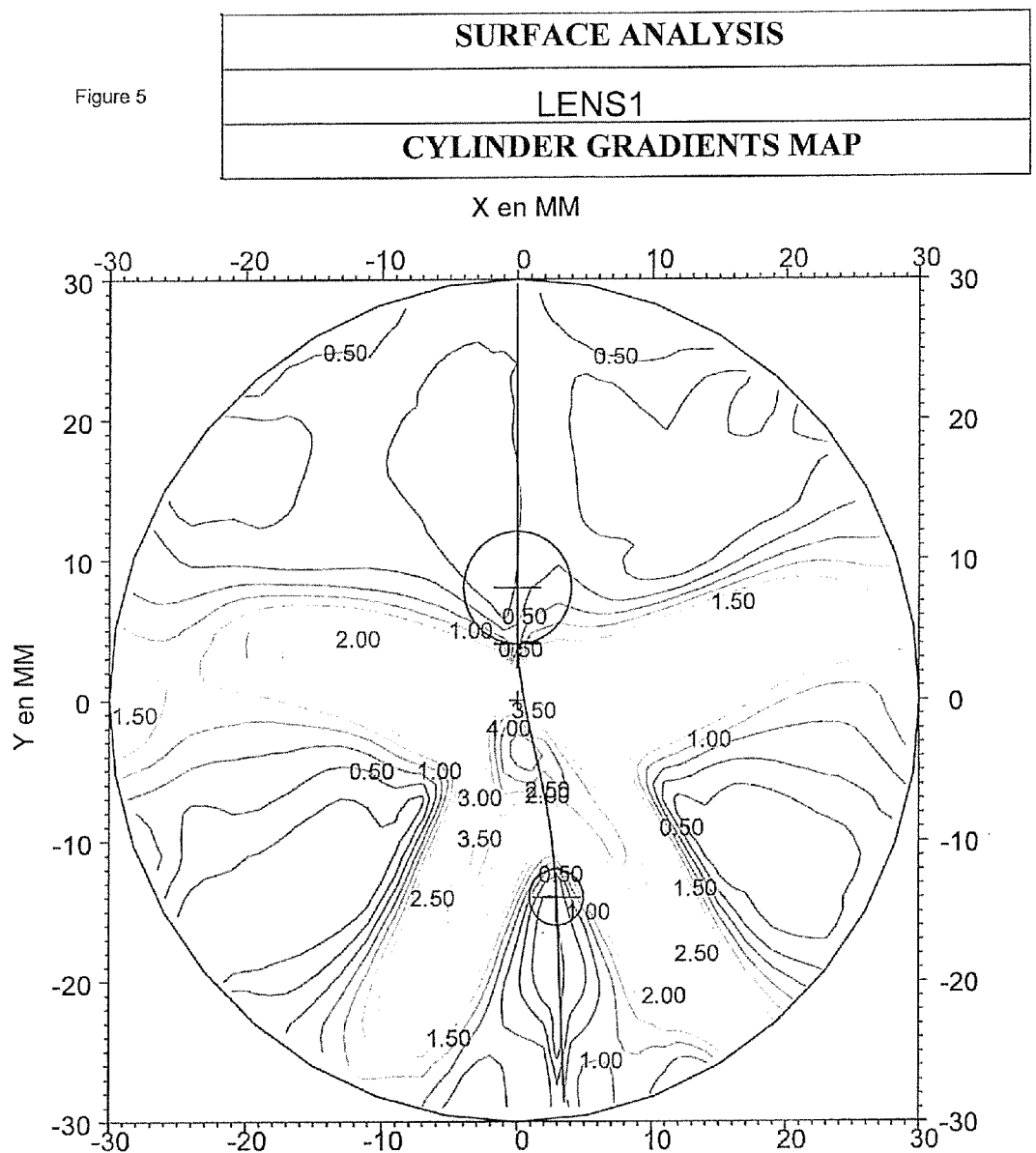

FIG. 1 is a graph of mean sphere variation relatively to the mean sphere value of the far vision control point along the meridian for the surface of the first comparative example. The x-axis is graduated in diopters and y-axis values in mm. The far vision control point has a x-axis value of 0 mm, a y-axis value of 8 mm on the surface, and has a sphere of 4.72 diopters and a cylinder of 0.02 diopters. The near vision control point has an x-axis value of 3 mm, a y-axis value of −14 mm on the surface, and has a sphere of 2.20 diopters and a cylinder of 0.04 diopters. The nominal surface addition is −2.52 diopters, calculated as the difference between mean spheres at the control points.

Figure 6:
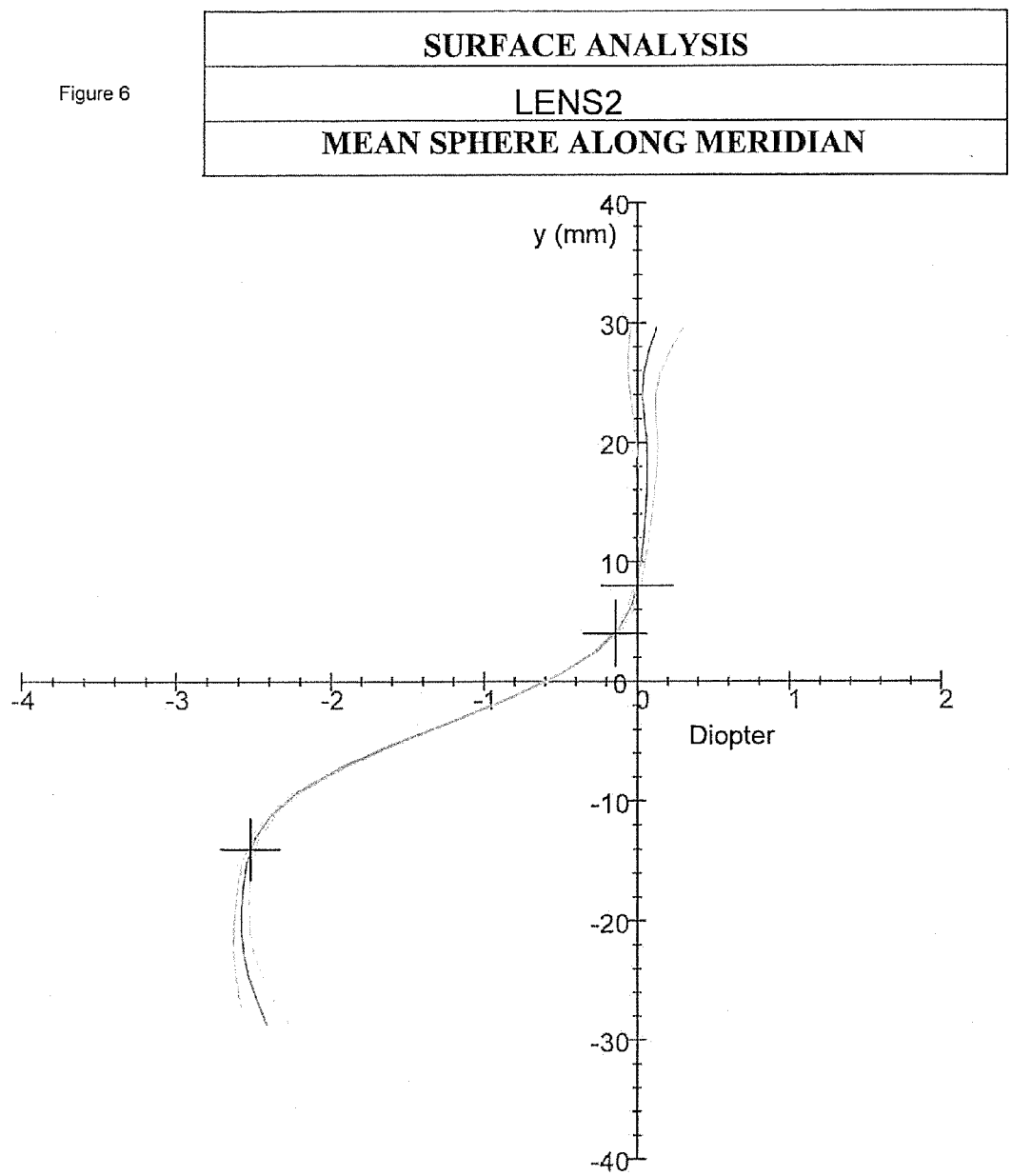
FIGS. 6 to 10 are a graph of mean sphere along the meridian, a map of mean sphere, a map of cylinder, a map of sphere gradient and a map of cylinder gradient respectively of a front surface of a semi-finished lens blank, according to a second comparative example.
Figure 7:
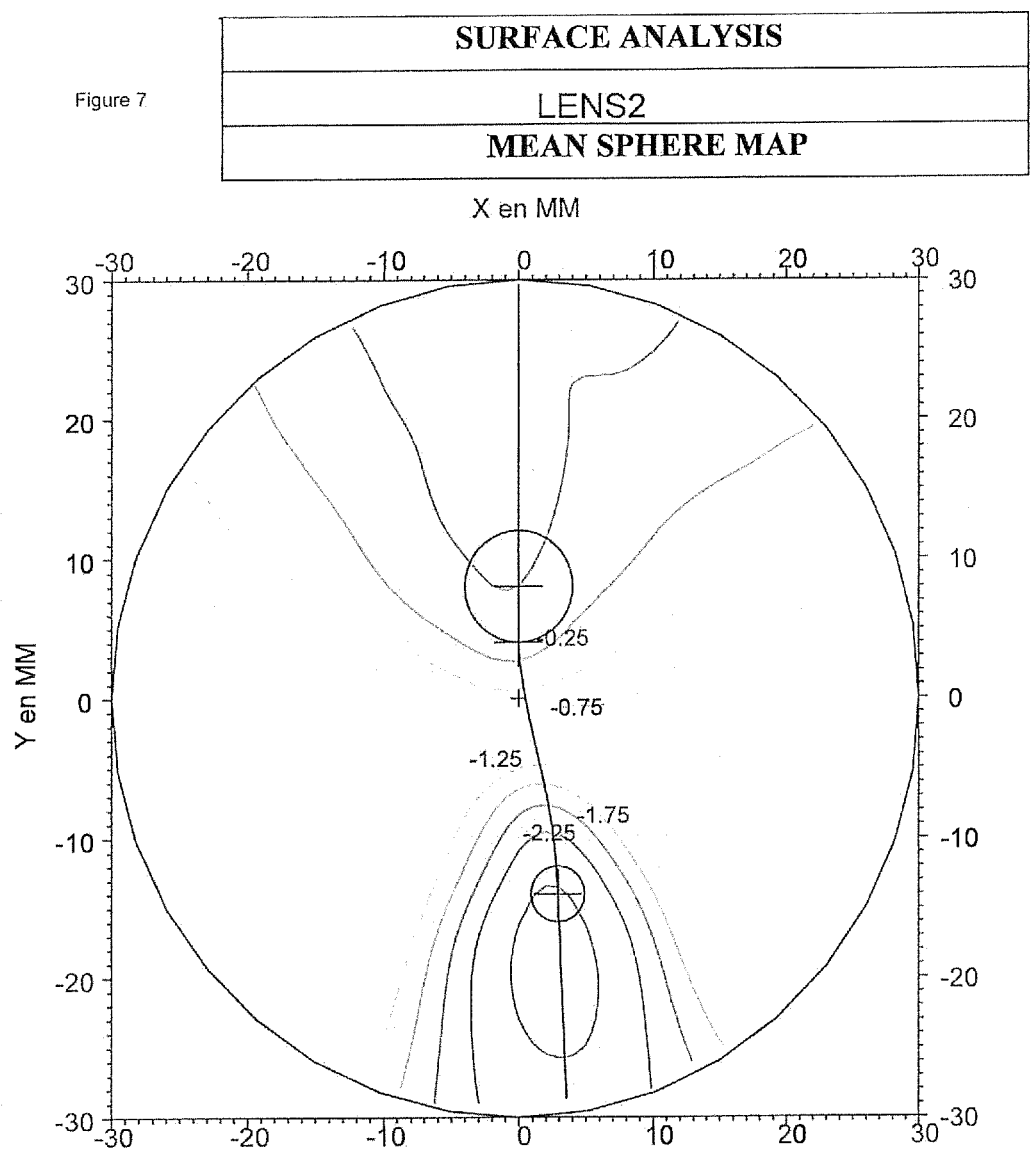
Figure 8:
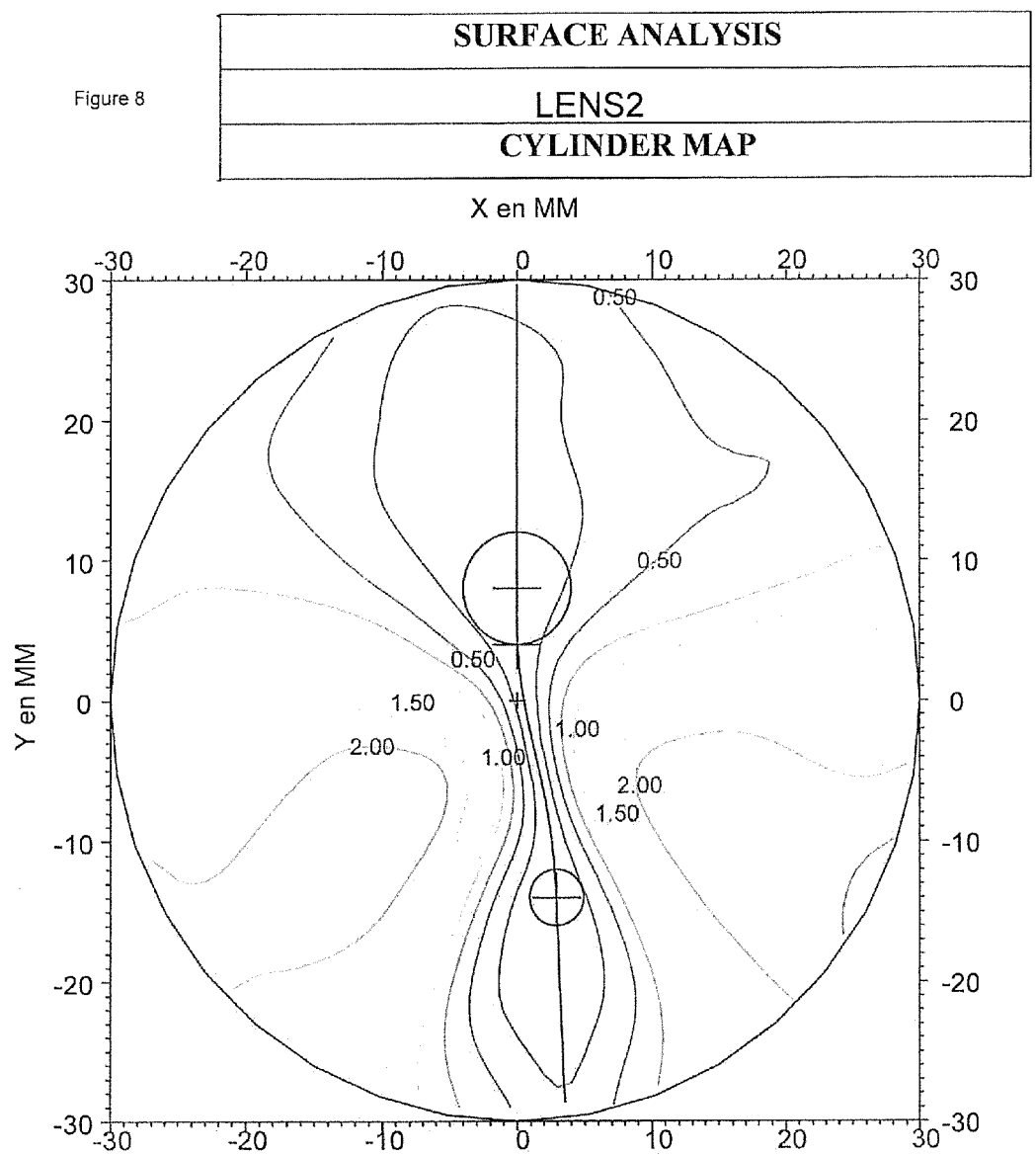
Figure 9:
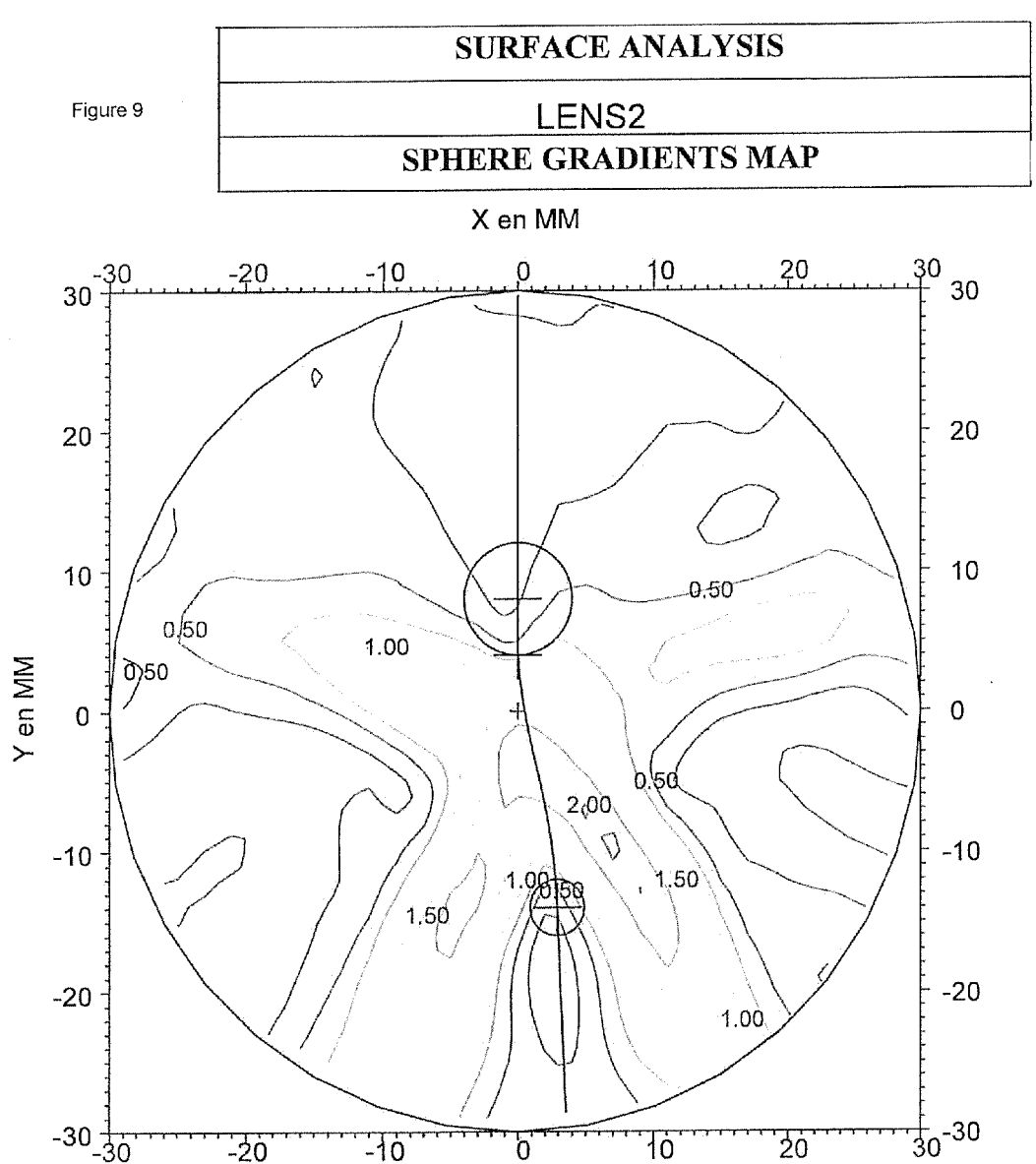
Figure 10:
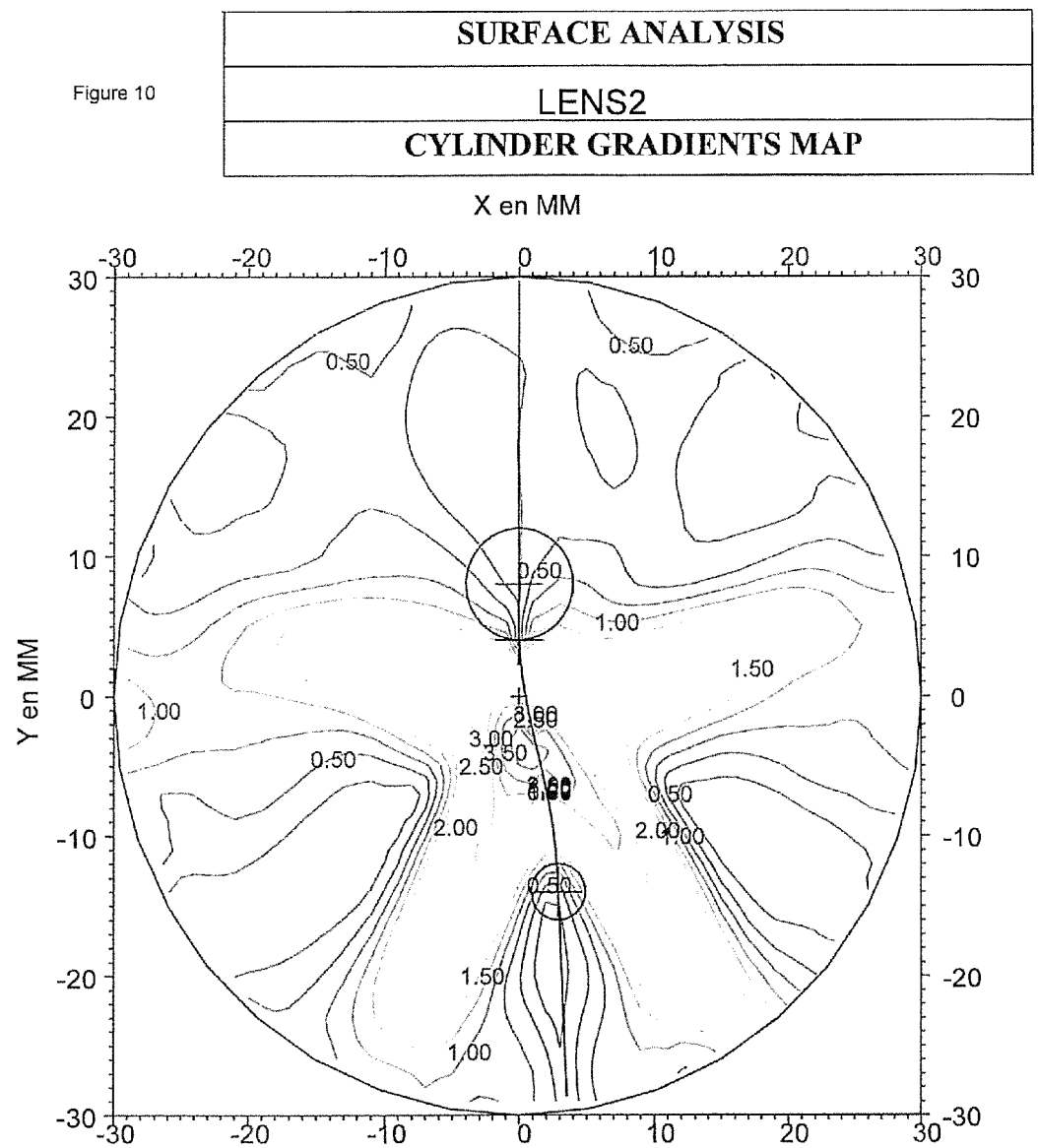

FIG. 6 is a graph of mean sphere variation relatively to the mean sphere value of the far vision control point along the meridian for the surface of the second comparative example. The x-axis is graduated in diopters and y-axis values in mm. The far vision control point has an x-axis value of 0 mm, a y-axis value of 8 mm on the surface, and has a sphere of 4.72 diopters and a cylinder of 0.02 diopters. The near vision control point has an x-axis value of 3 mm, a y-axis value of −14 mm on the surface, and has a sphere of 2.20 diopters and a cylinder of 0.06 diopters. The nominal surface addition is −2.52 diopters, calculated as the difference between mean spheres at the control points.

Figure 11:
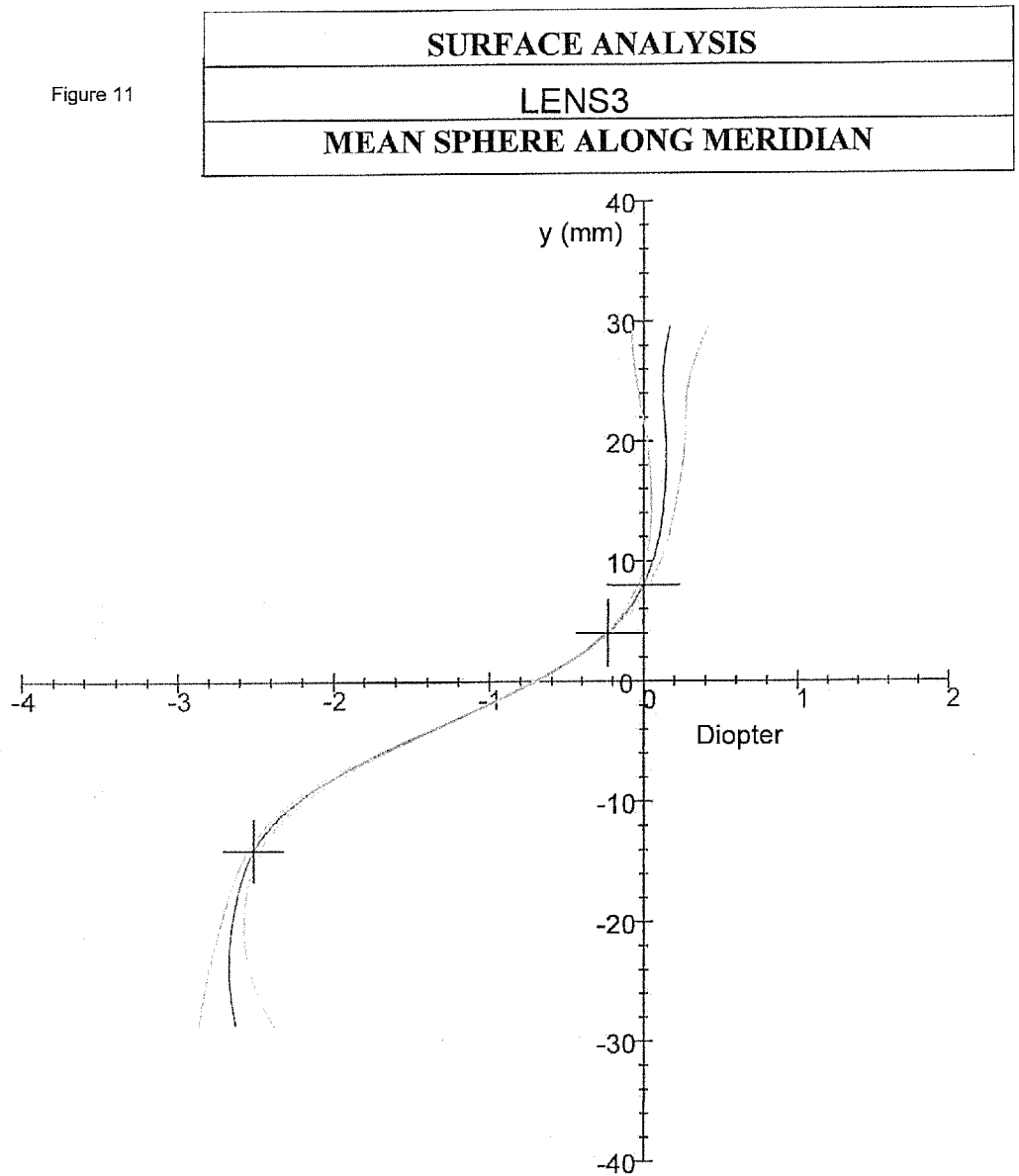
FIGS. 11 to 15 are a graph of mean sphere along the meridian, a map of mean sphere, a map of cylinder, a map of sphere gradient and a map of cylinder gradient respectively of a front surface of a semi-finished lens blank, according to a first embodiment of the invention.
Figure 12:
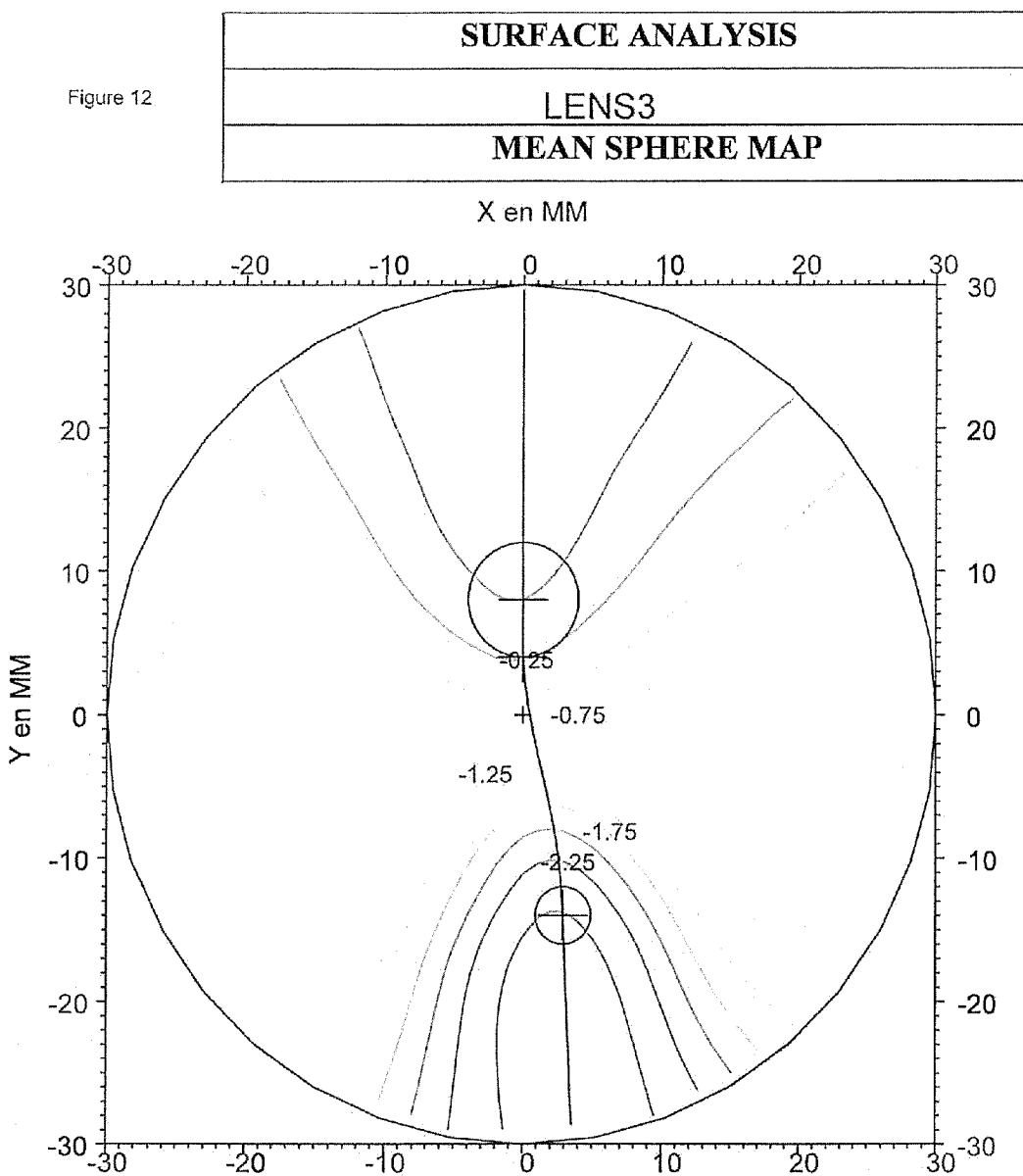
Figure 13:
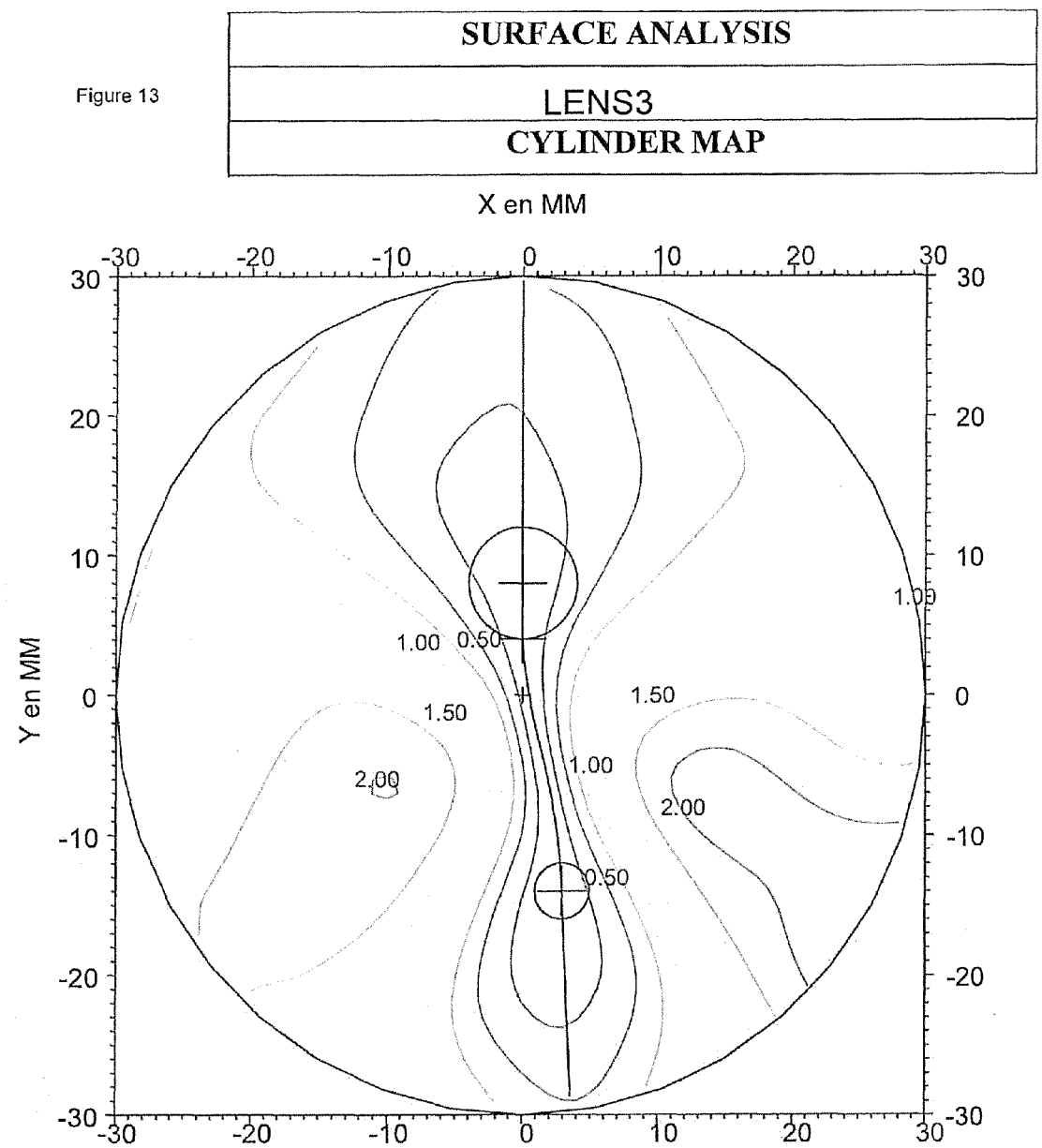
Figure 14:
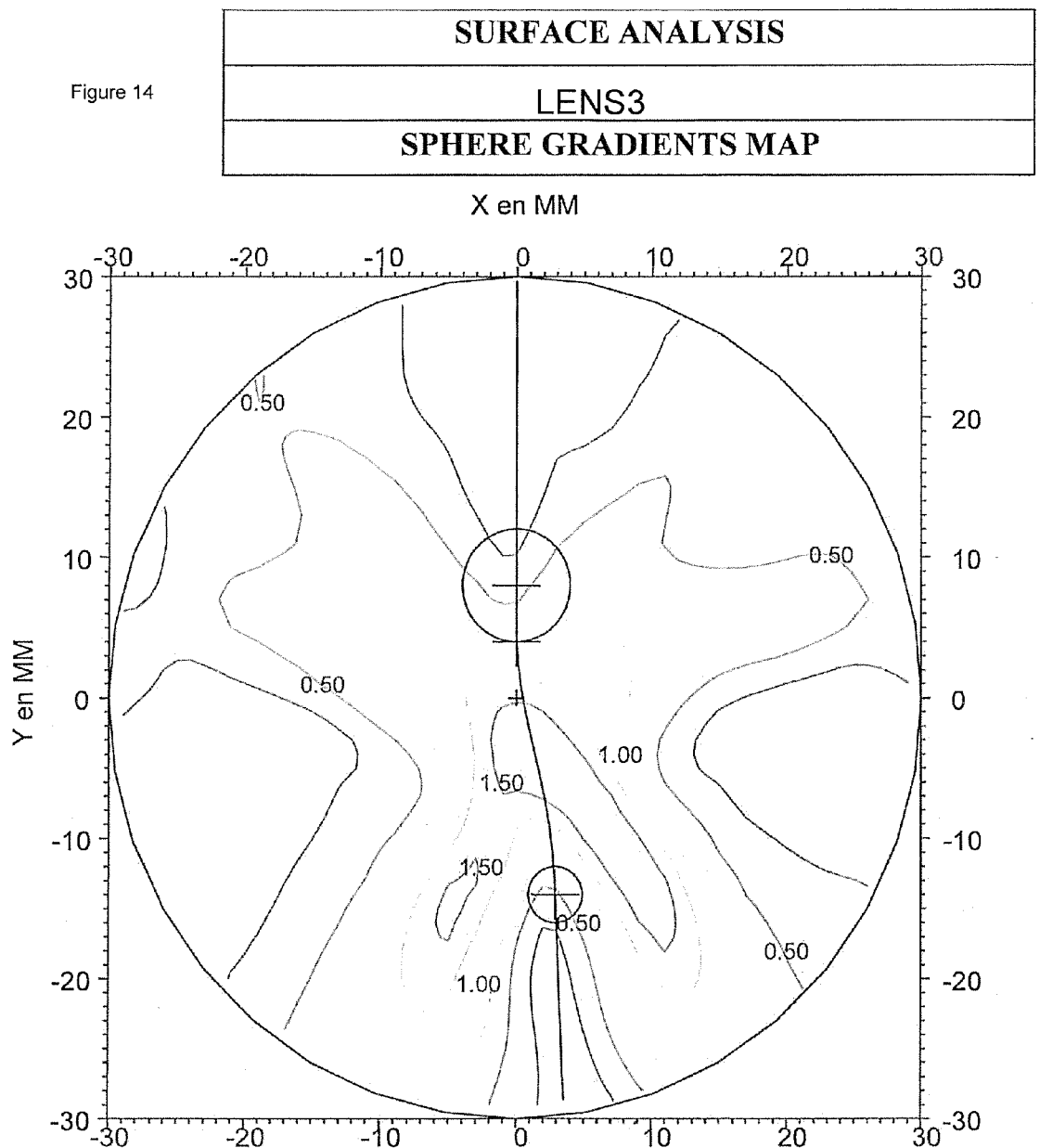
Figure 15:
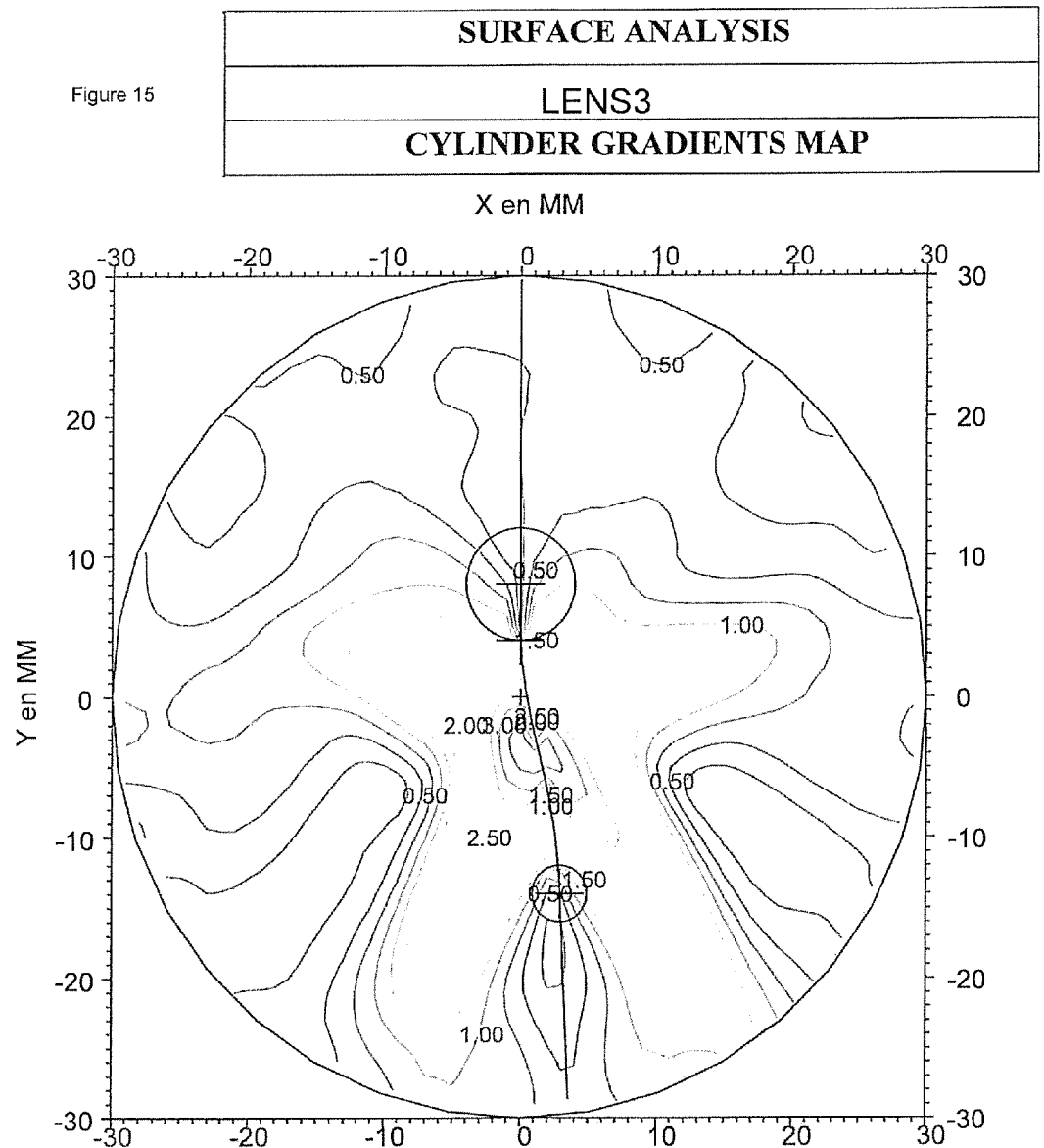

FIG. 11 is a graph of mean sphere along the meridian for the surface according to a first example of the invention. The x-axis is graduated in diopters and y-axis values in mm. The far vision control point has an x-axis value of 0 mm, a y-axis value of 8 mm on the surface, and has a sphere of 4.72 diopters and a cylinder of 0.07 diopters. The near vision control point has an x-axis value of 3 mm, a y-axis value of −14 mm on the surface, and has a sphere of 2.20 diopters and a cylinder of 0.08 diopters. The nominal surface addition is −2.51 diopters, calculated as the difference between mean spheres at the control points.

Figure 16:
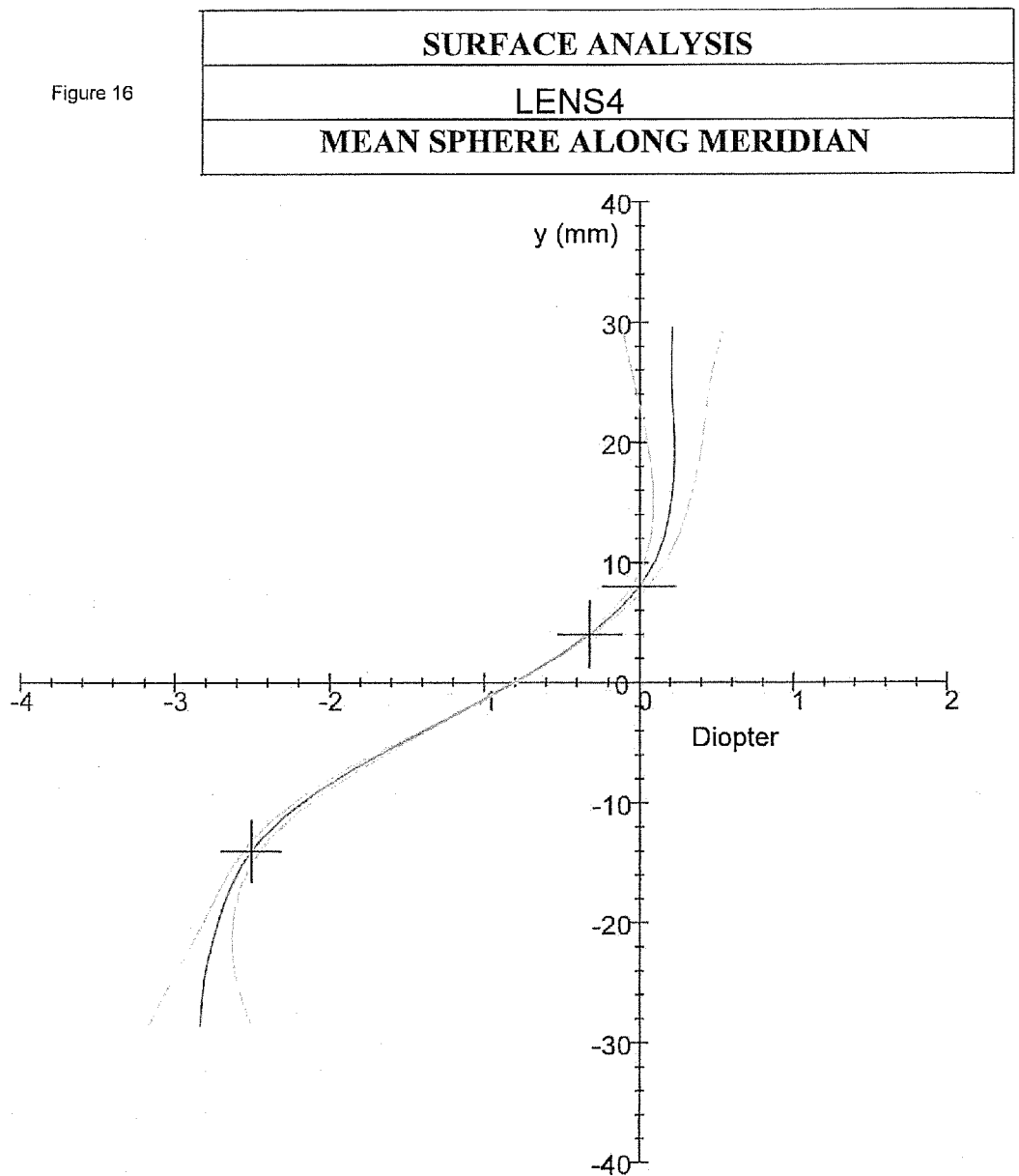
FIGS. 16 to 20 are a graph of mean sphere along the meridian, a map of mean sphere, a map of cylinder, a map of sphere gradient and a map of cylinder gradient respectively of a front surface of a semi-finished lens blank, according to a second embodiment of the invention.
Figure 17:
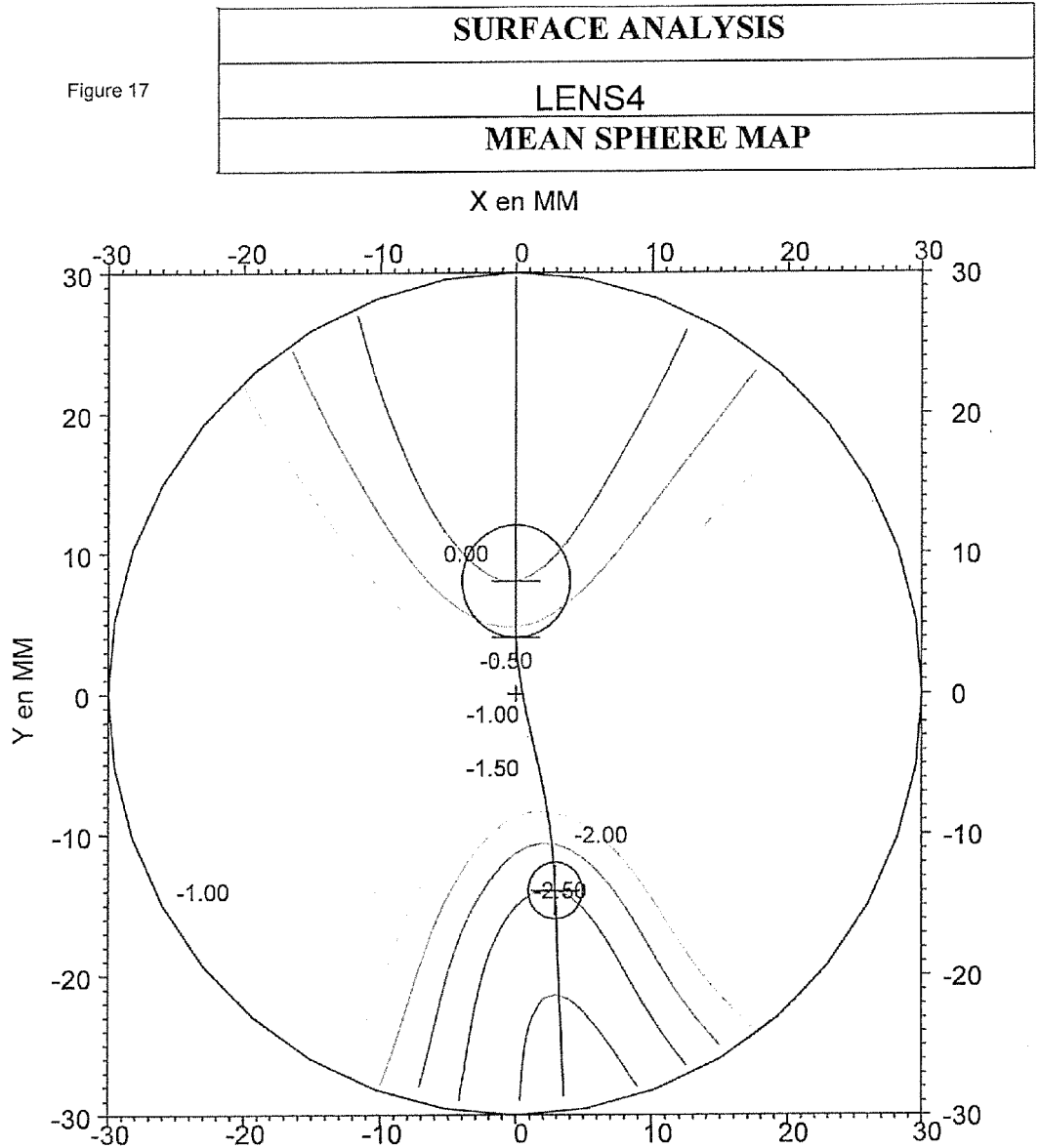
Figure 18:
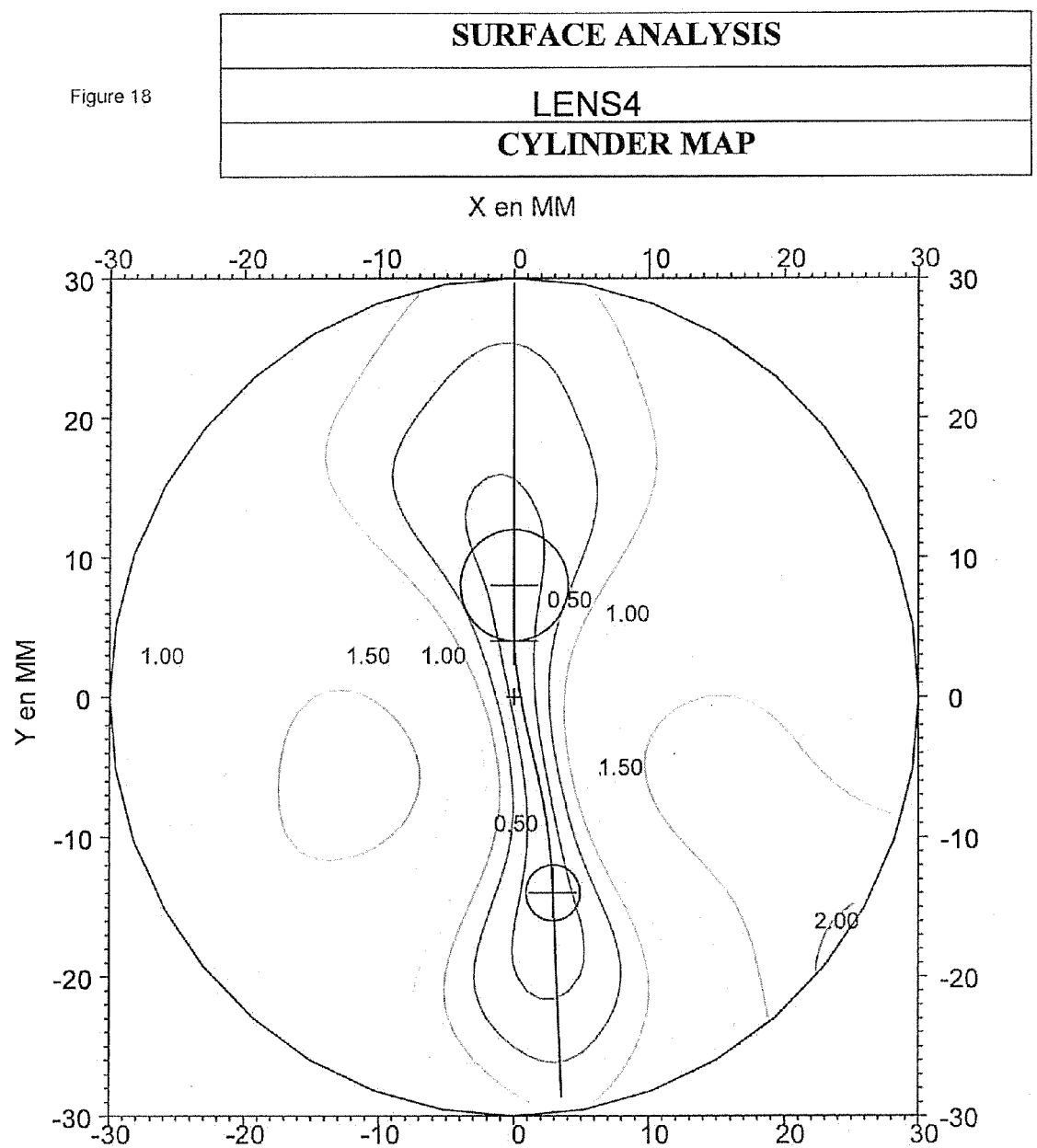
Figure 19:
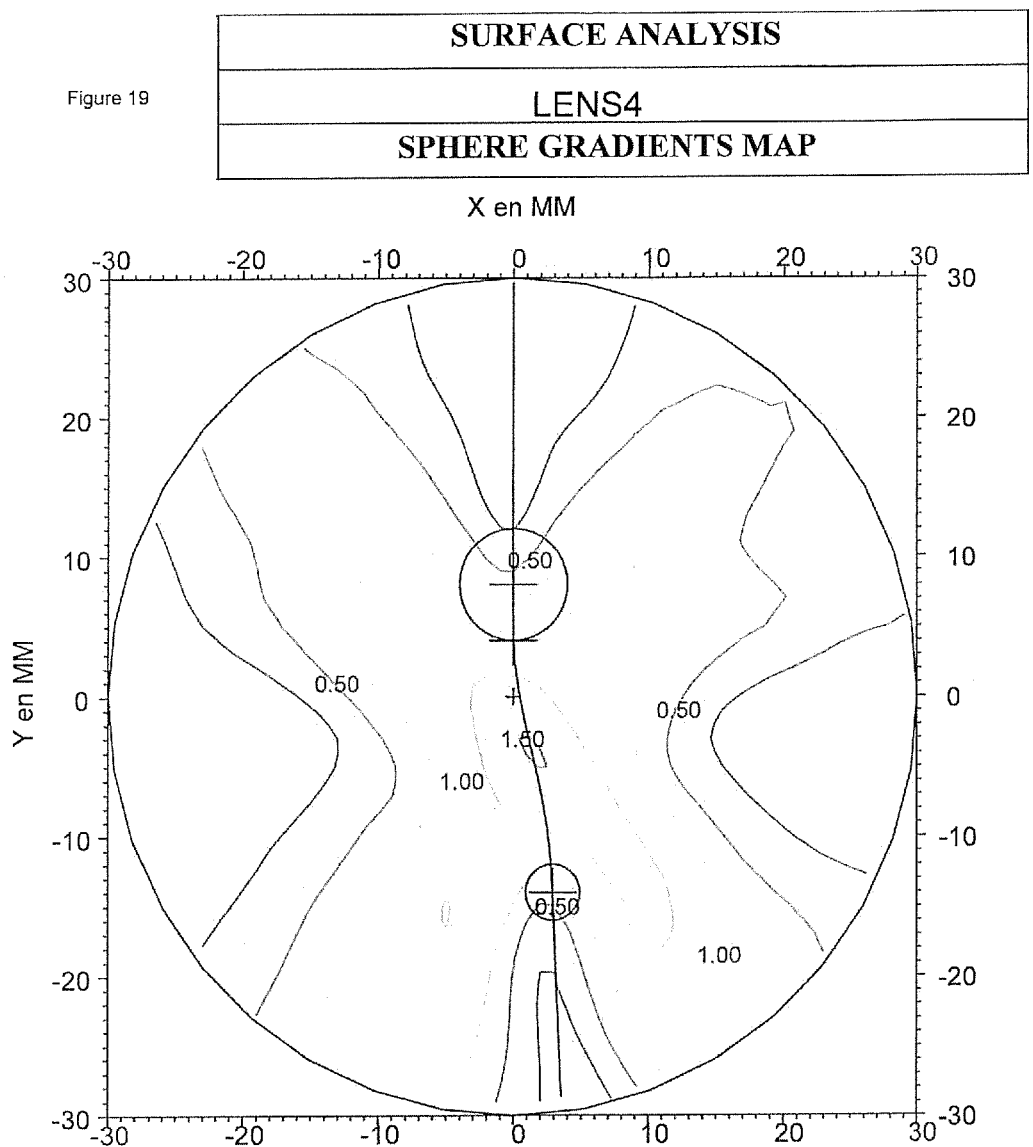
Figure 20:
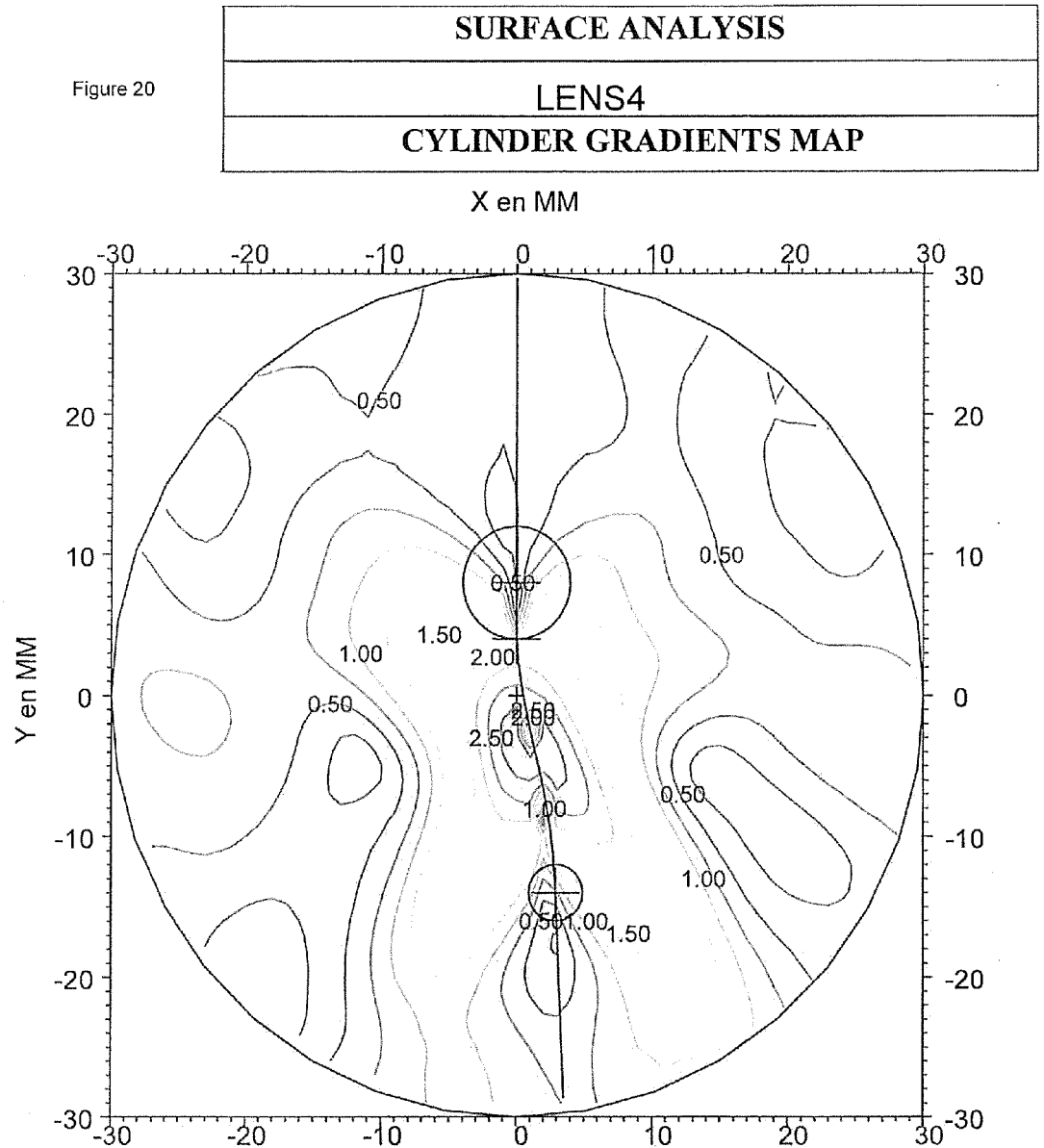

FIG. 16 is a graph of mean sphere along the meridian for the surface according to a second example of the invention. The x-axis is graduated in diopters and y-axis values in mm. The far vision control point has an x-axis value of 0 mm, a y-axis value of 8 mm on the surface, and has a sphere of 4.72 diopters and a cylinder of 0.07 diopters. The near vision control point has an x-axis value of 3 mm, a y-axis value of −14 mm on the surface, and has a sphere of 2.20 diopters and a cylinder of 0.08 diopters. The nominal surface addition is −2.51 diopters, calculated as the difference between mean spheres at the control points.

Figure 21:
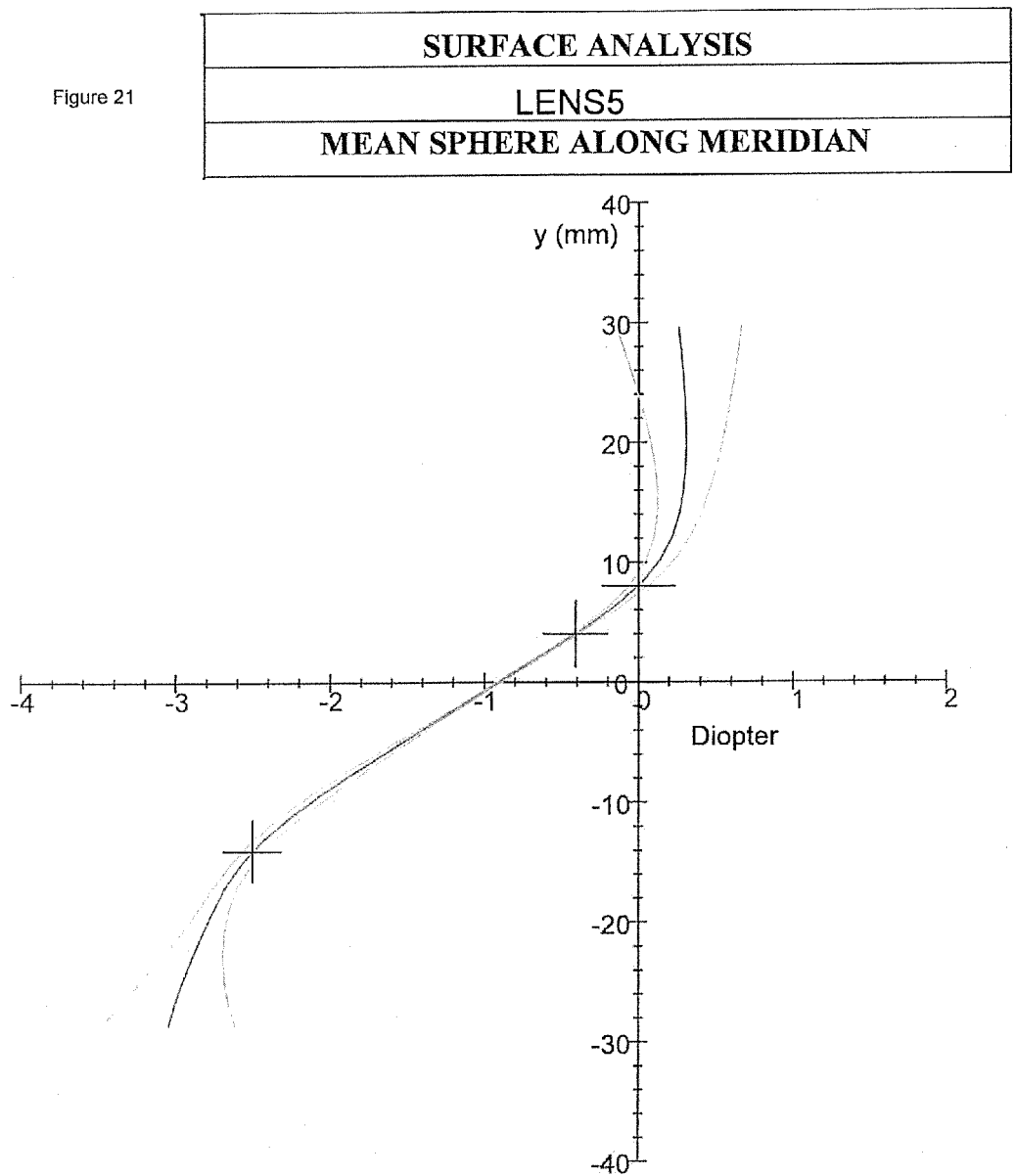
FIGS. 21 to 25 are a graph of mean sphere along the meridian, a map of mean sphere, a map of cylinder, a map of sphere gradient and a map of cylinder gradient respectively of a front surface of a semi-finished lens blank, according to a third embodiment of the invention.
Figure 22:
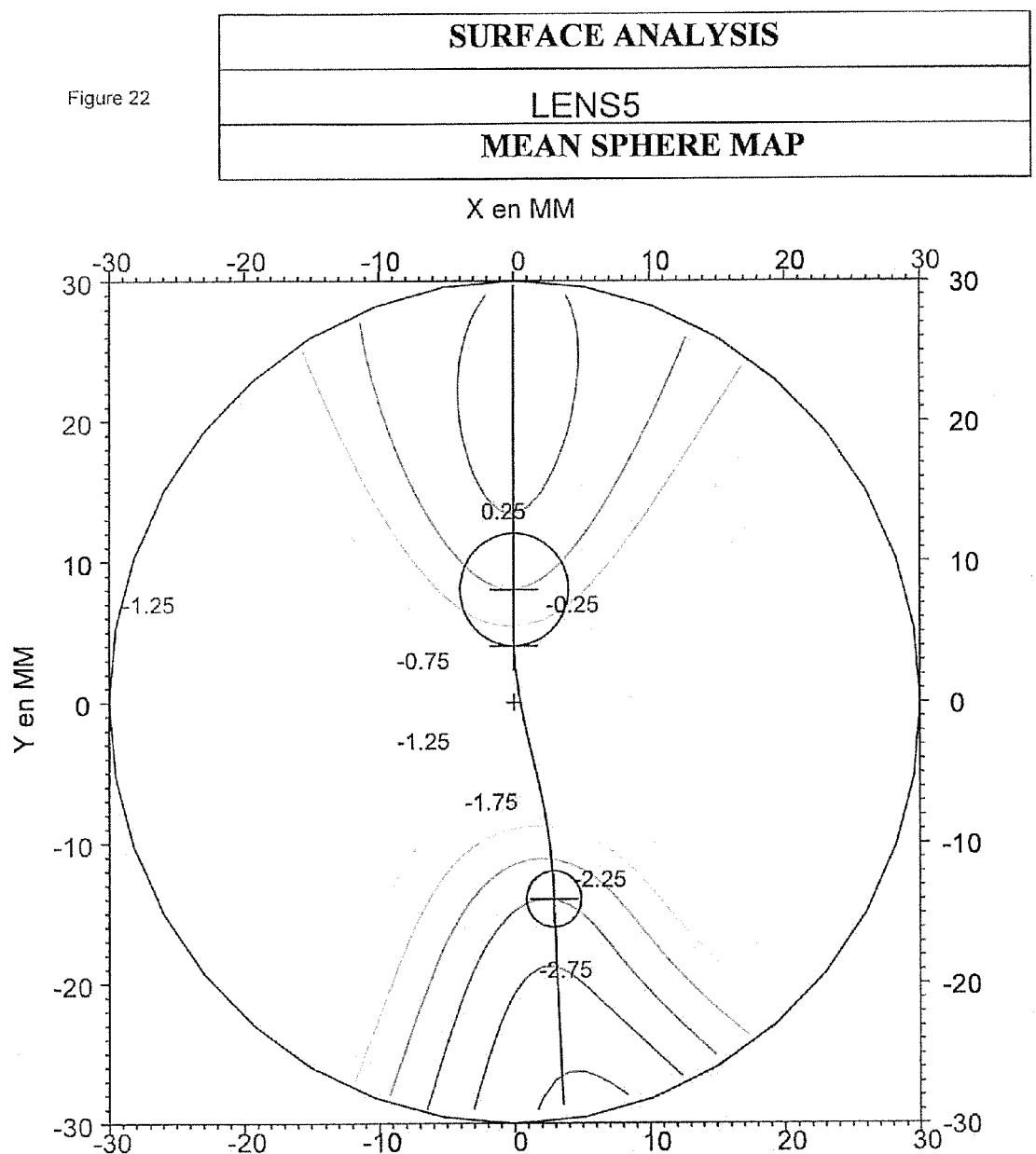
Figure 23:
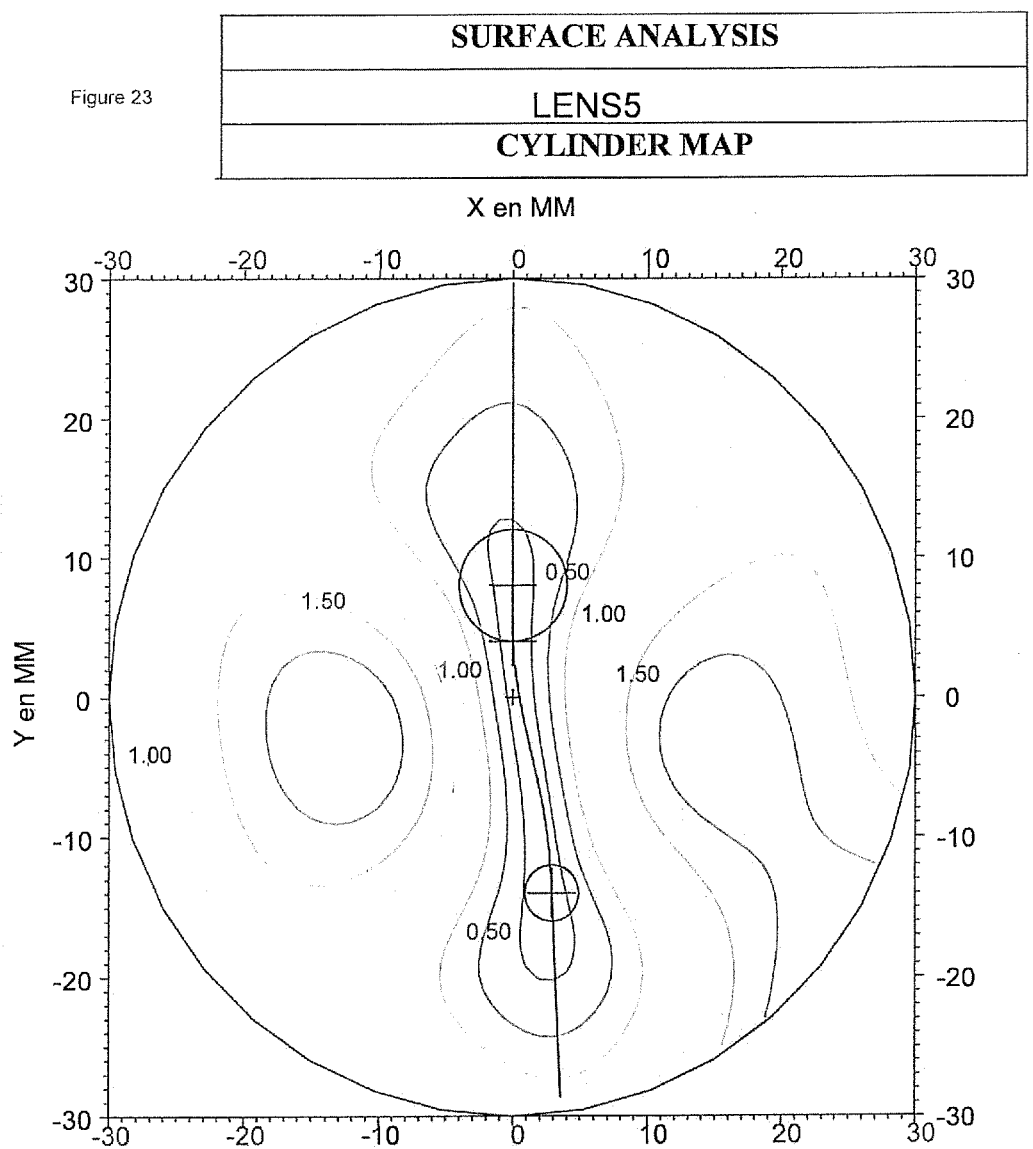
Figure 24:
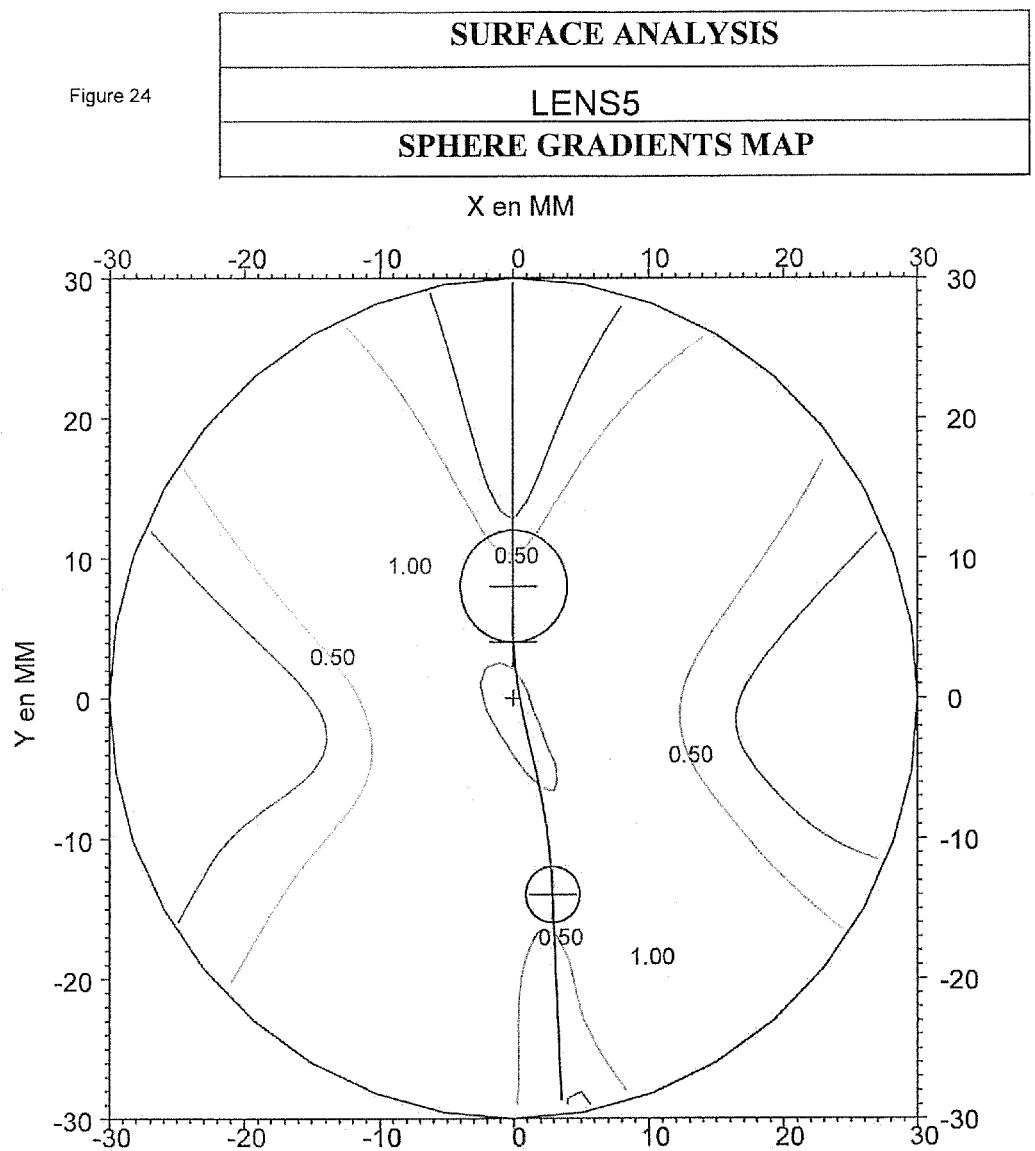
Figure 25:
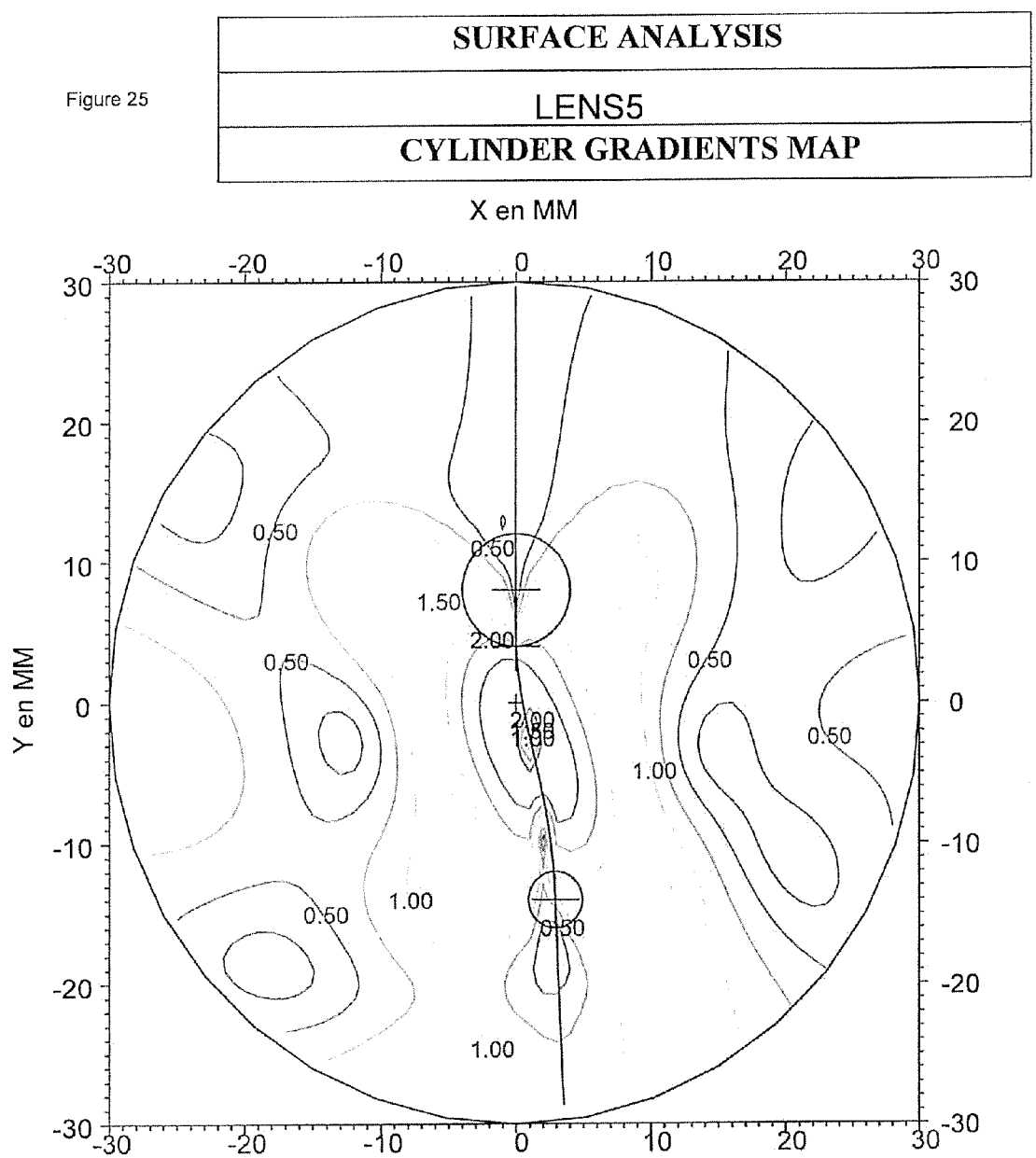
Figure 26:
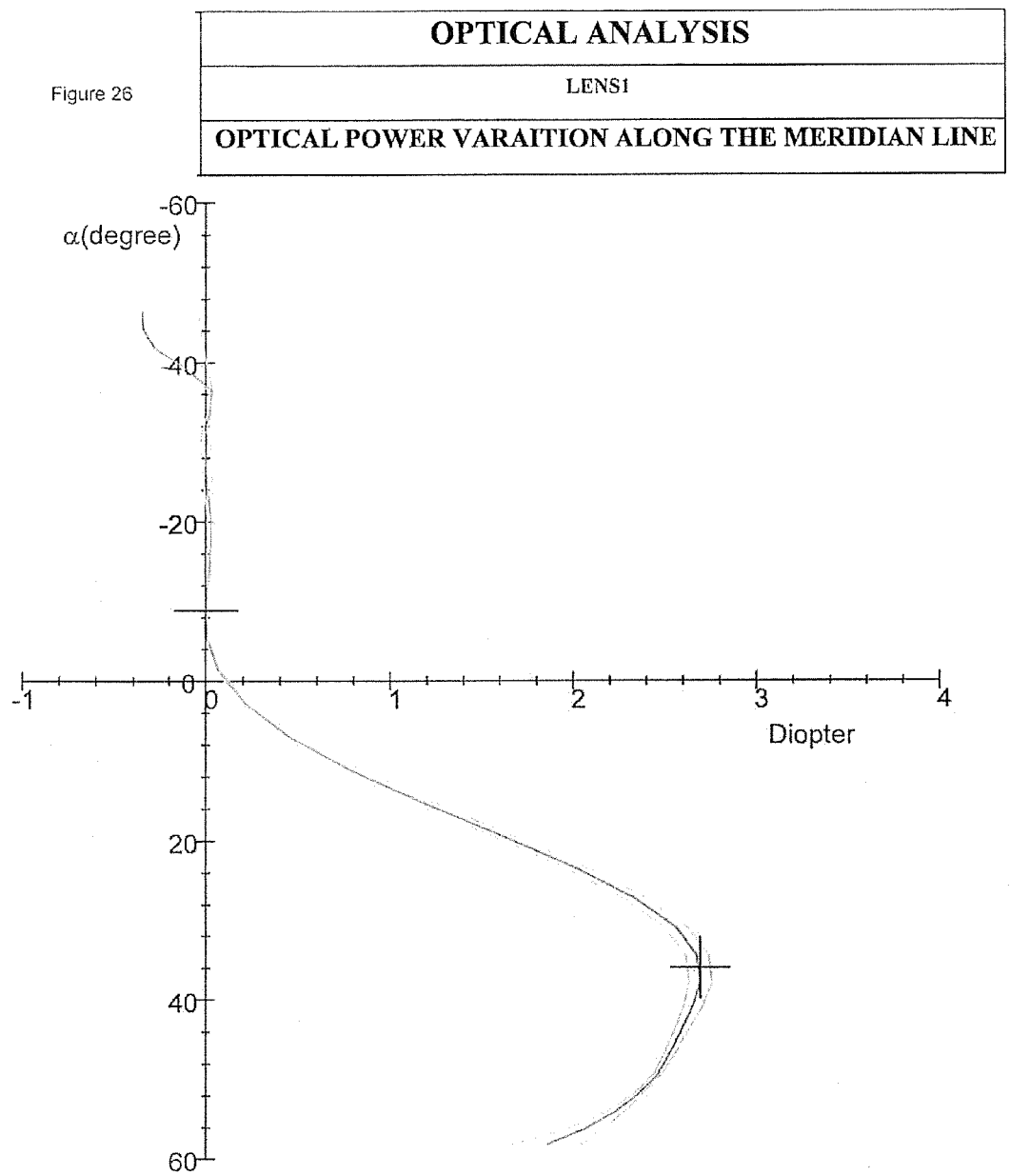
FIGS. 26 to 40 give optical analyses of the nominal performances of the lenses considered.
Figure 27:
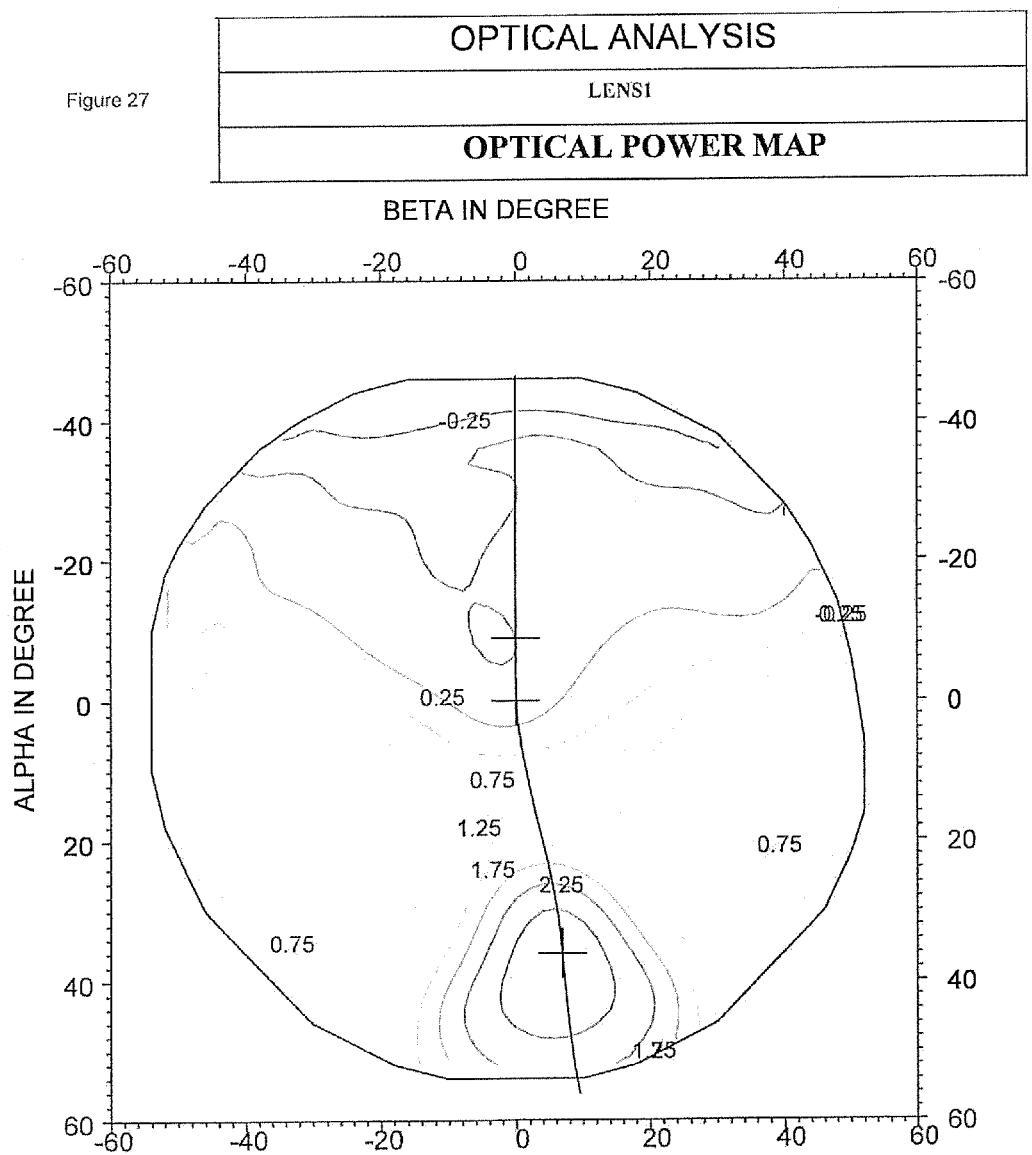
Figure 28:
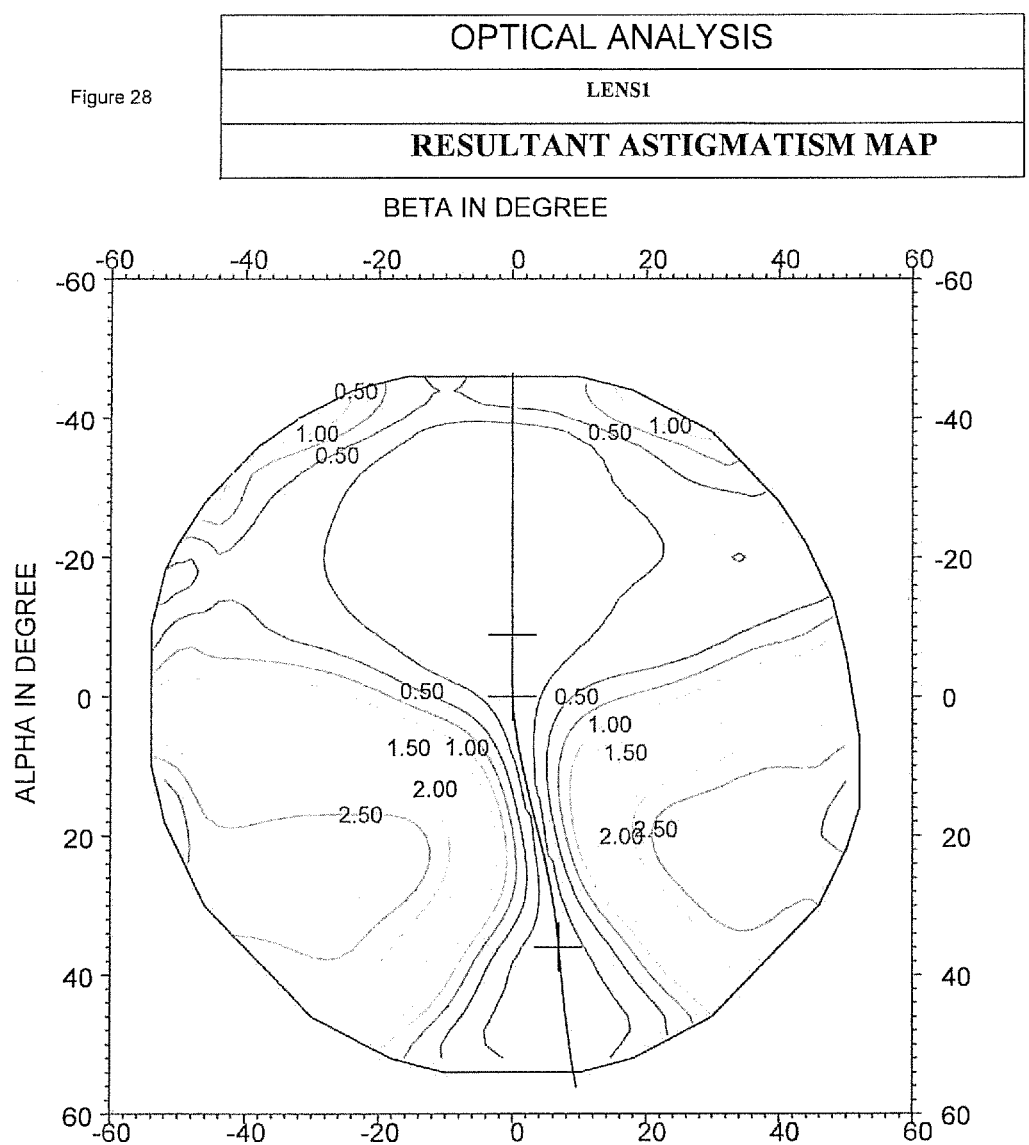
Figure 29:
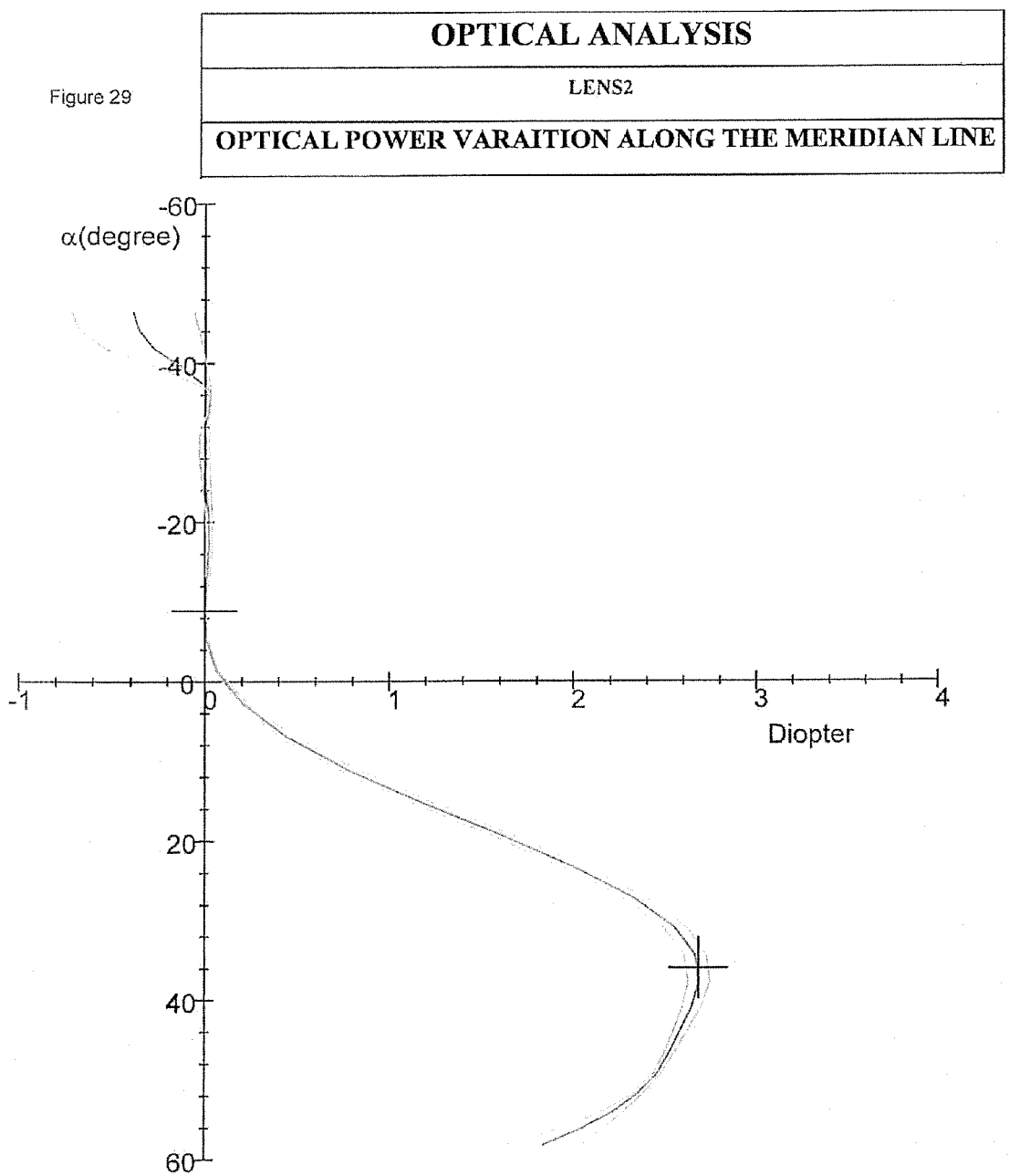
Figure 30:
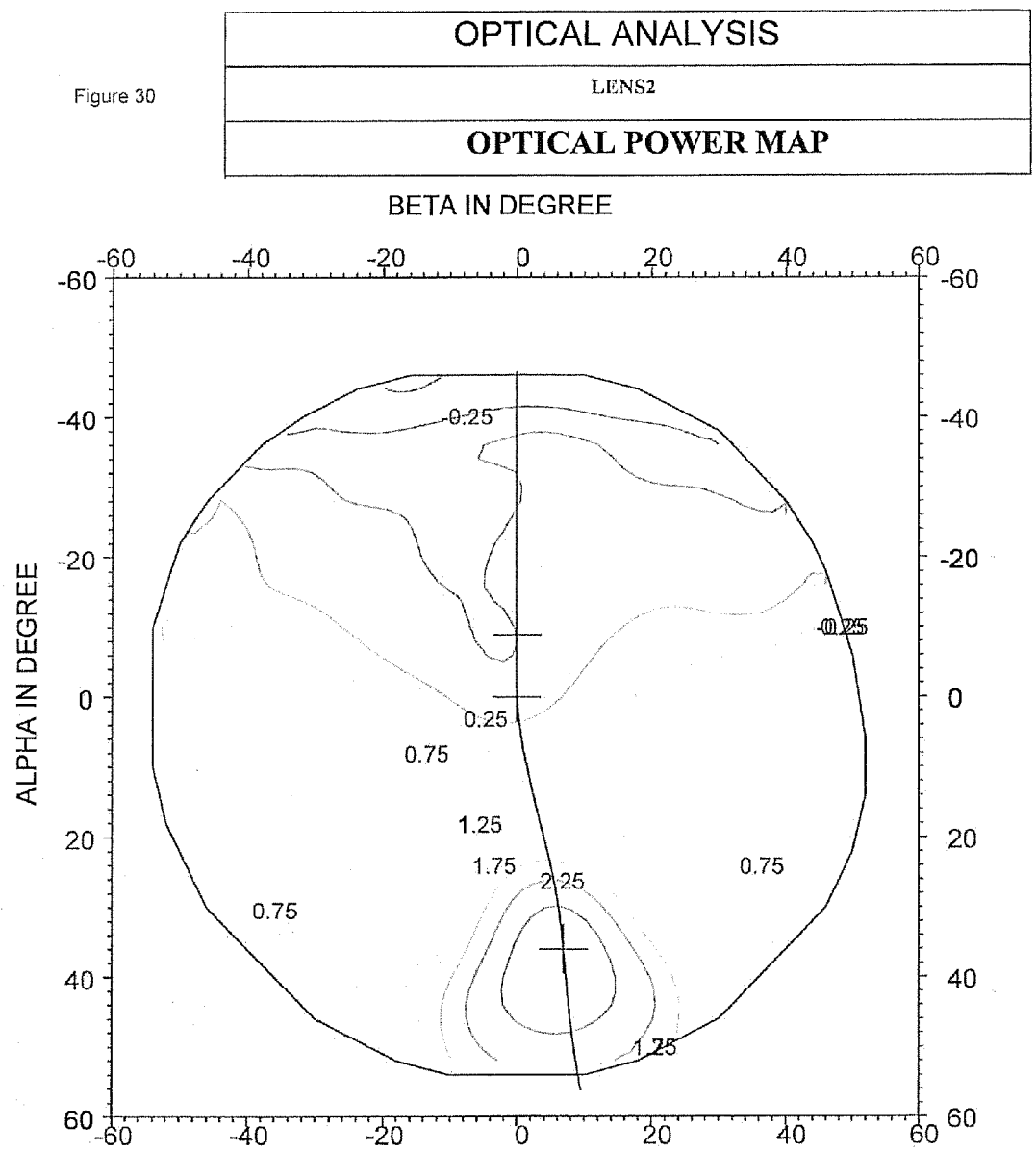
Figure 31:
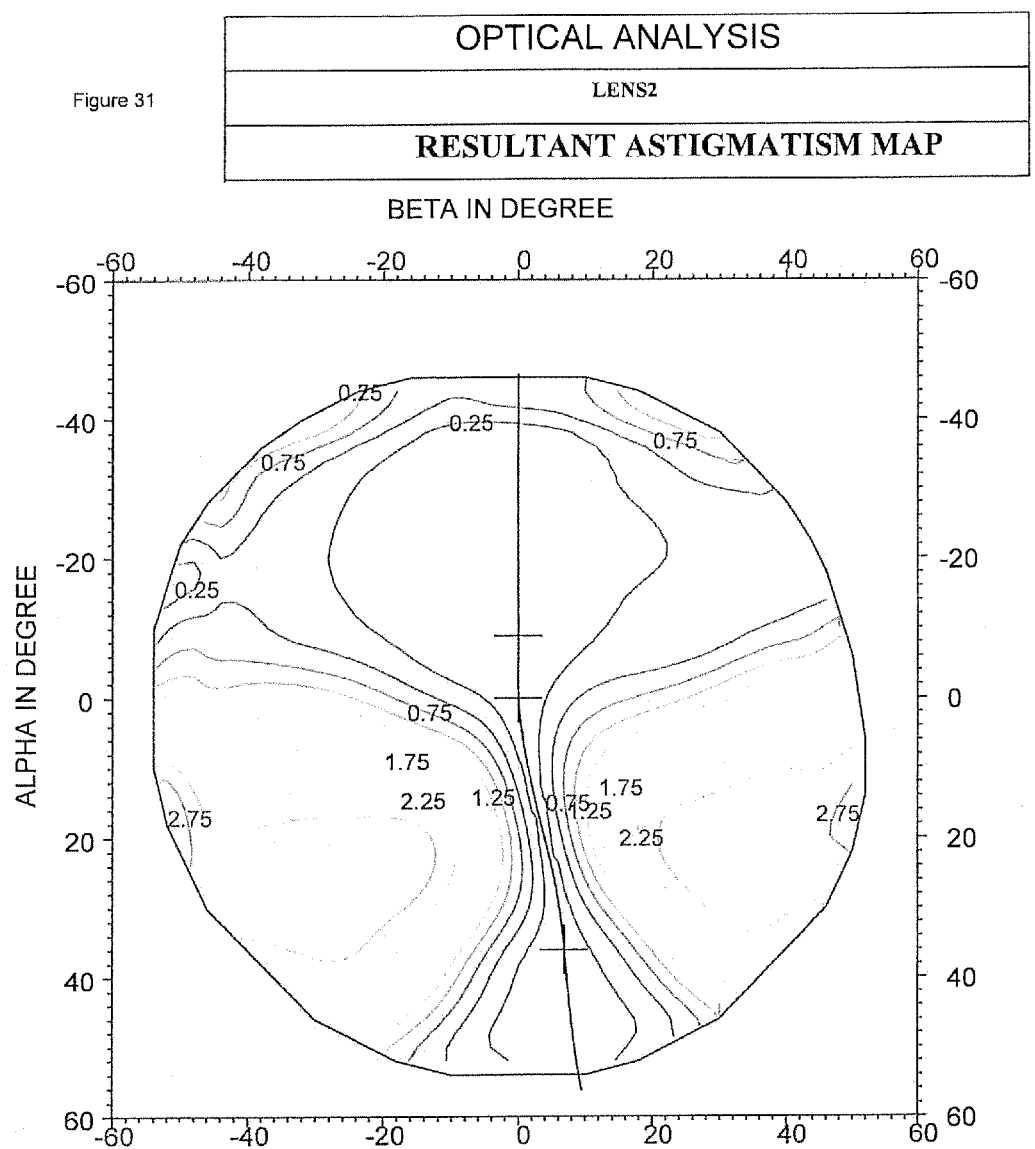
Figure 32:
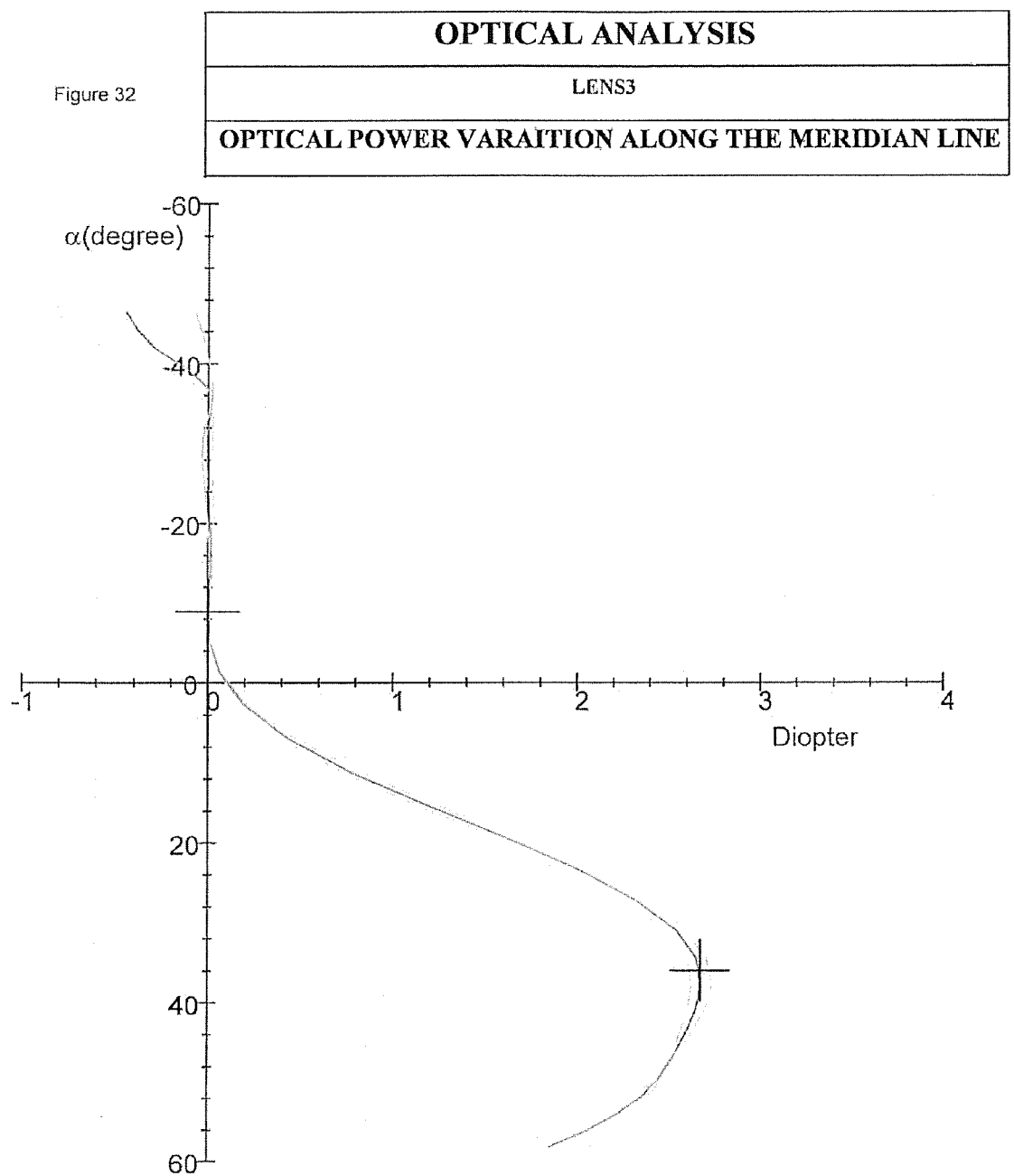
Figure 33:
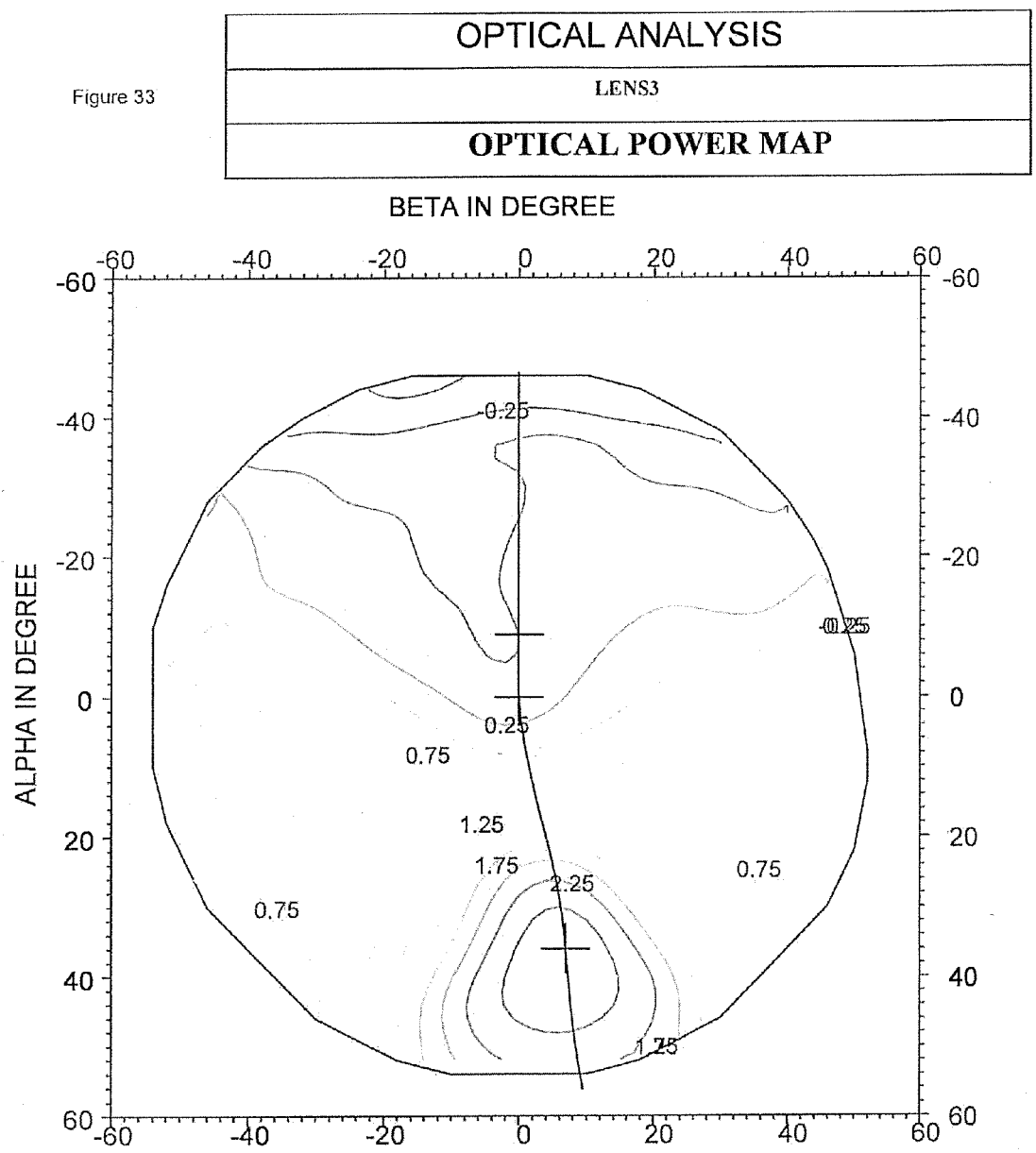
Figure 34:
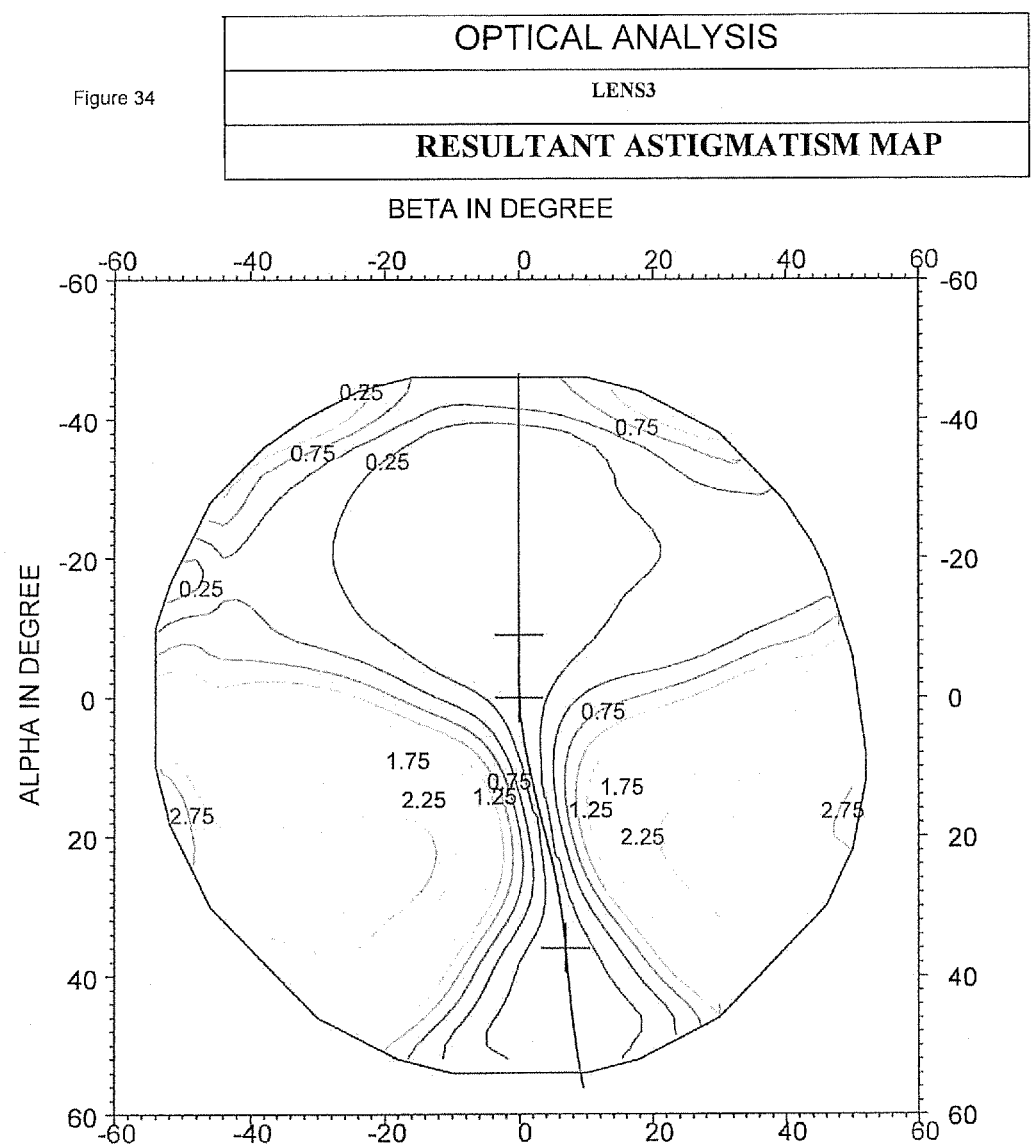
Figure 35:
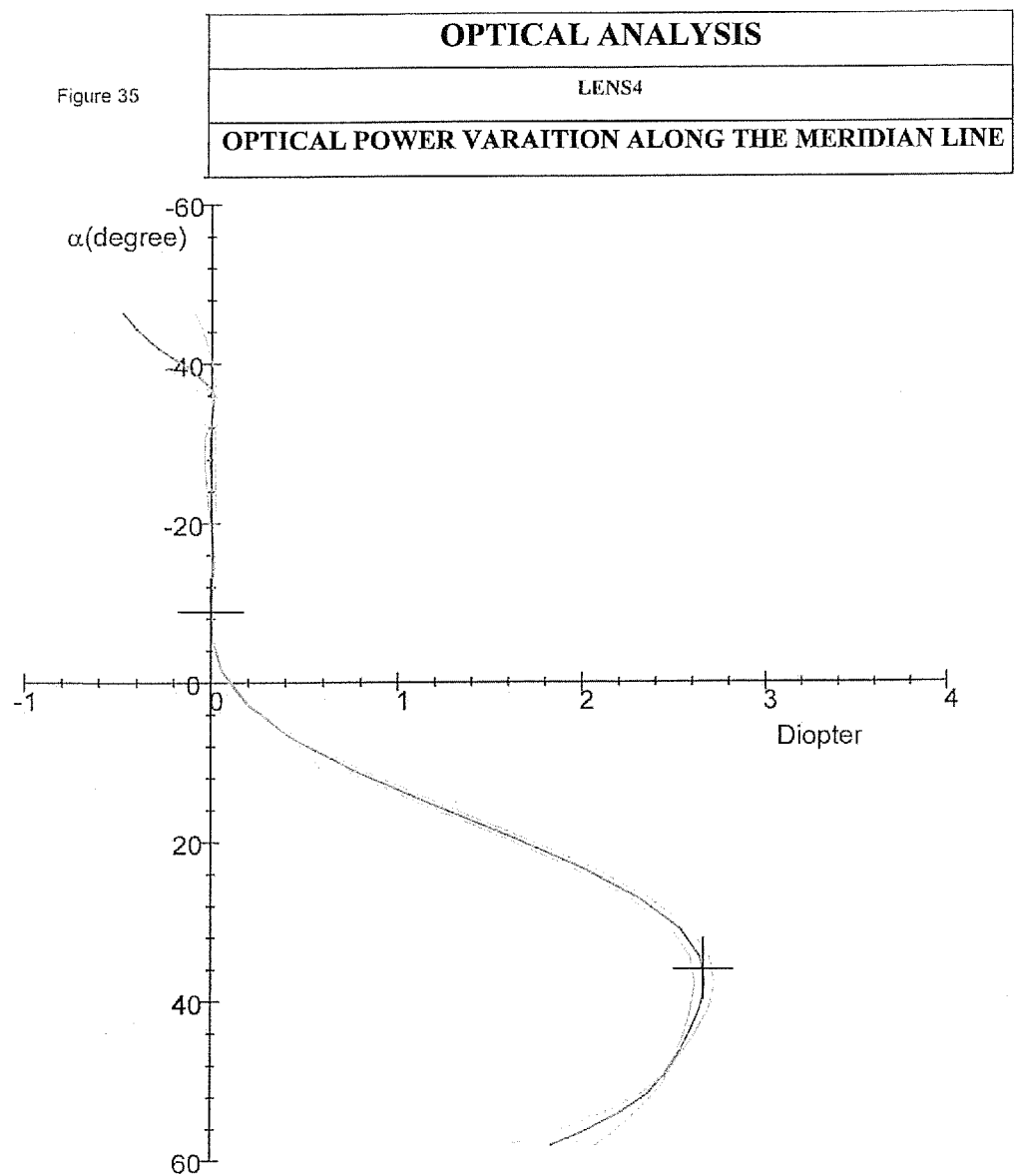
Figure 36:
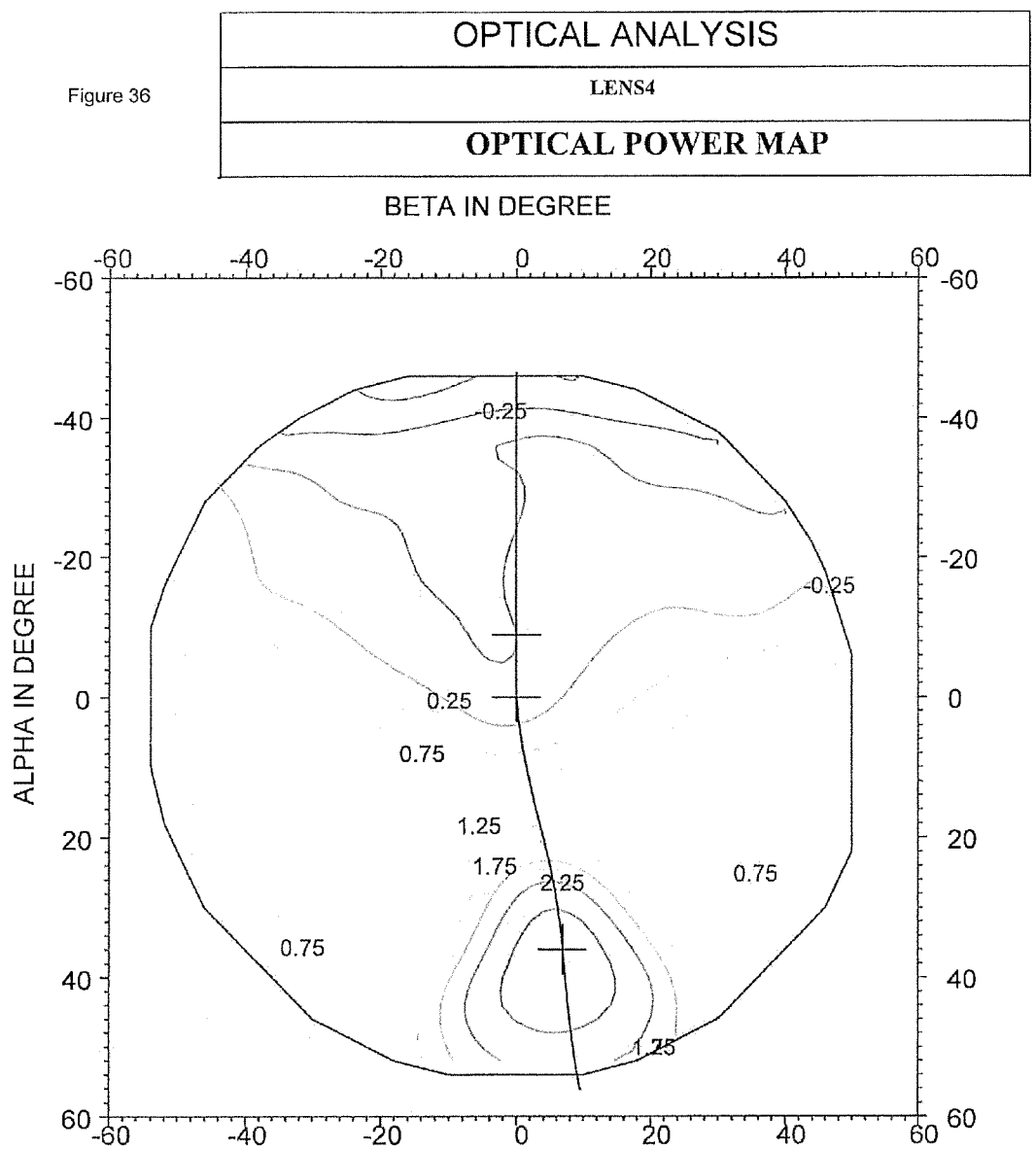
Figure 37:
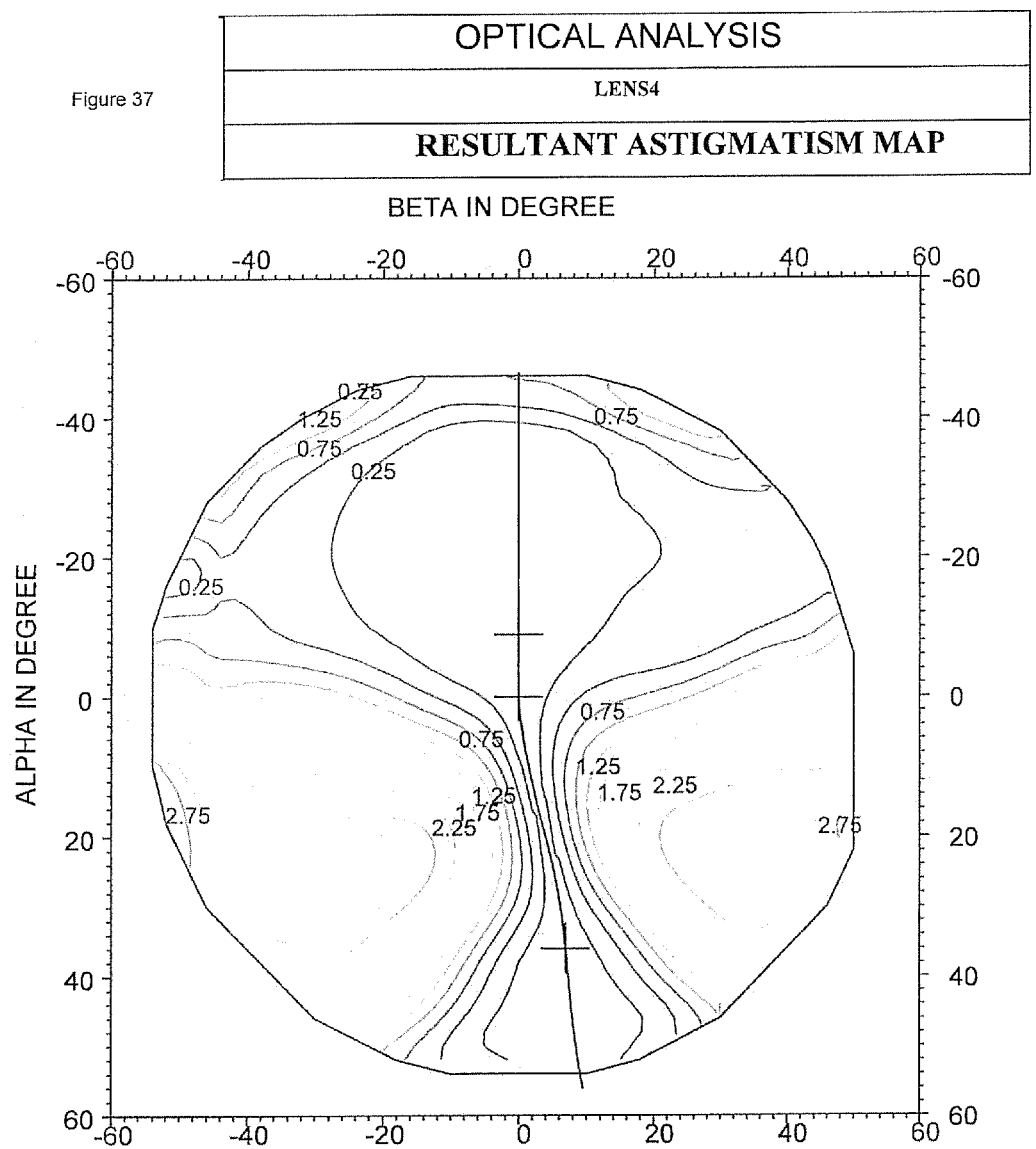
Figure 38:
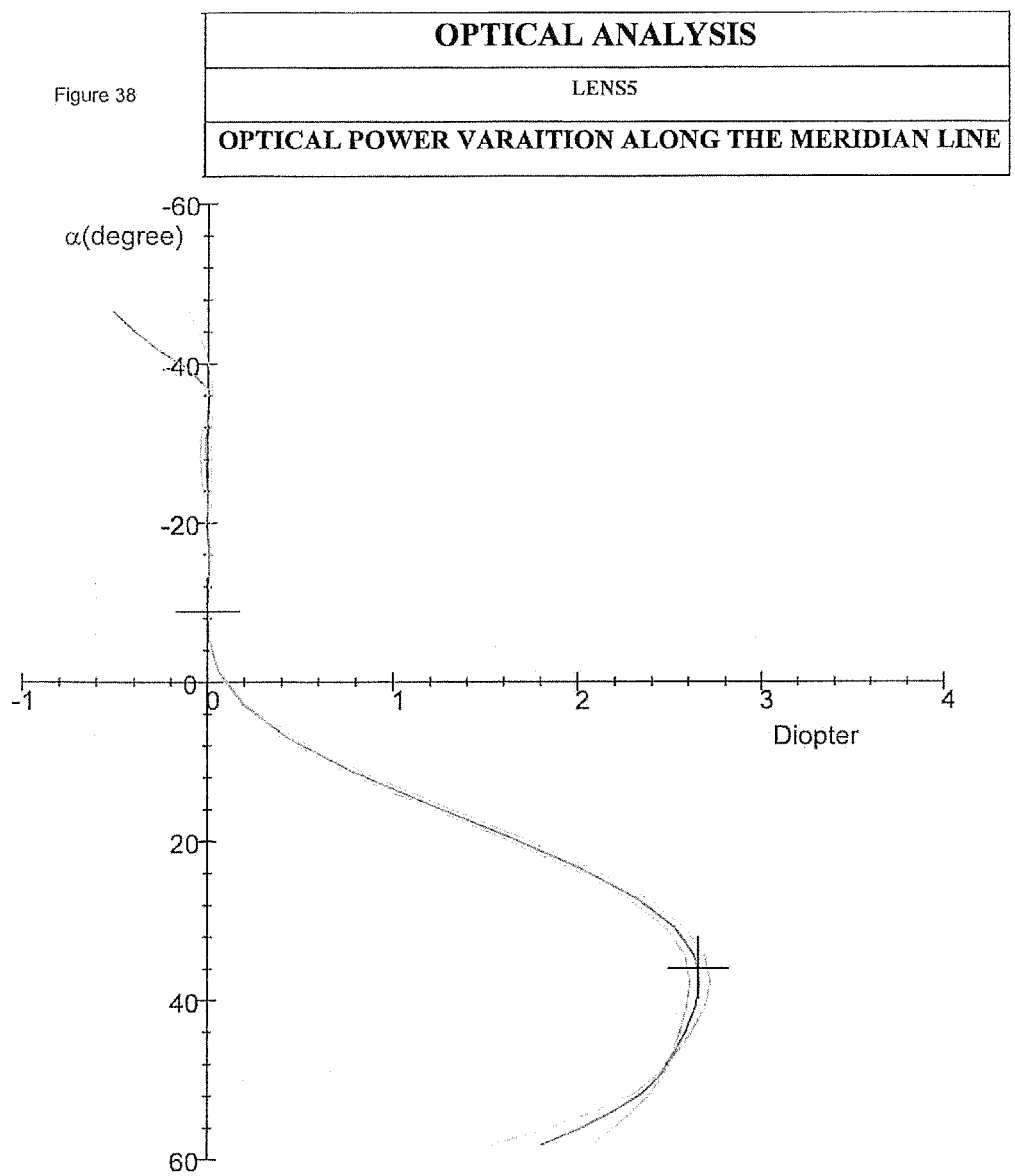
Figure 39:
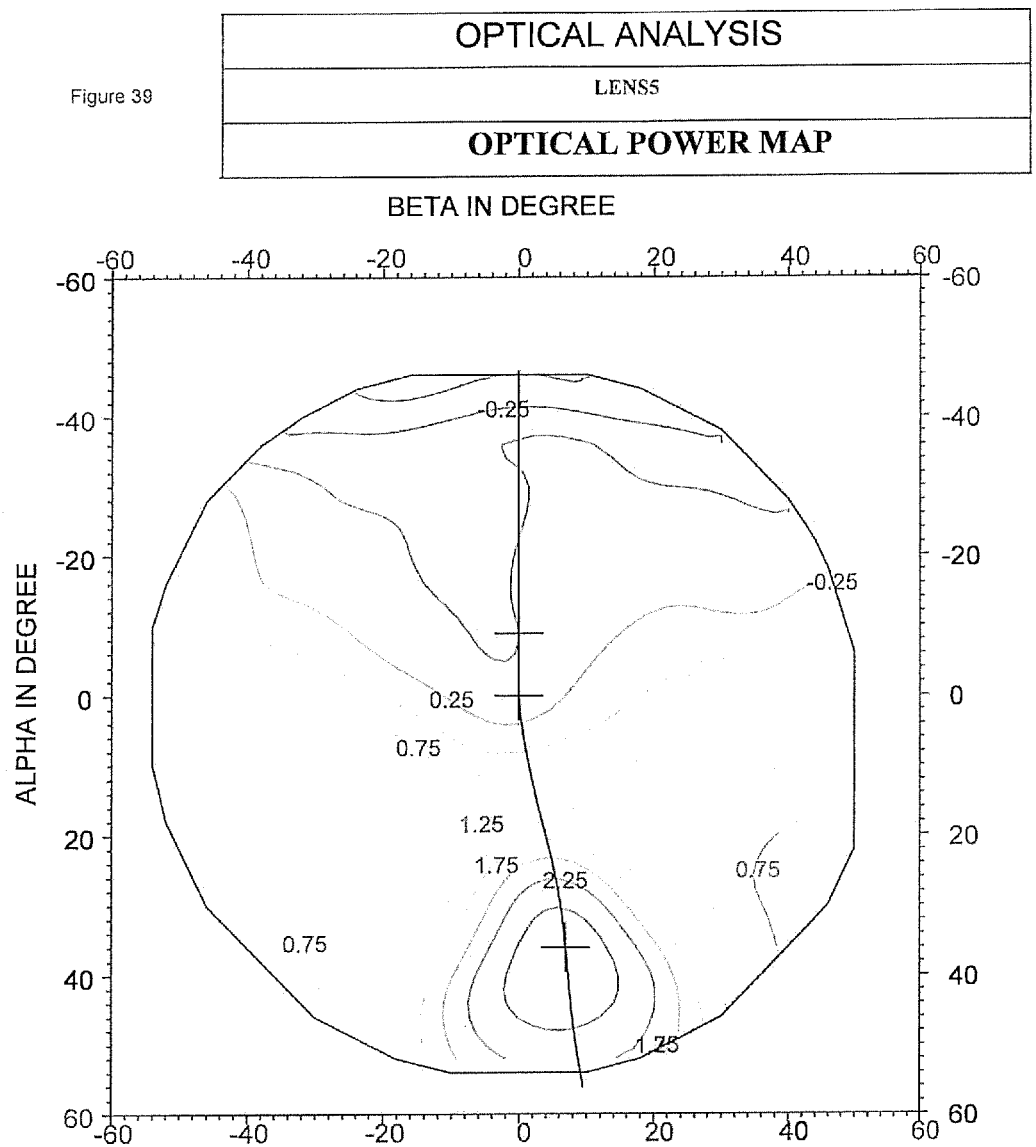
Figure 40:
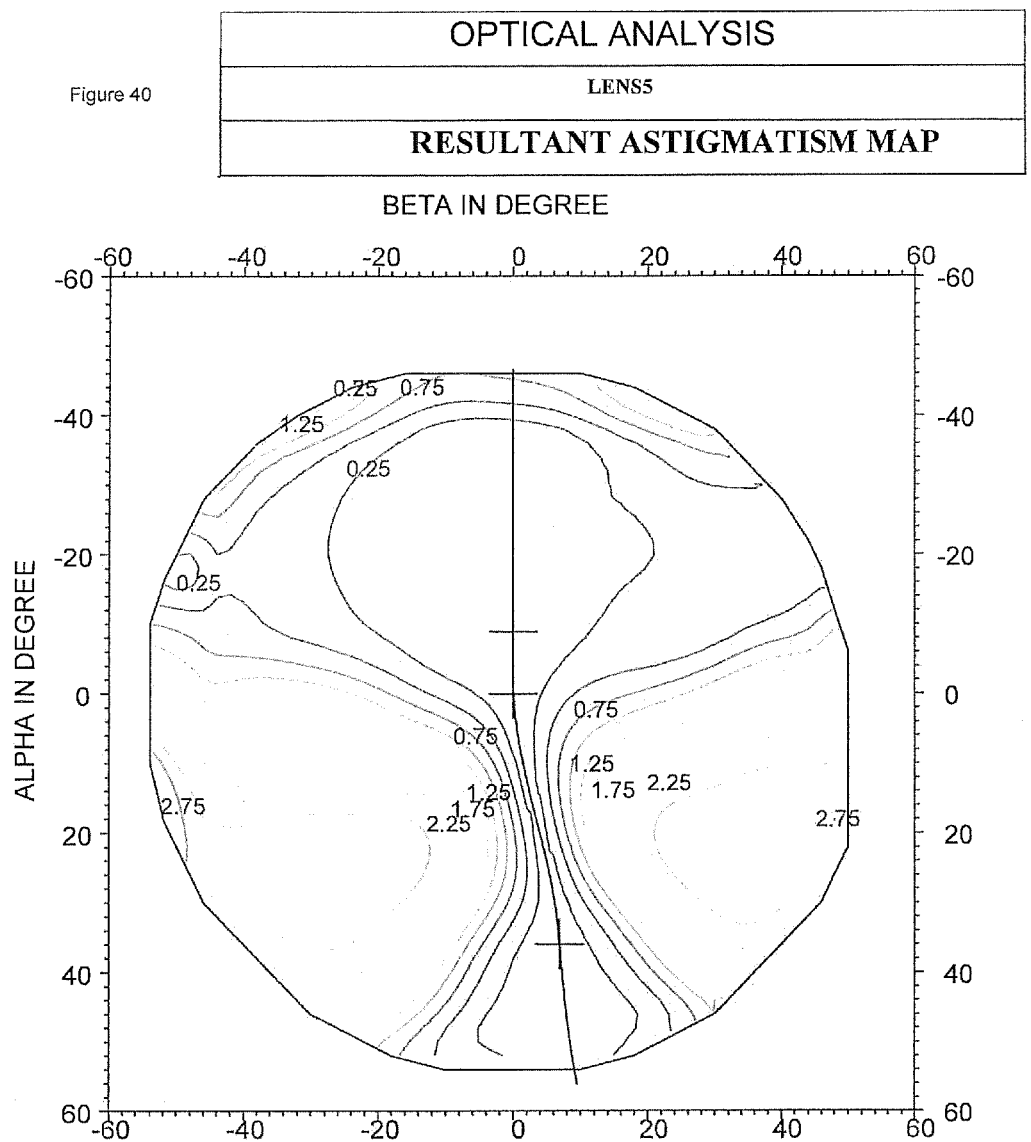
Figure 41:
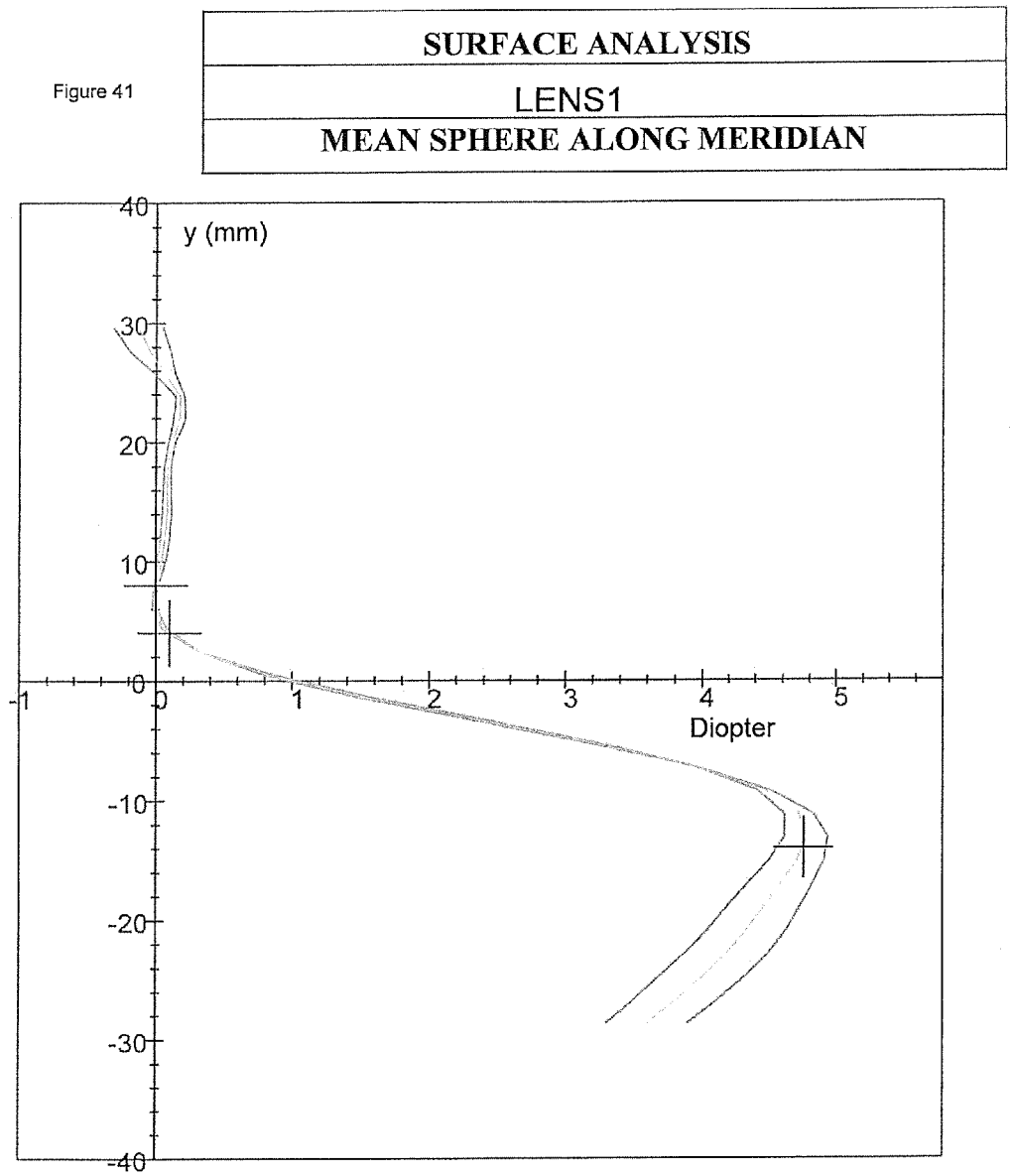
FIGS. 41 to 45 are a graph of mean sphere along the meridian, a map of mean sphere, a map of cylinder, a map of sphere gradient and a map of cylinder gradient respectively of a rear surface when the semi-finished lens blank of FIGS. 1 to 5 is used.
Figure 42:
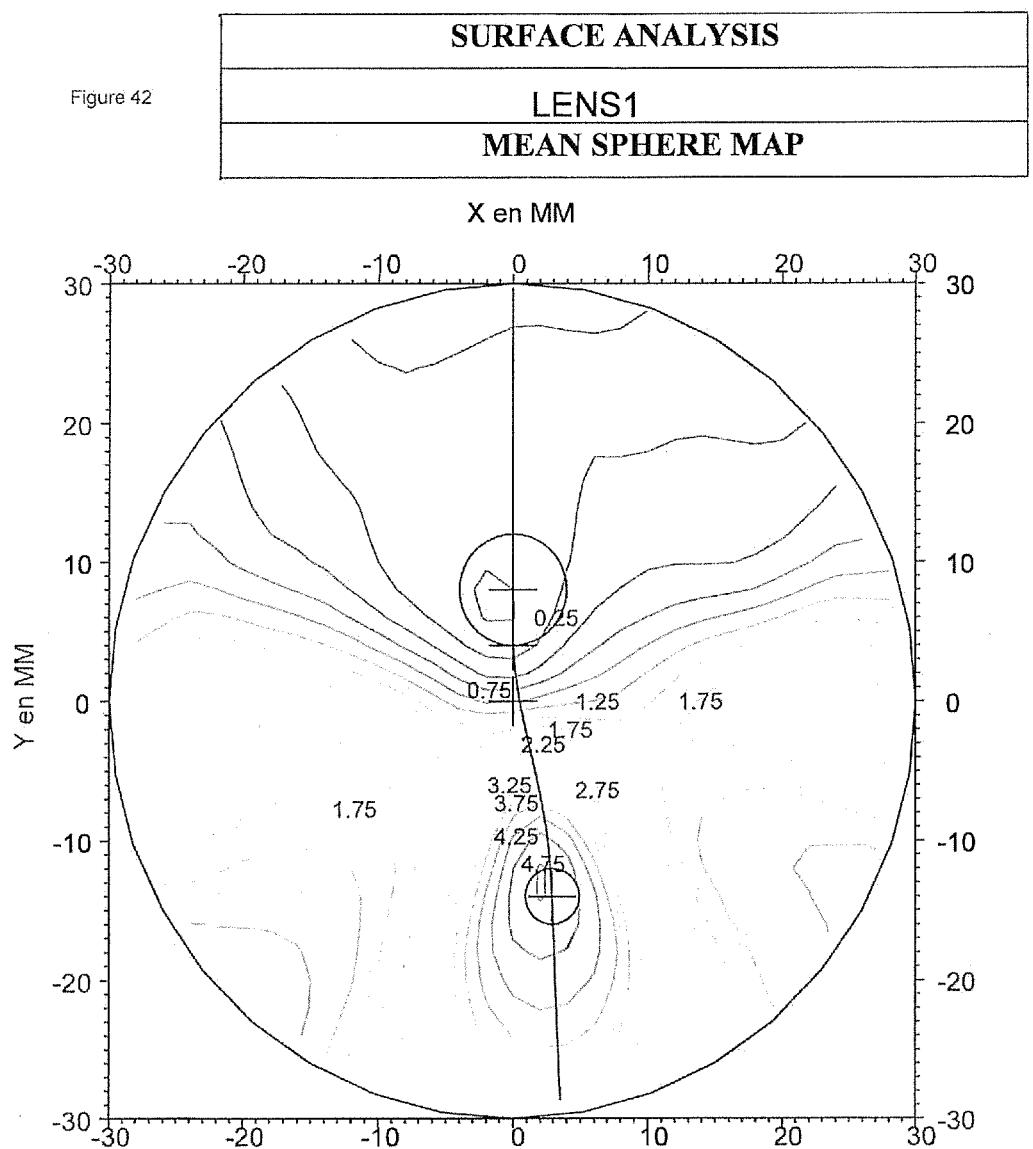
Figure 43:
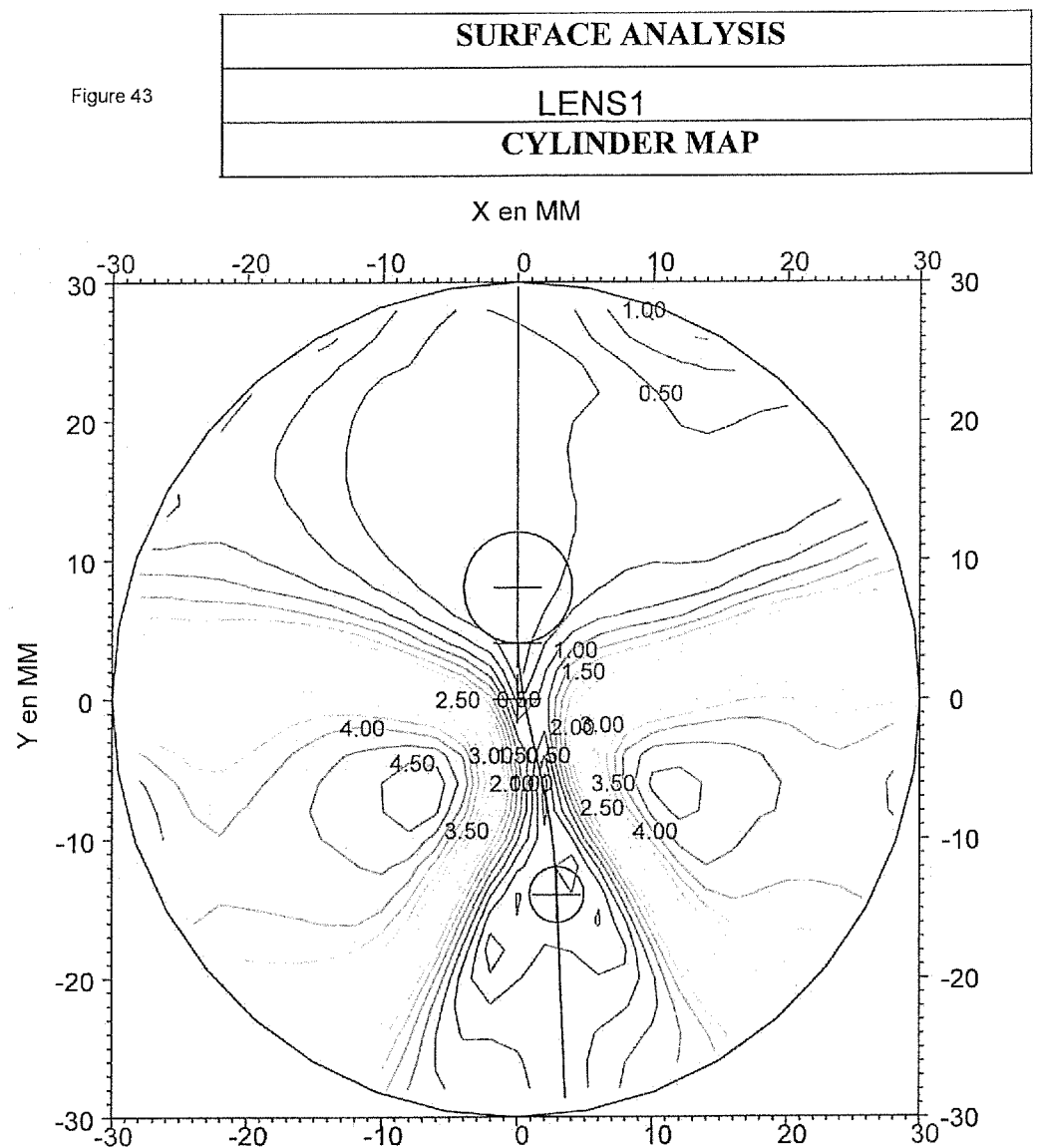
Figure 44:
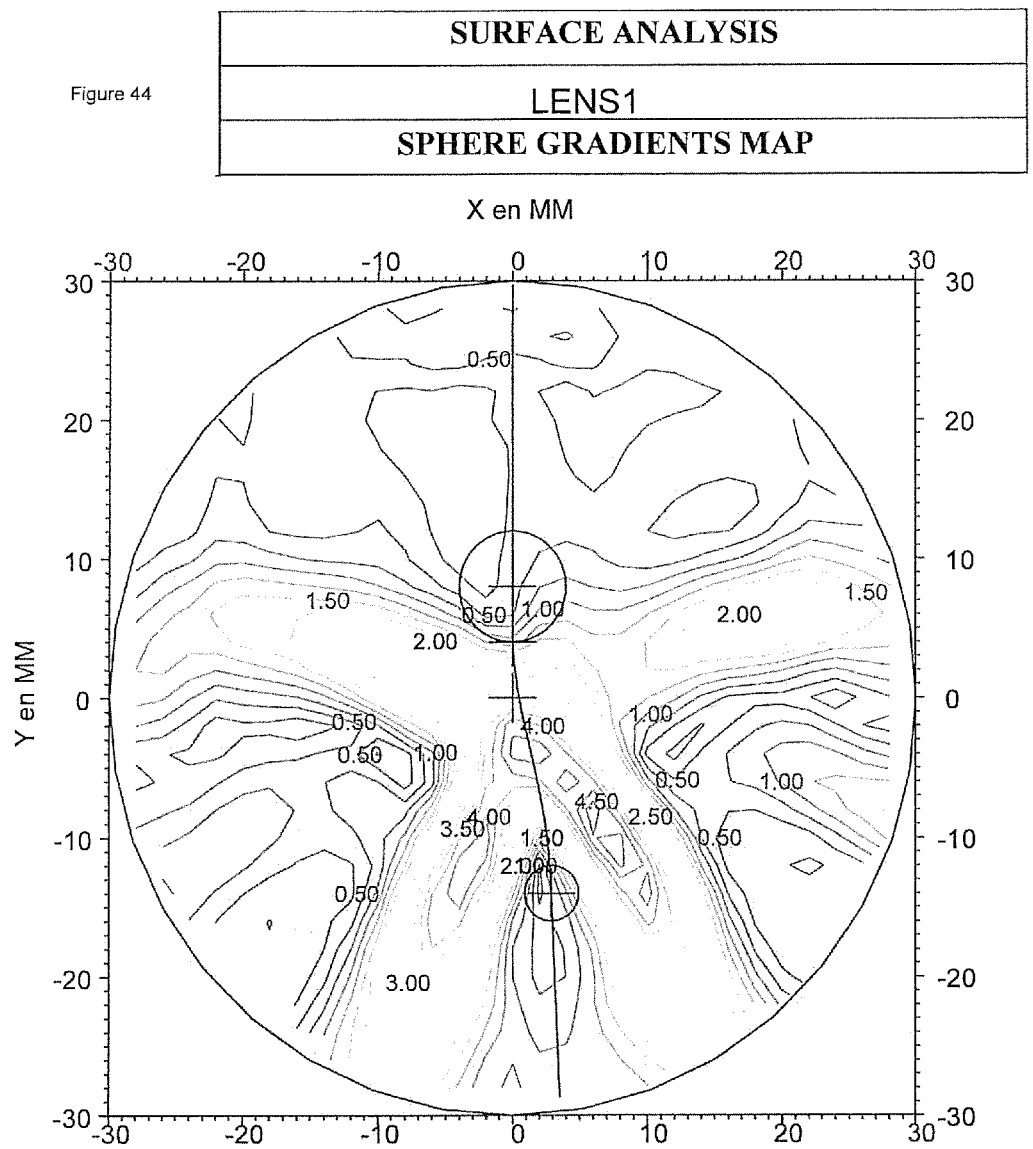
Figure 45:
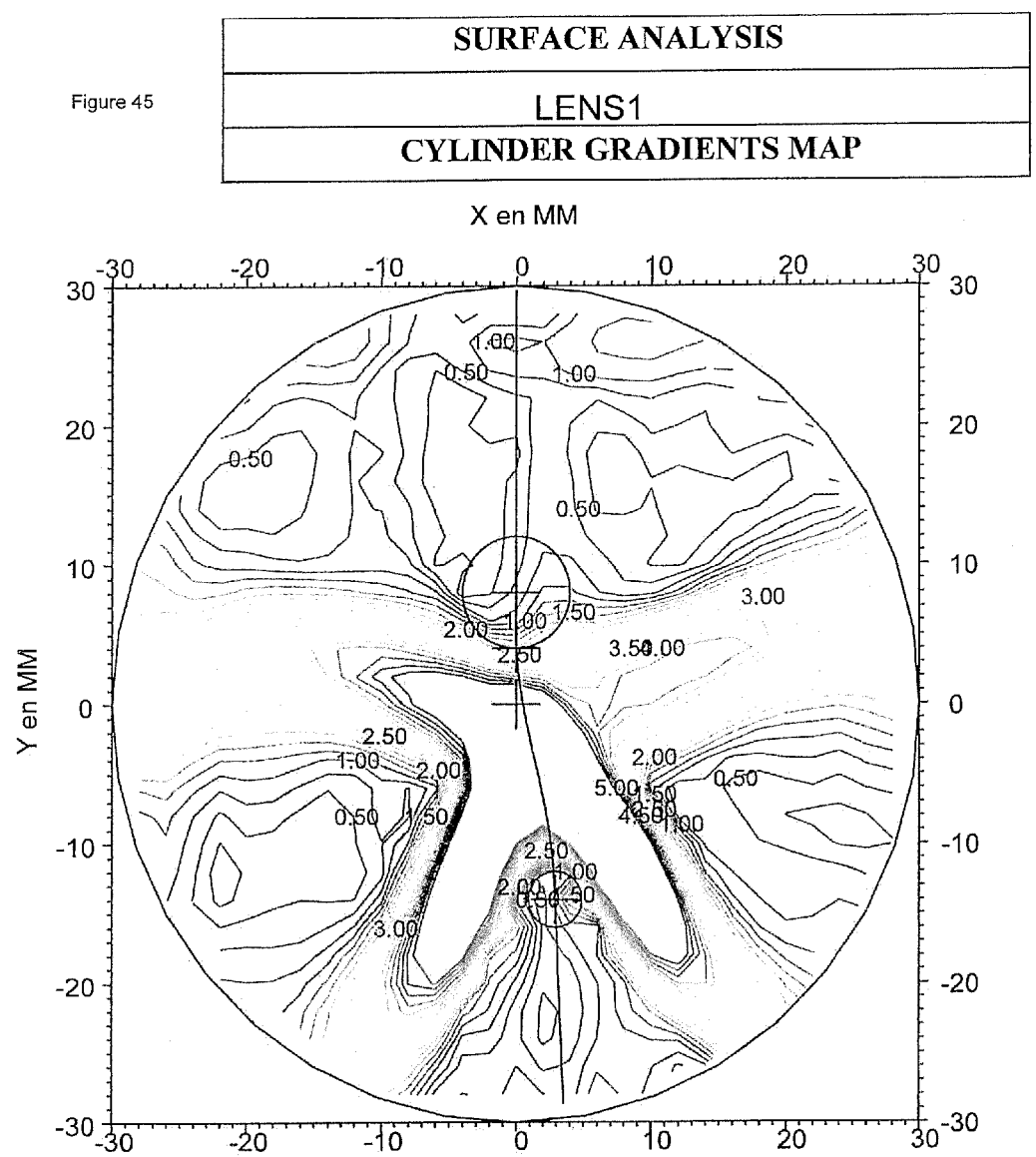
Figure 46:
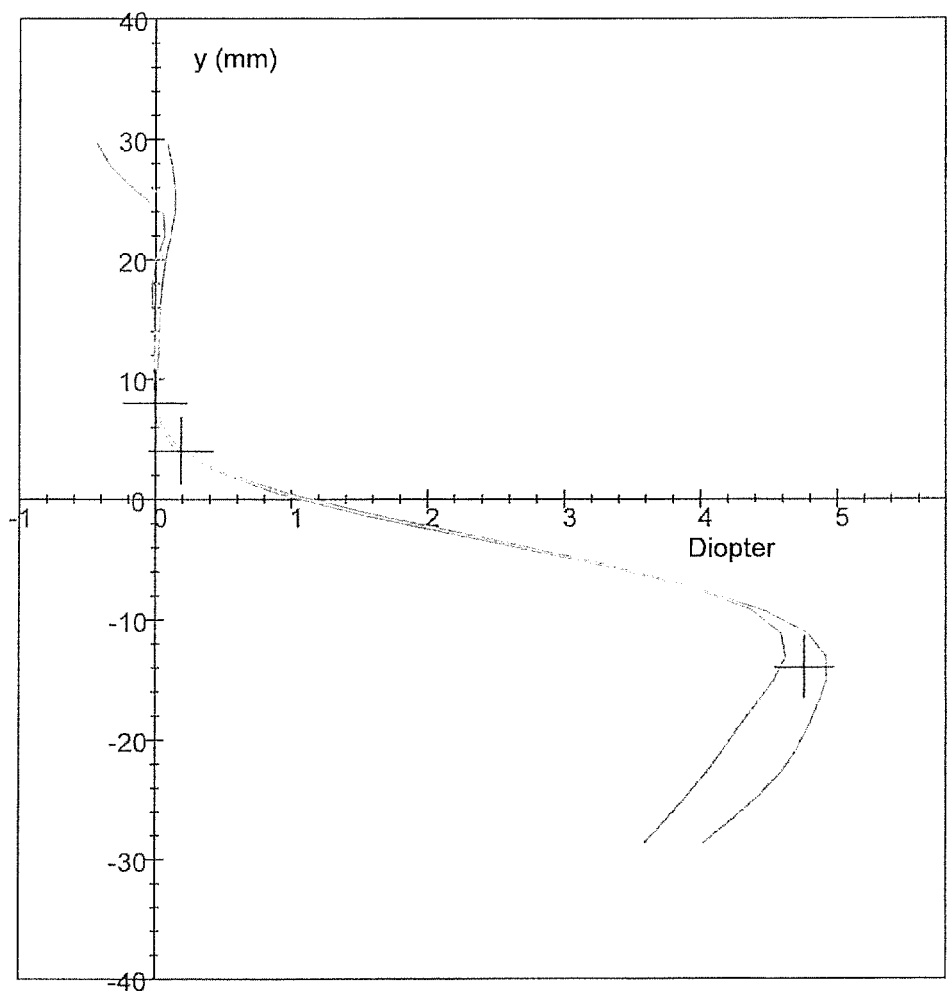
FIGS. 46 to 50 are a graph of mean sphere along the meridian, a map of mean sphere, a map of cylinder, a map of sphere gradient and a map of cylinder gradient respectively of a rear surface when the semi-finished lens blank of FIGS. 6 to 10 is used.
Figure 47:
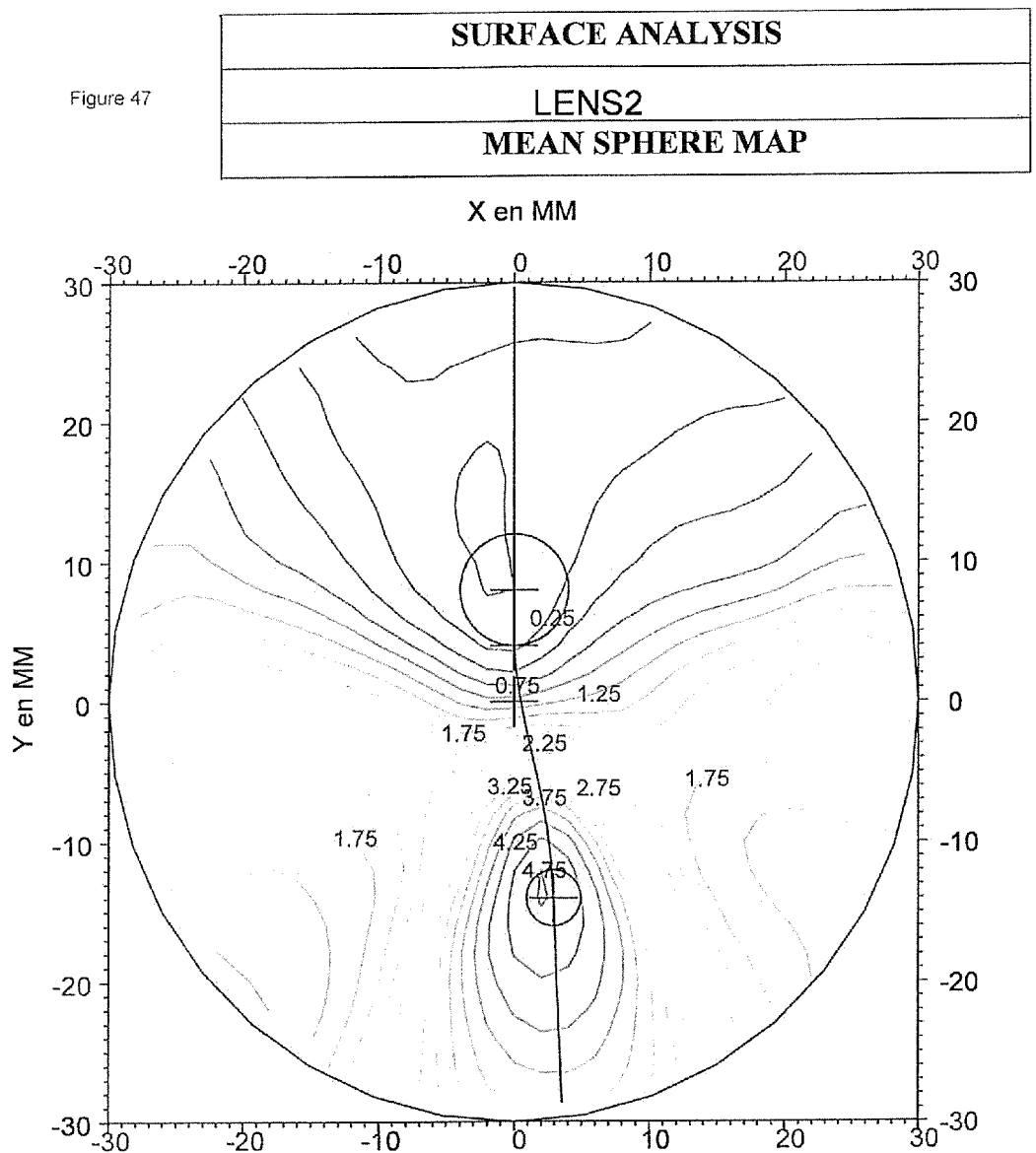
Figure 48:
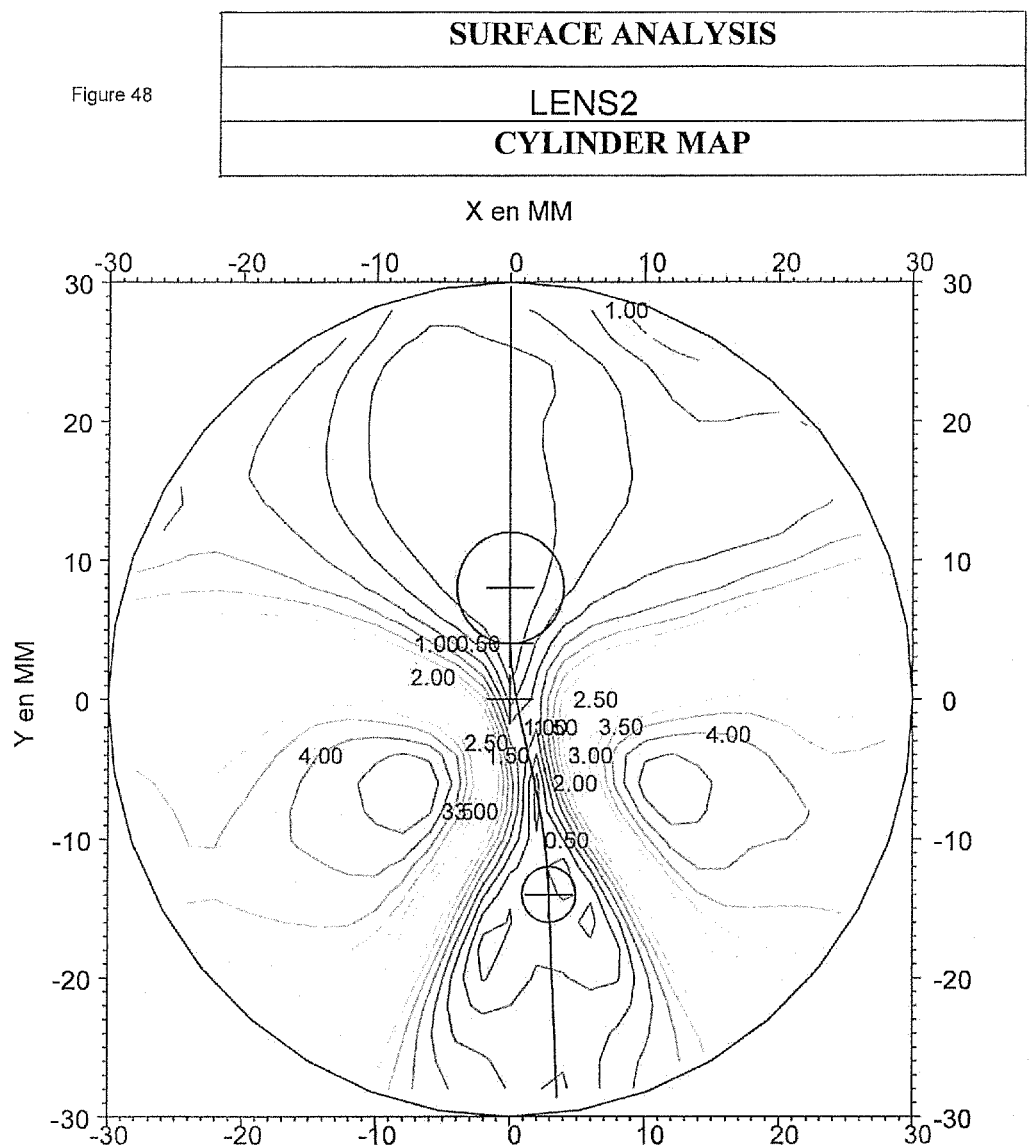
Figure 49:
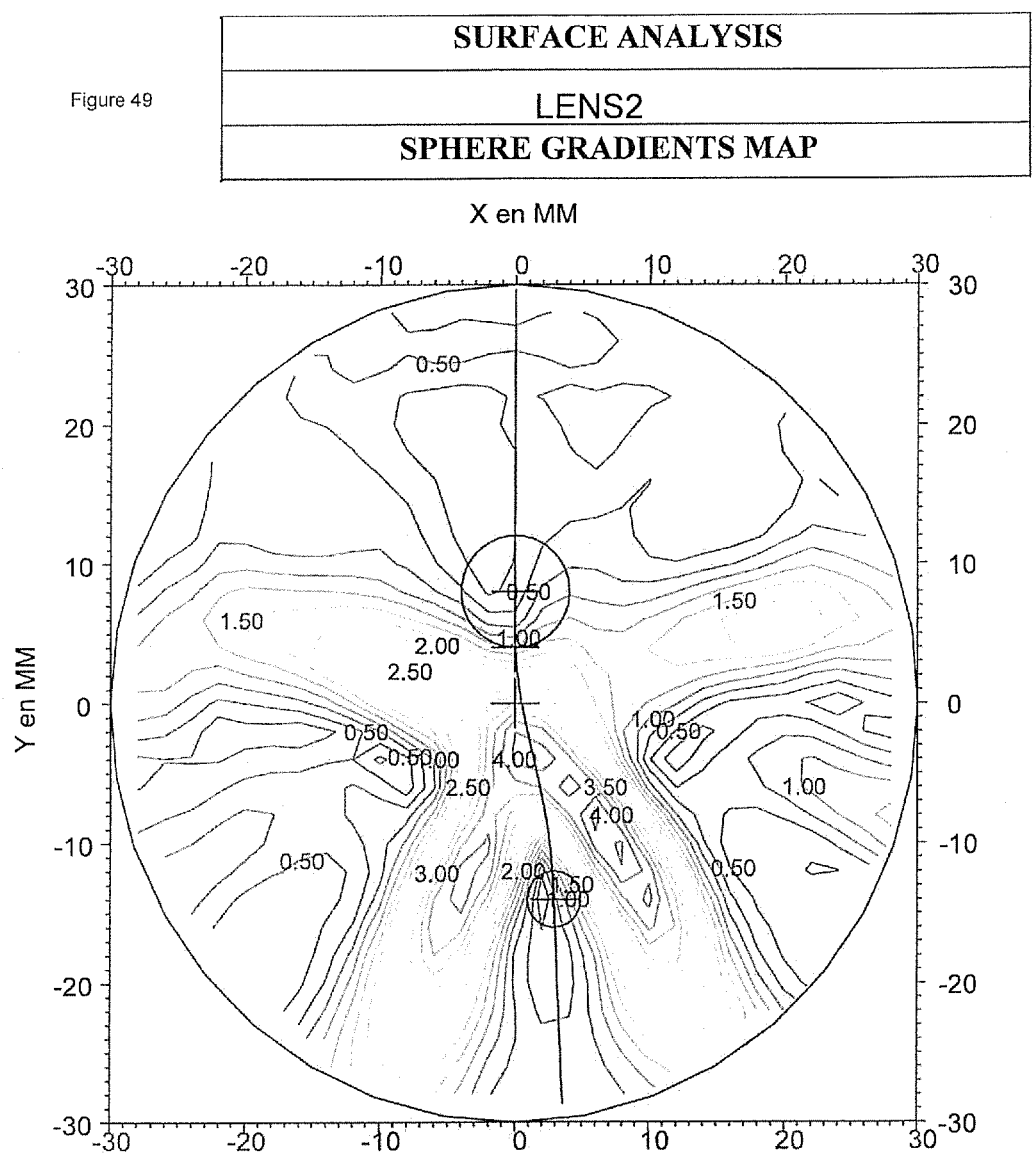
Figure 50:
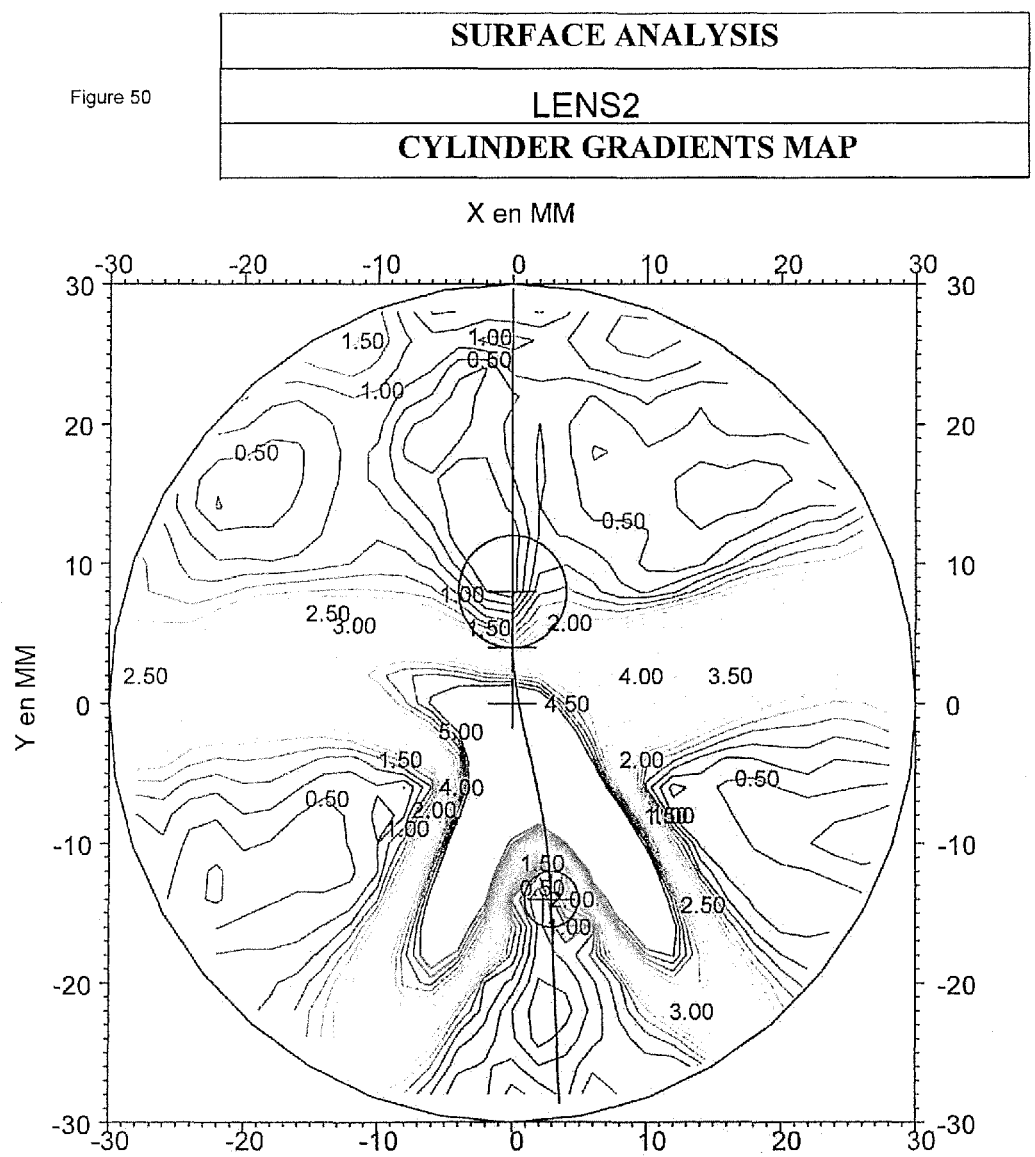
Figure 51:
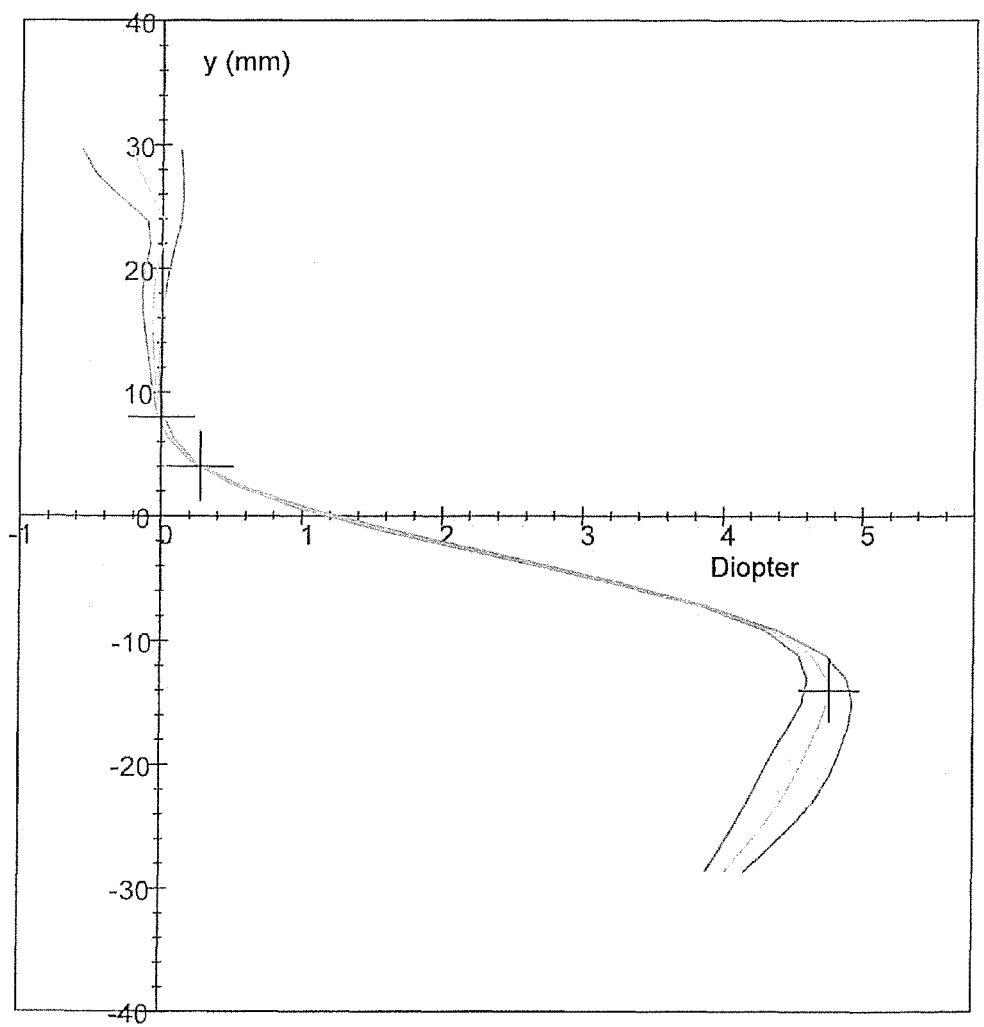
FIGS. 51 to 55 are a graph of mean sphere along the meridian, a map of mean sphere, a map of cylinder, a map of sphere gradient and a map of cylinder gradient respectively of a rear surface when the semi-finished lens blank of FIGS. 11 to 15 is used.
Figure 52:
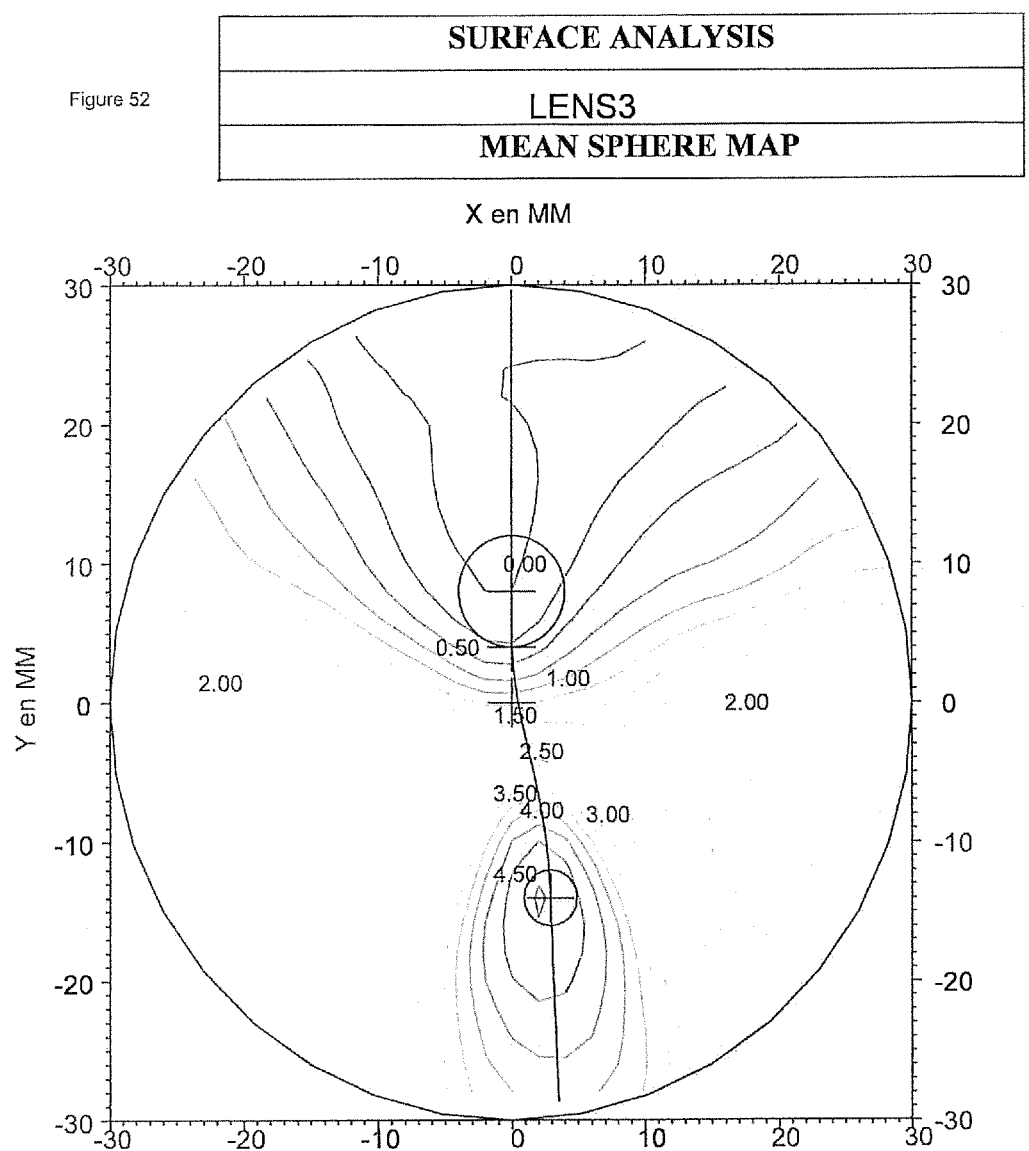
Figure 53:
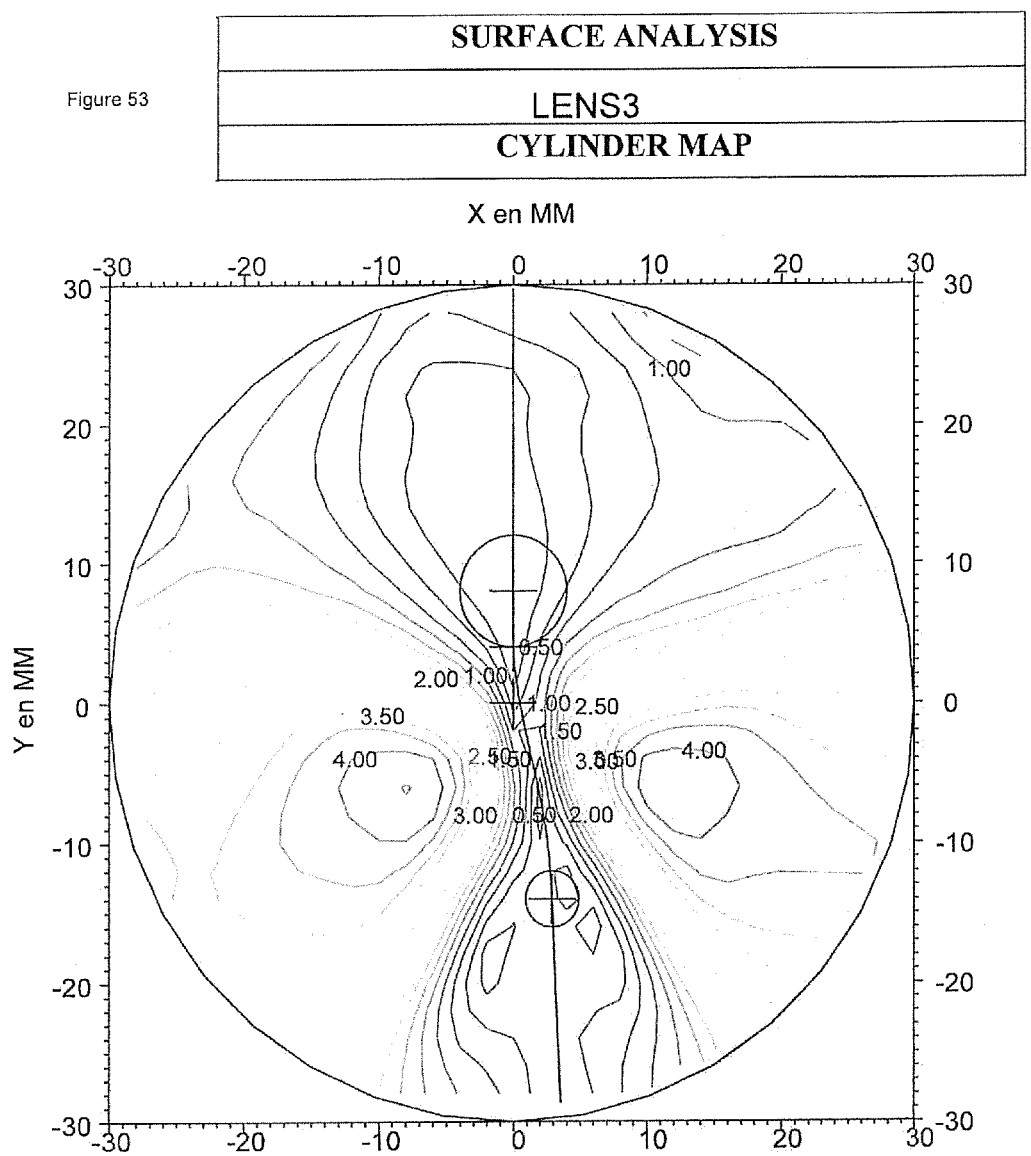
Figure 54:
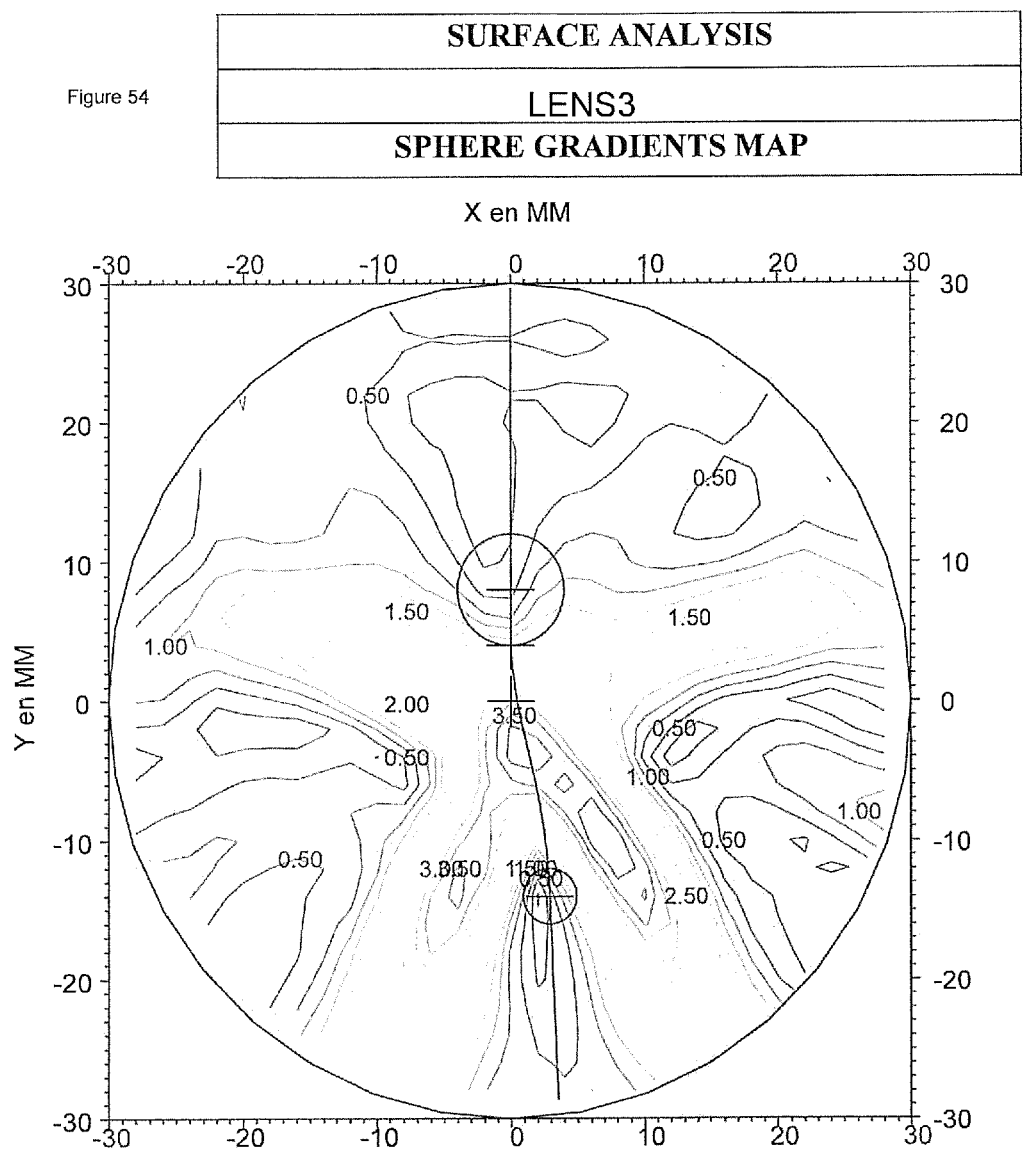
Figure 55:
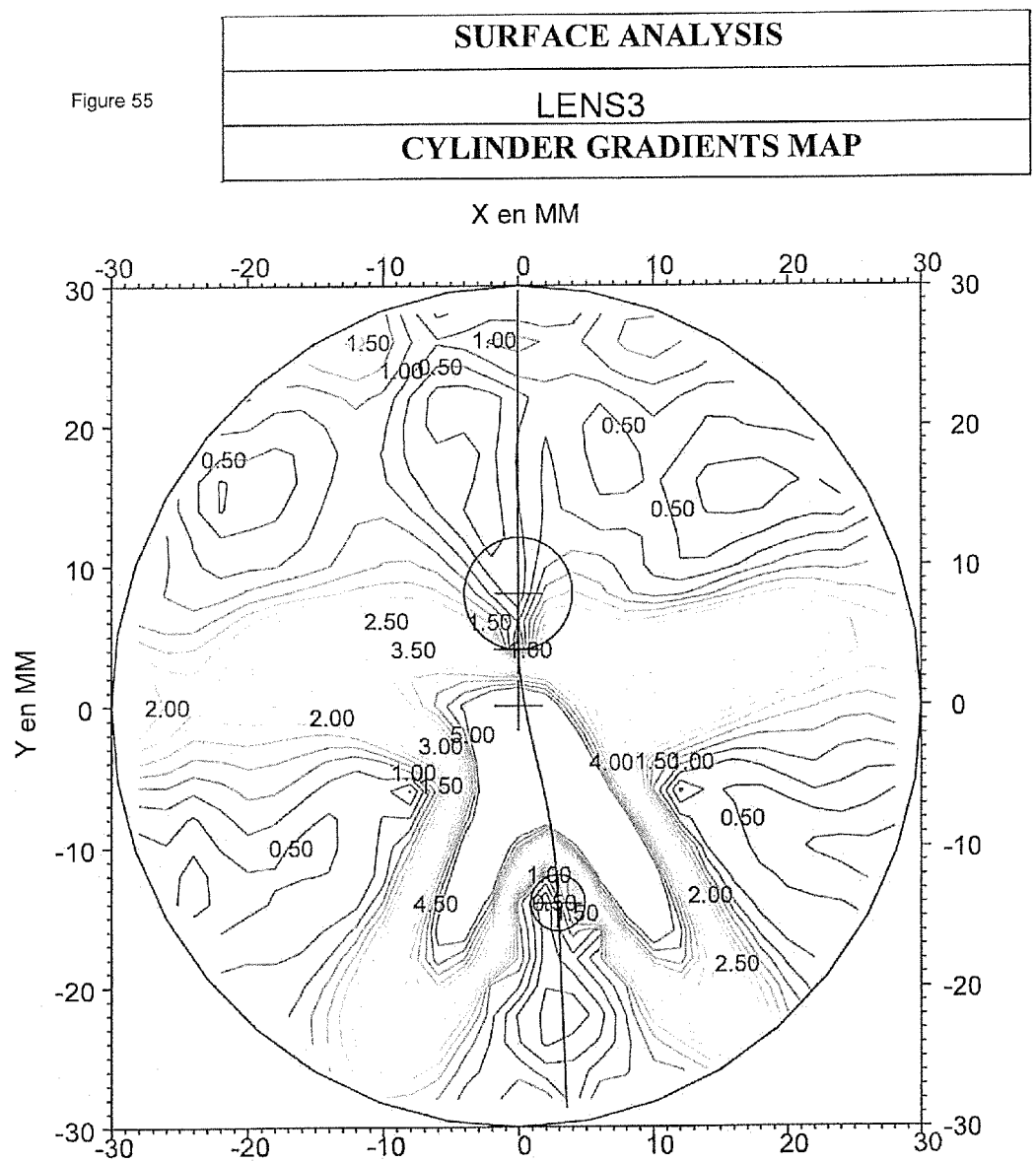

FIG. 21 is a graph of mean sphere along the meridian for the surface according to a third example of the invention. The x-axis is graduated in diopters and y-axis values in mm. The far vision control point has an x-axis value of 0 mm, a y-axis value of 8 mm on the surface, and has a sphere of 4.71 diopters and a cylinder of 0.10 diopters. The near vision control point has an x-axis value of 3 mm, a y-axis value of −14 mm on the surface, and has a sphere of 2.21 diopters and a cylinder of 0.10 diopters. The nominal surface addition is −2.50 diopters, calculated as the difference between mean spheres at the control points.

It can be seen from comparing FIGS. 1 and 6 to FIGS. 11, 16 and 21 that the regression value is about the same for all surfaces but sphere variations in proximity of the control points are less strong on the surfaces according to the invention. More specifically the sharp variation of sphere and cylinder located near the control points have been smothered on the surfaces according to the invention, notably for the example of Lens 5. The maximum value of the fourth derivative $D_4$ defined above is representative of these sharp variations of sphere and cylinder. $D_4$ is directly linked to the acceleration of the sphere and cylinder. When setting a limit value to $D_4$ over at least a central portion of the surface including a portion of the meridian, the near vision control point and the far vision control point, the areas of the meridian where the accelerations of the mean sphere are the strongest are soften.

FIGS. 2, 7, 12, 17 and 22 are maps showing mean sphere variation relatively to the mean sphere value of the far vision control point for the front surfaces of Lens 1, Lens 2, Lens 3, Lens 4 and Lens 5 respectively. These maps show the projection of the surface onto the (x, y) plane; the (x, y) reference frame defined above as well as the main meridian will be recognized. The control points for far and near vision have respective coordinates of (0; 8) and (3; −14).

On FIGS. 2, 7, 12, 17 and 22, isosphere lines, in other words lines joining points having the same mean sphere value can be seen. It can be observed that sphere gradients are much smaller, i.e. isosphere lines are more spaced apart, on the surfaces according to the invention by comparison to the surfaces of the comparative examples.

FIGS. 3, 8, 13, 18 and 23 are maps of cylinder for the front surfaces of Lens 1, Lens 2, Lens 3, Lens 4 and Lens 5 respectively; the same graphical conventions and indications as those of FIGS. 2, 7, 12, 17 and 22 are used, simply showing cylinder in place of sphere in this drawing. It can be observed that cylinder gradients are much smaller, i.e. isocylinder lines are more spaced apart, on the surfaces according to the invention by comparison to the surfaces of the comparative examples.

FIGS. 4, 9, 14, 19 and 24 are maps of sphere gradients for the front surfaces of Lens 1, Lens 2, Lens 3, Lens 4 and Lens 5 respectively. These maps confirm that sphere gradients of the surfaces according to the invention are much less than the sphere gradients of surfaces of comparative examples which have a hard design. Notably, sphere gradient normalized to the nominal surface addition is less than $7.50 \cdot 10^{-1}$ mm$^{-1}$ at any point in the circle of 40 mm centered on the central point O for the surfaces of the invention—taken note that the maps show the non normalized values of sphere gradients.

FIGS. 5, 10, 15, 20 and 25 are maps of cylinder gradients for the front surfaces of Lens 1, Lens 2, Lens 3, Lens 4 and Lens 5 respectively. These maps confirm that cylinder gradients of the surface according to the invention are much less than the cylinder gradients of surfaces of comparative examples which have a hard design. Notably, cylinder gradient is less than 1.45 mm$^{-1}$ at any point in the circle of 40 mm centered on the central point O for the surfaces of the invention—taken note that the maps show the non normalized values of sphere gradients.

It can also be observed that the iso-gradient lines in FIG. 14-15, 19-20, 24-25 are much more spaced, less close to each other, in the central portion of the lens as compared to FIGS. 4-5 and 9-10. The variation of gradients on the front surfaces of Lens 3, Lens 4 and Lens 5 is much less than the variation of gradients on the font surface of lens 1 and Lens 2. This indicates that the fourth derivative $D_4$ has small values on the surfaces of the invention as compared with surfaces of the comparative examples.

Moreover, the maximum value of $D_4$ in the far vision zone is located near the far vision control point, i.e. at least 4 mm above the center of the surface along y-axis, and preferably at least 8 mm above the center of the surface along y-axis. In addition, the maximum value of $D_4$ in the near vision zone is located below the near vision control point, i.e. at least 8 mm below the center of the surface, and preferably at least 14 mm below the center of the surface. As a consequence, the gradients variations will be smaller on the central portion of the first surface of the semi-finished lens blank. In addition, the maximum value of $D_4$ of the calculated rear surface will also be smaller and the surfacing will be more accurate.

Table I below summarizes the normalized maximum values of fourth derivative $D_4$, sphere gradient and cylinder gradient for the front surfaces of the lenses considered.

TABLE I

| | Front Surface Criteria | | |
|---|---|---|---|
| | D4 (mm$^{-2}$ · diopter$^{-1}$) | Grad SPH (mm$^{-1}$) | Grad CYL (mm$^{-1}$) |
| Lens 1 | $6.90 \cdot 10^{-5}$ | $9.23 \cdot 10^{-1}$ | 1.74 |
| Lens 2 | $5.52 \cdot 10^{-5}$ | $7.96 \cdot 10^{-1}$ | 1.55 |
| Lens 3 | $4.14 \cdot 10^{-5}$ | $6.96 \cdot 10^{-1}$ | 1.35 |
| Lens 4 | $2.84 \cdot 10^{-5}$ | $6.01 \cdot 10^{-1}$ | 1.17 |
| Lens 5 | $2.36 \cdot 10^{-5}$ | $5.12 \cdot 10^{-1}$ | $9.97 \cdot 10^{-1}$ |

FIGS. 26 to 40 are optical analyses of the nominal performance of the lenses considered. Nominal performances are defined as the selected best compromise resulting from the repartition of optical defects over the lens. A target optical function is then defined to be used during optical optimization when defining the surfaces characteristics of the lens. The manufactured lens finally obtained may have optical performances slightly deviating from the nominal performances, due notably to machining limitations and positioning defects.

FIGS. 26, 29, 32, 35, 38 represent nominal power along the main meridian for lenses Lens 1, Lens 2, Lens 3, Lens 4 and Lens 5 respectively. The optical addition is 2.69 diopters for Lens 1 and Lens 2; 2.67 diopters for Lens 3; 2.66 diopters for Lens 4 and Lens 5, power at the far vision control point being nil. It is immediately apparent that the optical performances along the meridian are the same for all lenses.

FIGS. 27, 30, 33, 36 and 39 show nominal power perceived by the wearer with lenses Lens 1, Lens 2, Lens 3, Lens 4 and Lens 5 respectively. FIGS. 28, 31, 34, 37 and 40 show resulting astigmatism for with lenses Lens 1, Lens 2, Lens 3, Lens 4 and Lens 5 respectively. It is immediately apparent that the optical performances are substantially the same for all lenses.

Using a semi-finished lens blank according to the invention allows an easier lens manufacturing while maintaining the optical performances of the lens as it will be now explained.

FIGS. 41 to 65 are illustrations of a second surface for lenses manufactured from lens blanks of FIG. 1 to 25, i.e. rear surfaces of the lenses considered Lens 1, Lens 2, Lens 3, Lens 4 and Lens 5.

FIGS. 41, 46, 51, 56 and 61 are graphs of mean sphere variation along the meridian for the rear surfaces of Lens 1, Lens 2, Lens 3, Lens 4 and Lens 5 respectively. The nominal surface power progression is 4.76 diopters for Lens 1 and Lens 2, 4.77 diopters for Lens 3, Lens 4 and Lens 5, calculated as the difference between mean spheres at the control points.

Figure 56:
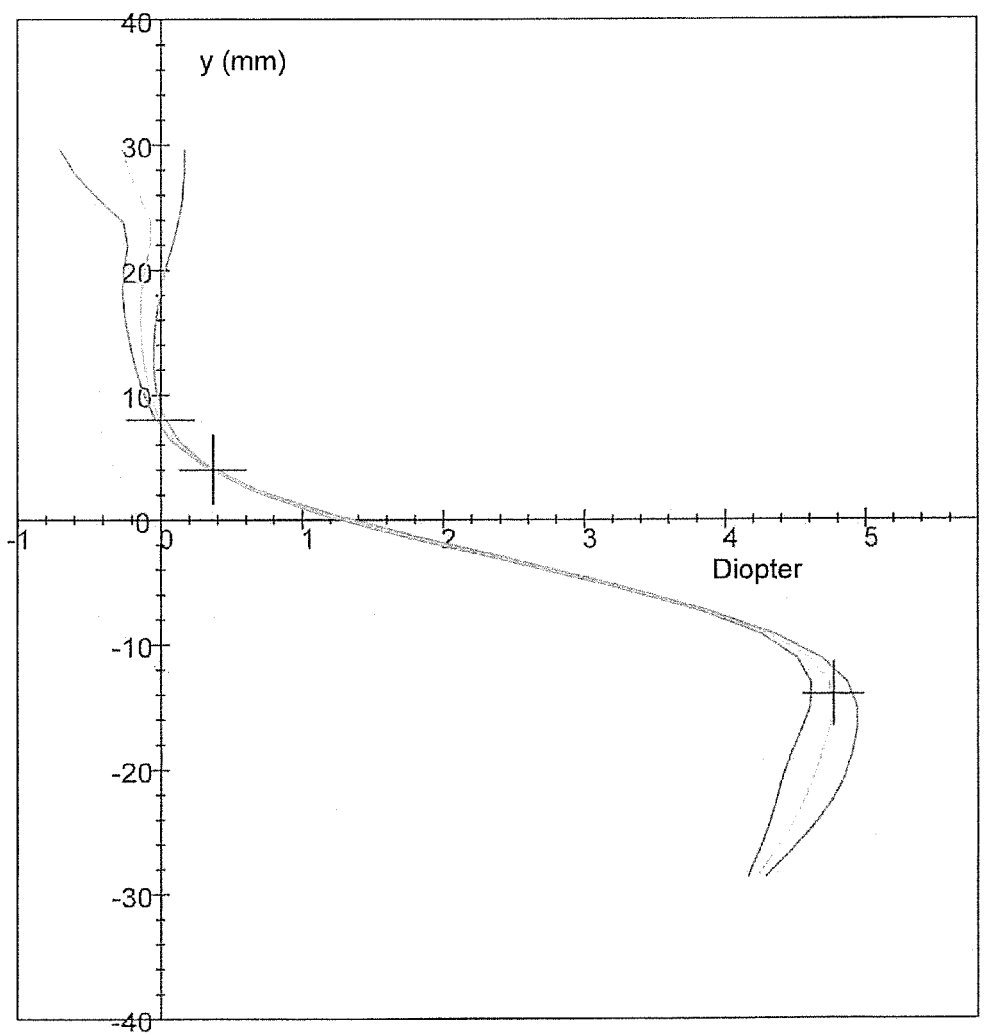
FIGS. 56 to 60 are a graph of mean sphere along the meridian, a map of mean sphere, a map of cylinder, a map of sphere gradient and a map of cylinder gradient respectively of a rear surface when the semi-finished lens blank of FIGS. 16 to 20 is used.
Figure 57:
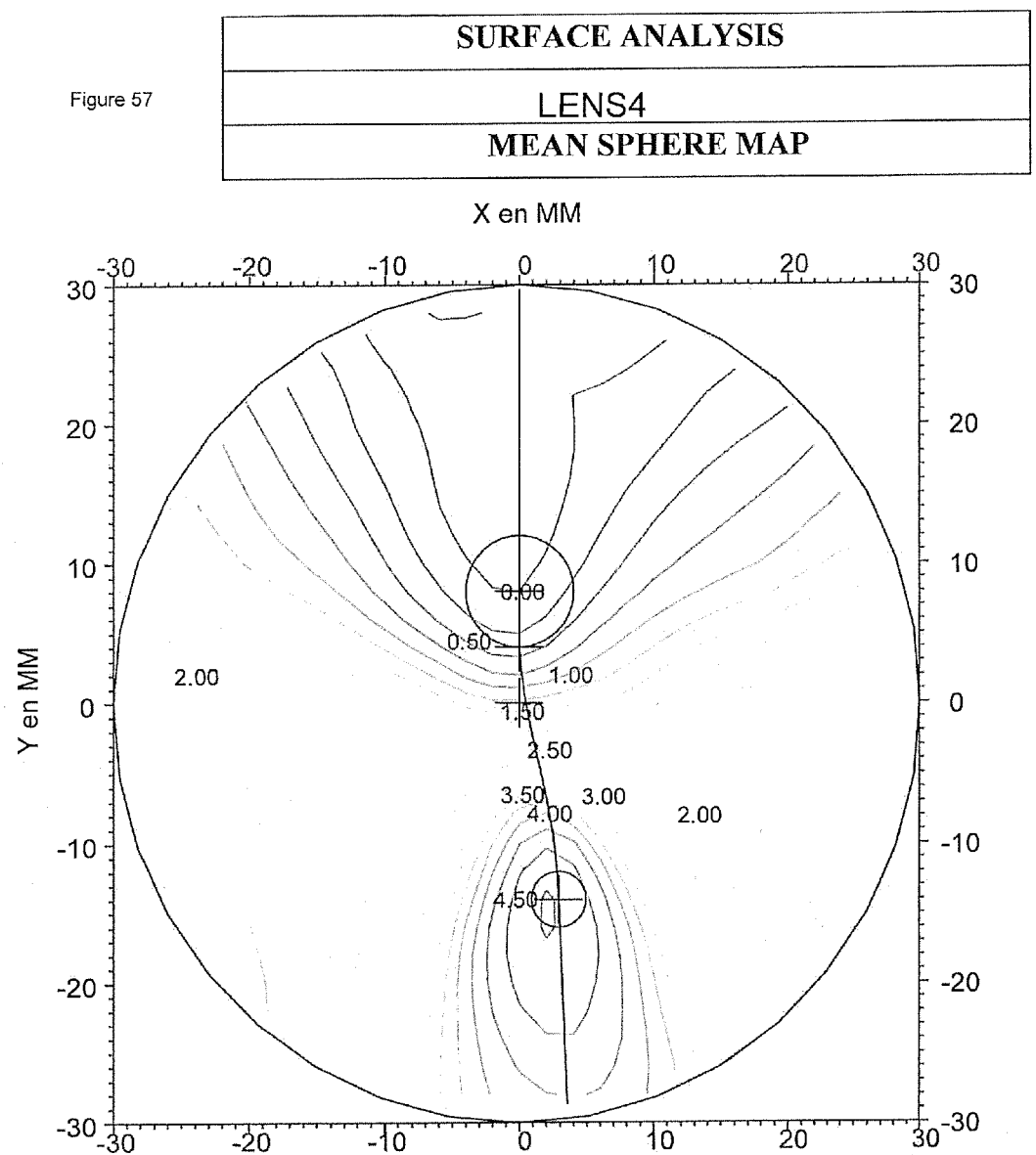
Figure 58:
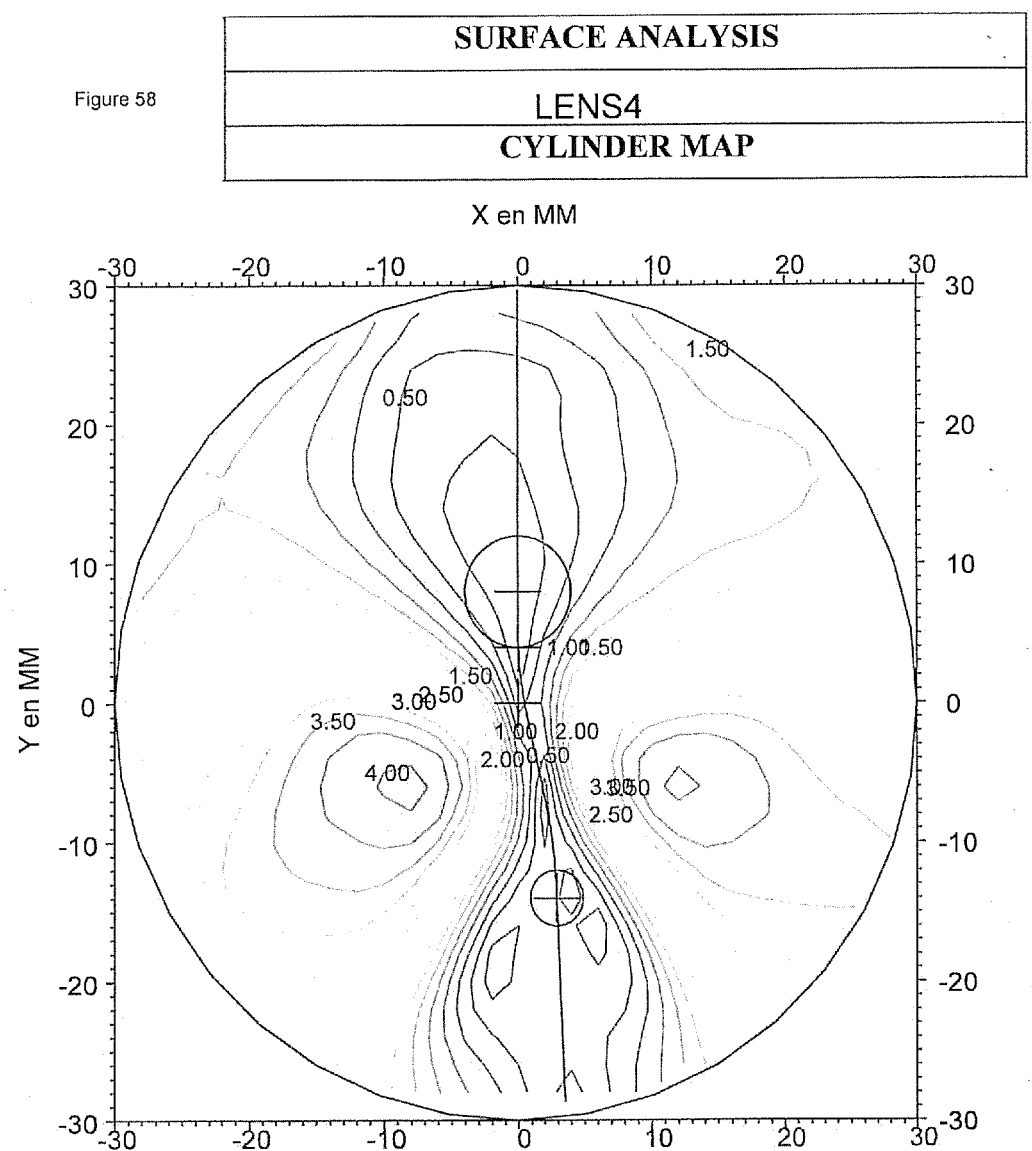
Figure 59:
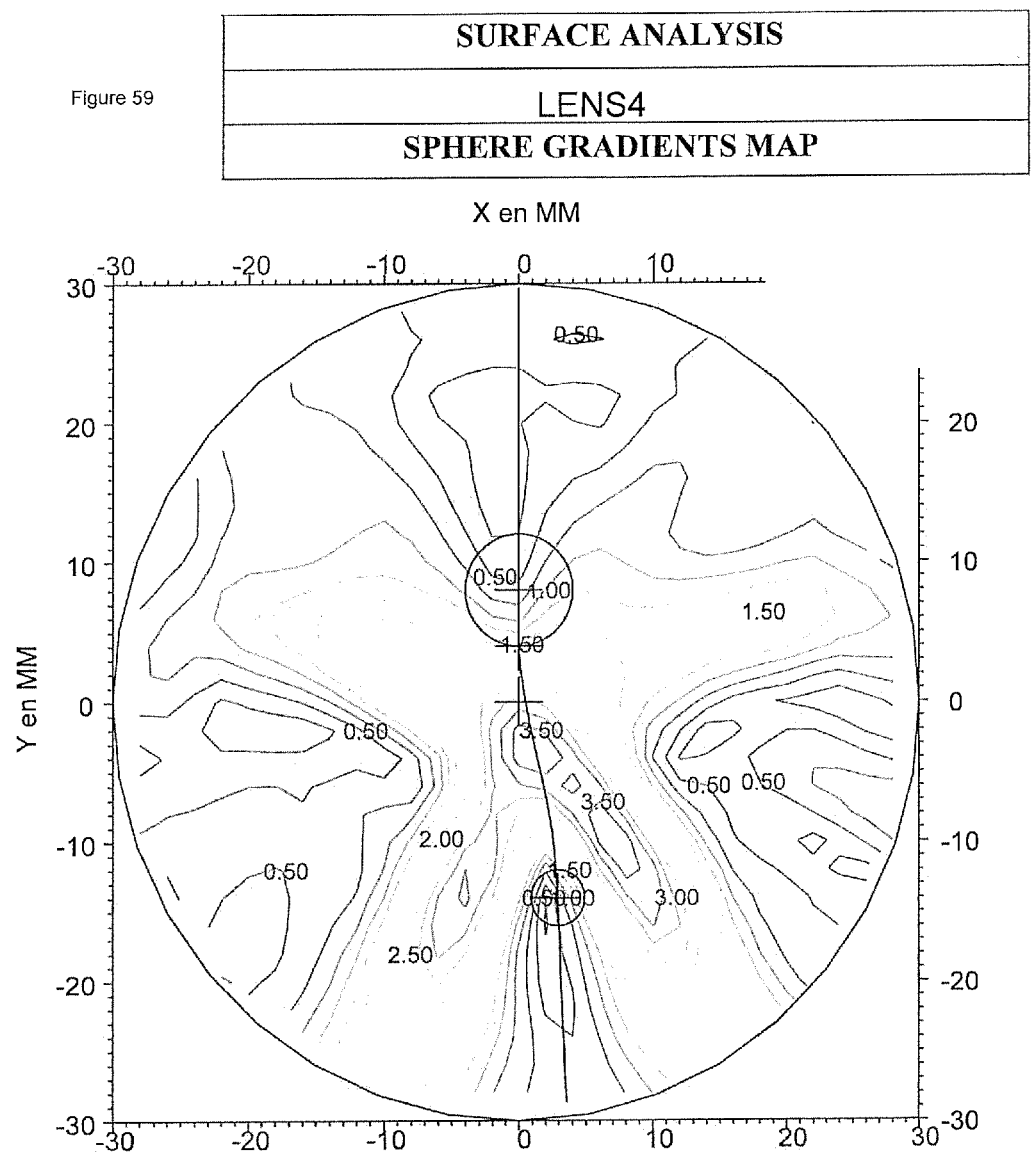
Figure 60:
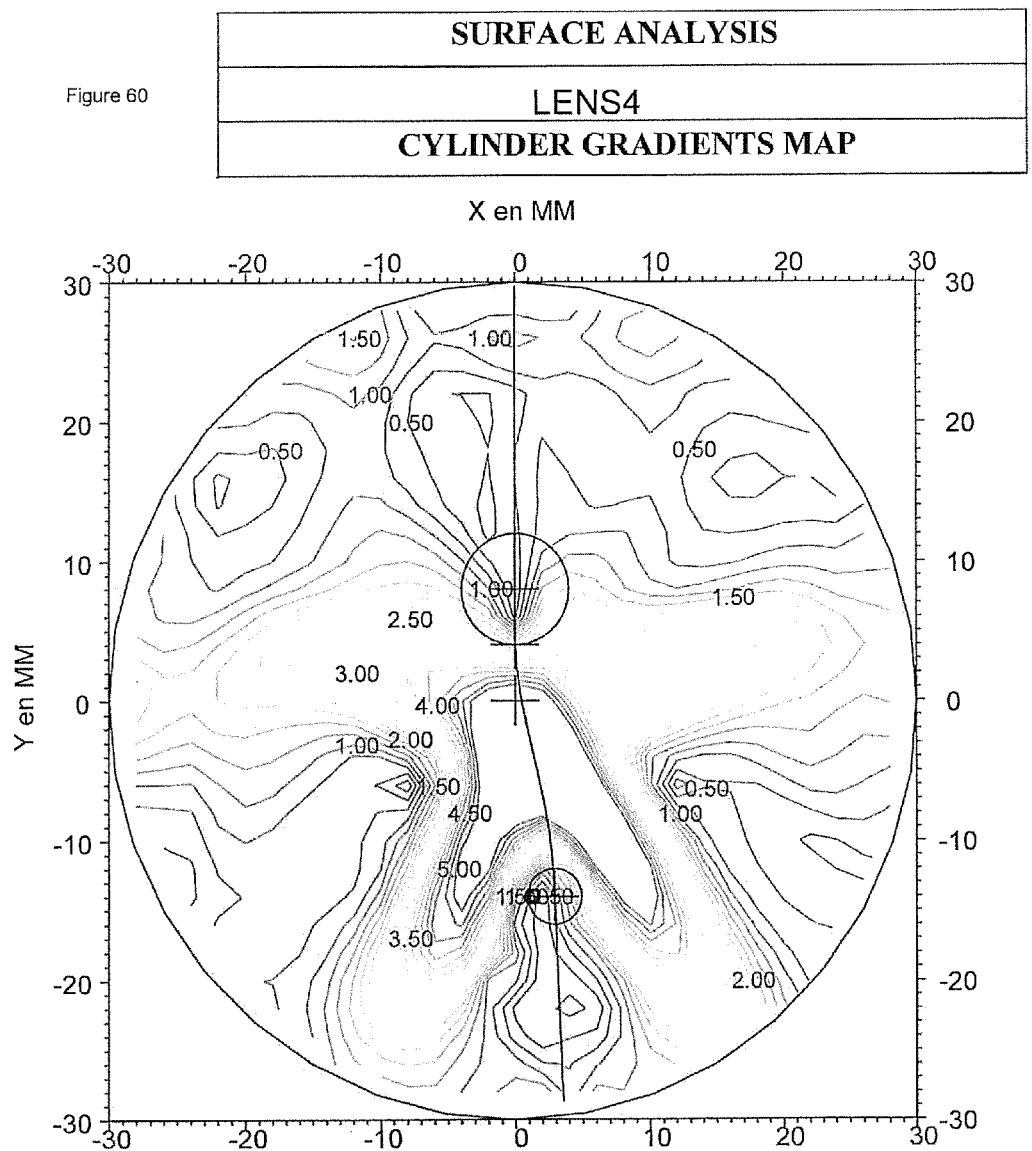
Figure 61:
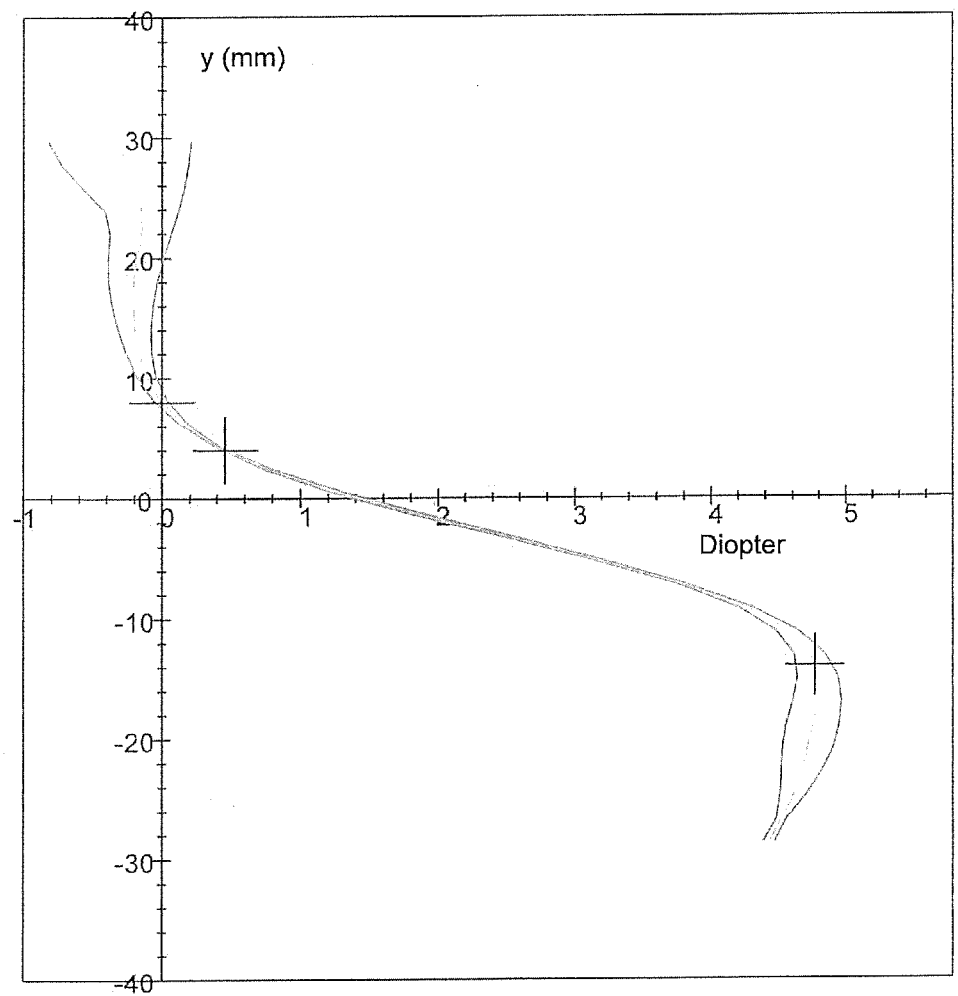
FIGS. 61 to 65 are a graph of mean sphere along the meridian, a map of mean sphere, a map of cylinder, a map of sphere gradient and a map of cylinder gradient respectively of a rear surface when the semi-finished lens blank of FIGS. 21 to 25 is used.
Figure 62:
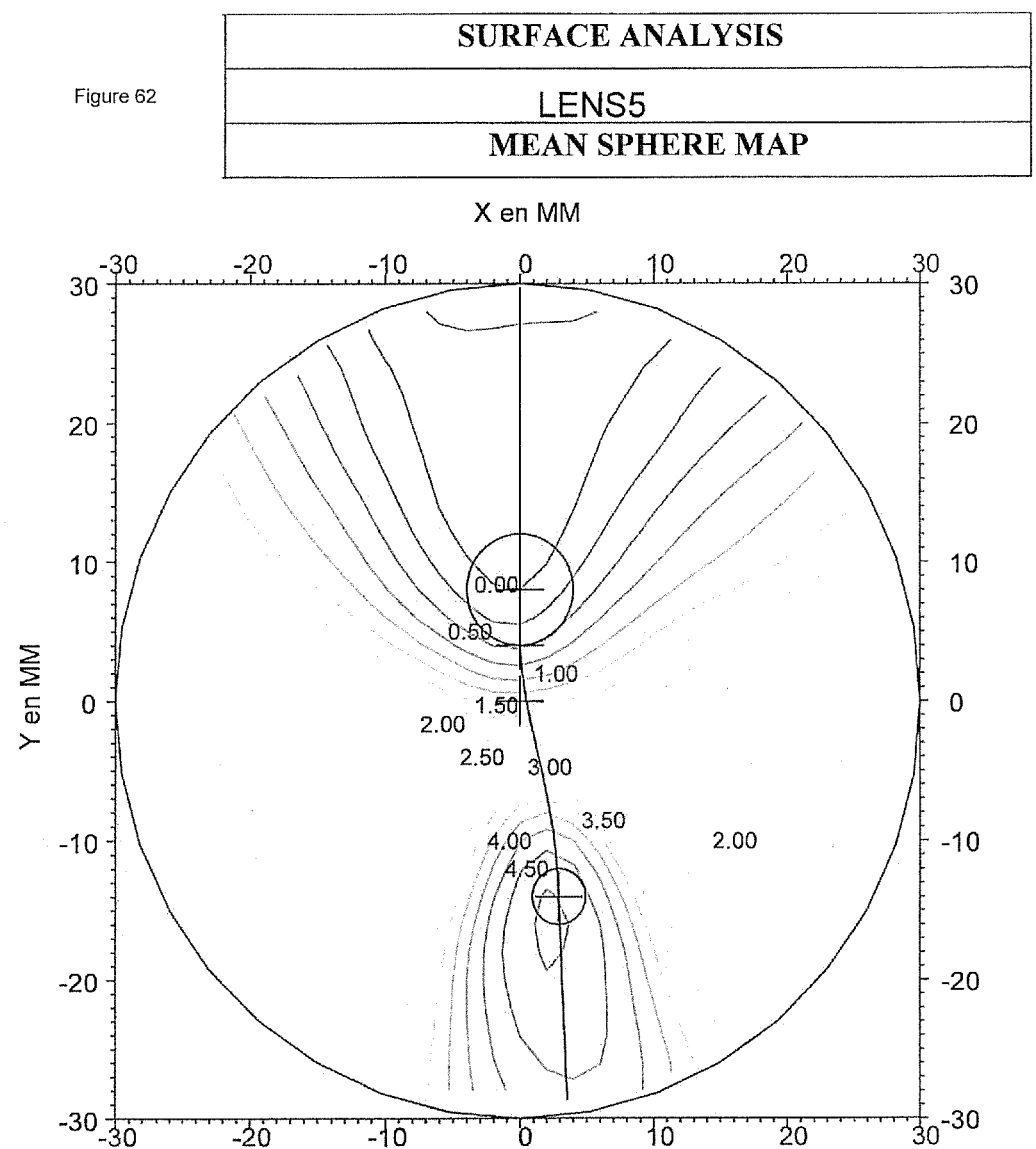
Figure 63:
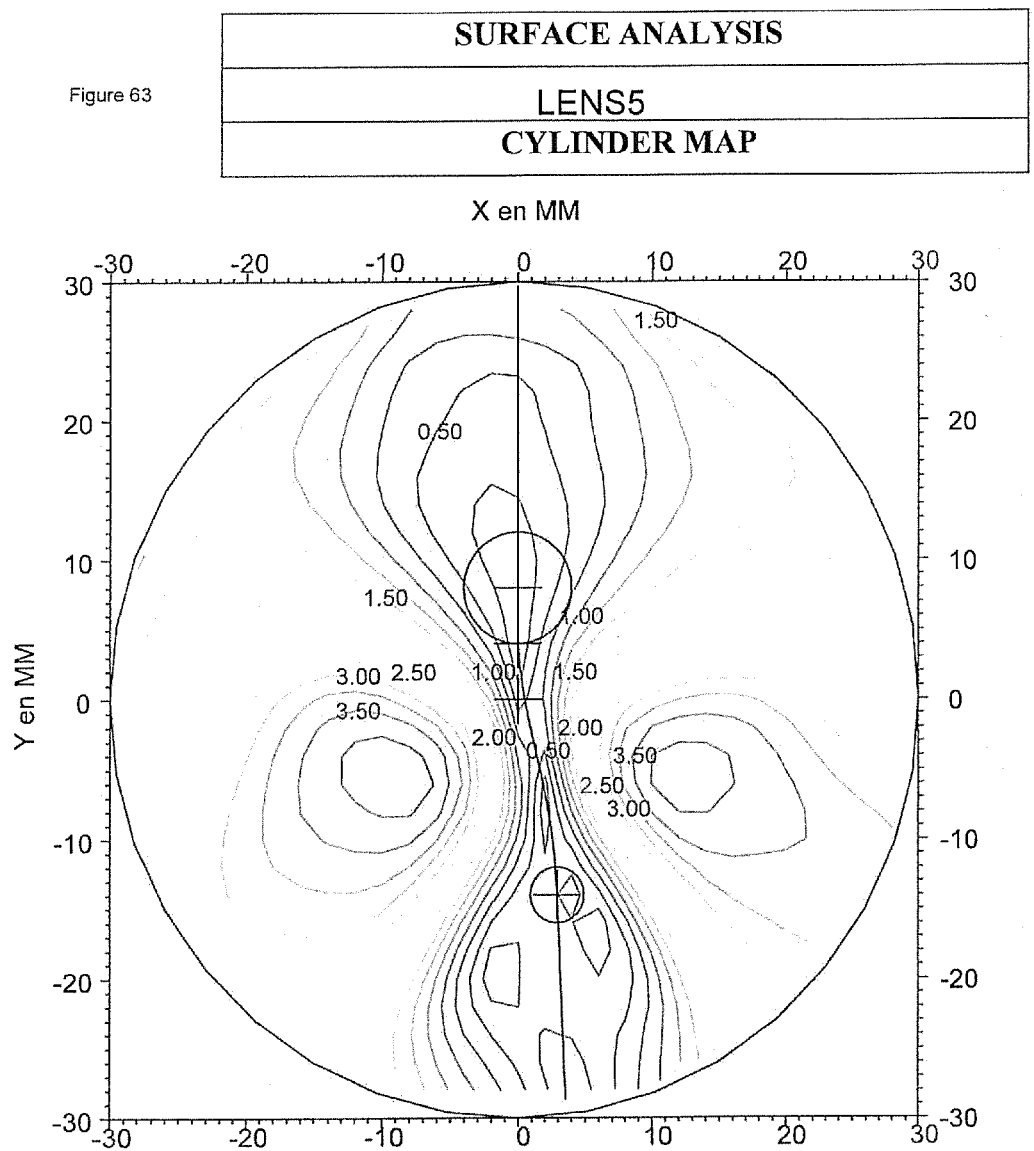
Figure 64:
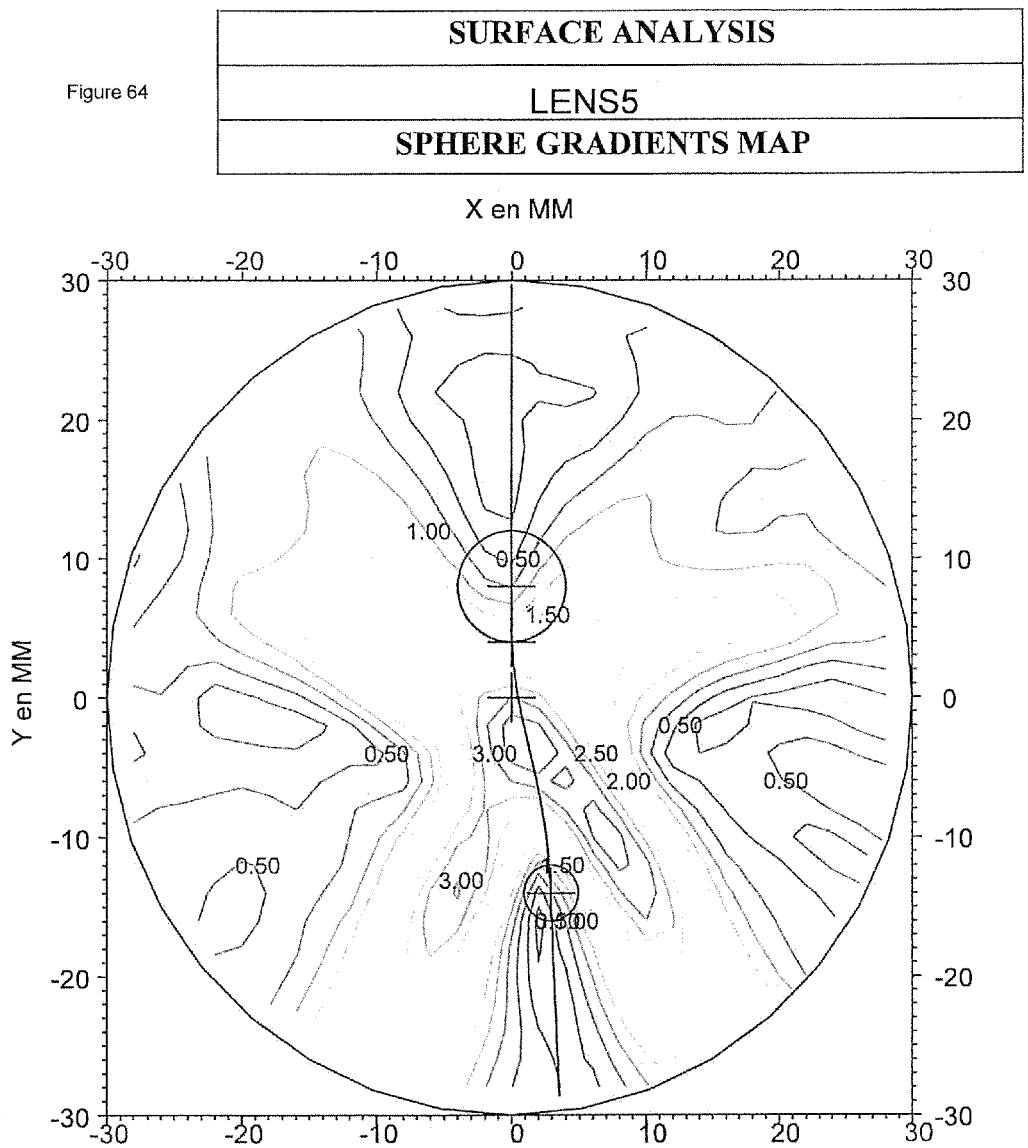
Figure 65:
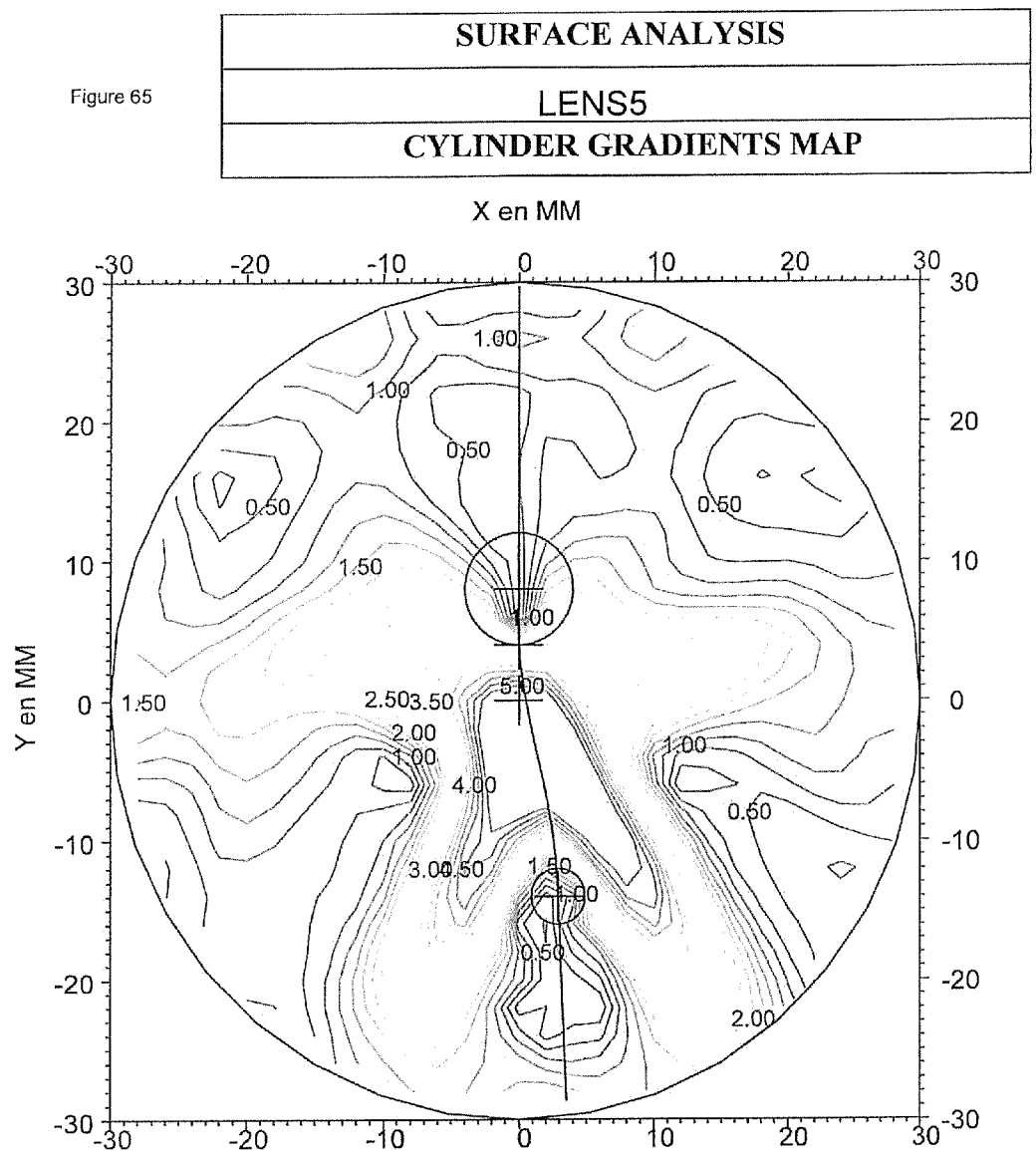

It can be seen from comparing FIGS. 41 and 46 to FIGS. 51, 56 and 61 that the sharp variations of sphere and cylinder at the control points are smoother, notably in FIGS. 56 and 61. Manufacturing of the second surface will therefore be easier.

FIGS. 42, 47, 52, 57 and 62 are maps showing mean sphere variation relatively to the mean sphere value of the far vision control point for the rear surfaces of Lens 1, Lens 2, Lens 3, Lens 4 and Lens 5 respectively. FIGS. 43, 48, 53, 58 and 63 are maps showing cylinder for the rear surfaces of Lens 1, Lens 2, Lens 3, Lens 4 and Lens 5 respectively. FIGS. 44, 49, 54, 59 and 64 are maps showing sphere gradients for the rear surfaces of Lens 1, Lens 2, Lens 3, Lens 4 and Lens 5 respectively and FIGS. 45, 50, 55, 60 and 65 are maps showing cylinder gradients for the rear surfaces of Lens 1, Lens 2, Lens 3, Lens 4 and Lens 5 respectively.

It can be observed that when a lens blank having a first surface according to the invention is used, sphere and cylinder gradients are smaller on the second surface as compared when using a lens blank having a first surface according to the comparative examples. It can also be observed that the iso-gradient lines in FIG. 54-55, 59-60, 64-65 are more spaced, less close to each other, in the central portion of the lens as compared to FIGS. 44-45 and 49-50. This indicates that the fourth derivative $D_4$ has smaller values on the rear surfaces of lenses having a front surface according to the invention as compared with rear surfaces of lenses having a front surface according to comparative examples.

Table II below summarizes the normalized maximum values of fourth derivative $D_4$, sphere gradient and cylinder gradient for the rear surfaces of the lenses considered.

TABLE II

| | Rear Surface Criteria | | |
|---|---|---|---|
| | D4 (mm$^{-2}$ · diopter$^{-1}$) | Grad SPH (mm$^{-1}$) | Grad CYL (mm$^{-1}$) |
| Lens 1 | 1.49 · 10$^{-4}$ | 1.87 | 3.57 |
| Lens 2 | 1.35 · 10$^{-4}$ | 1.74 | 3.38 |
| Lens 3 | 1.20 · 10$^{-4}$ | 1.60 | 3.18 |
| Lens 4 | 1.05 · 10$^{-4}$ | 1.48 | 2.98 |
| Lens 5 | 9.13 · 10$^{-5}$ | 1.38 | 2.79 |

Because of the sphere and cylinder gradients control on the front surface, sphere and cylinder gradients can be reduced on the rear surface and accelerations of the digital surfacing tool will be limited during surfacing of the surface of the lens. Thereby, the grinding of the surface will be more accurate.

Because of the fourth derivative control on the front surface, sharp variations of gradients will also be avoided during surfacing of the rear surface of the lens. Thereby, the polishing of the rear surface will be less affected.

Therefore, using a semi-finished blank according to the invention, with a soft design and controlled values of fourth derivative, makes it easier to manufacture the lens and further improves the optical quality of the lens obtained after surfacing the second surface.

Indeed, as mentioned above with respect to FIG. 26-40, nominal optical performances are substantially the same for all lenses. Still the lenses of the invention are more tolerant to positioning defects during manufacturing.

Figure 66:
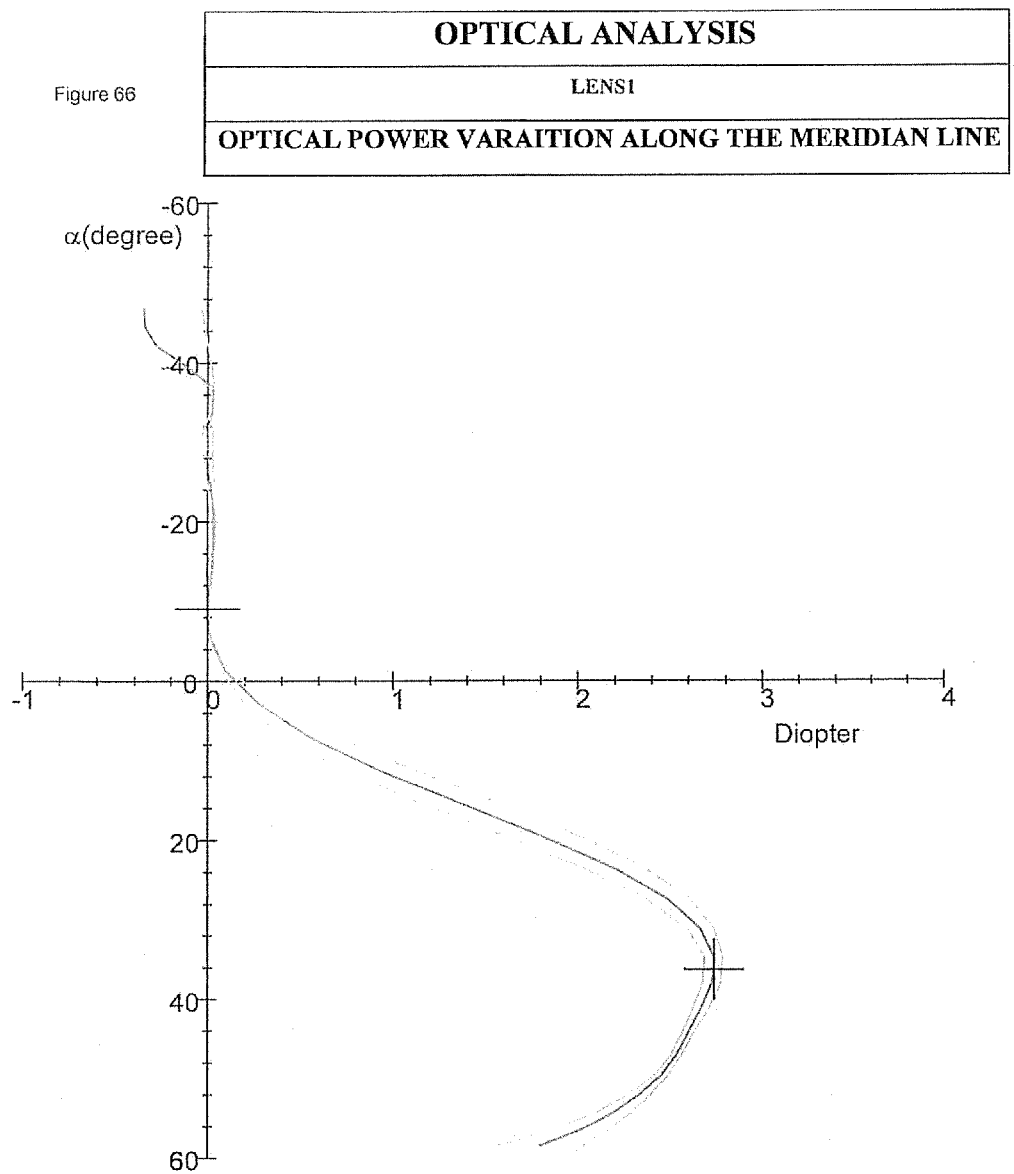
FIGS. 66 to 68 give optical analysis of the performances of the lens according to the first comparative example when positioning defect occurs.
Figure 67:
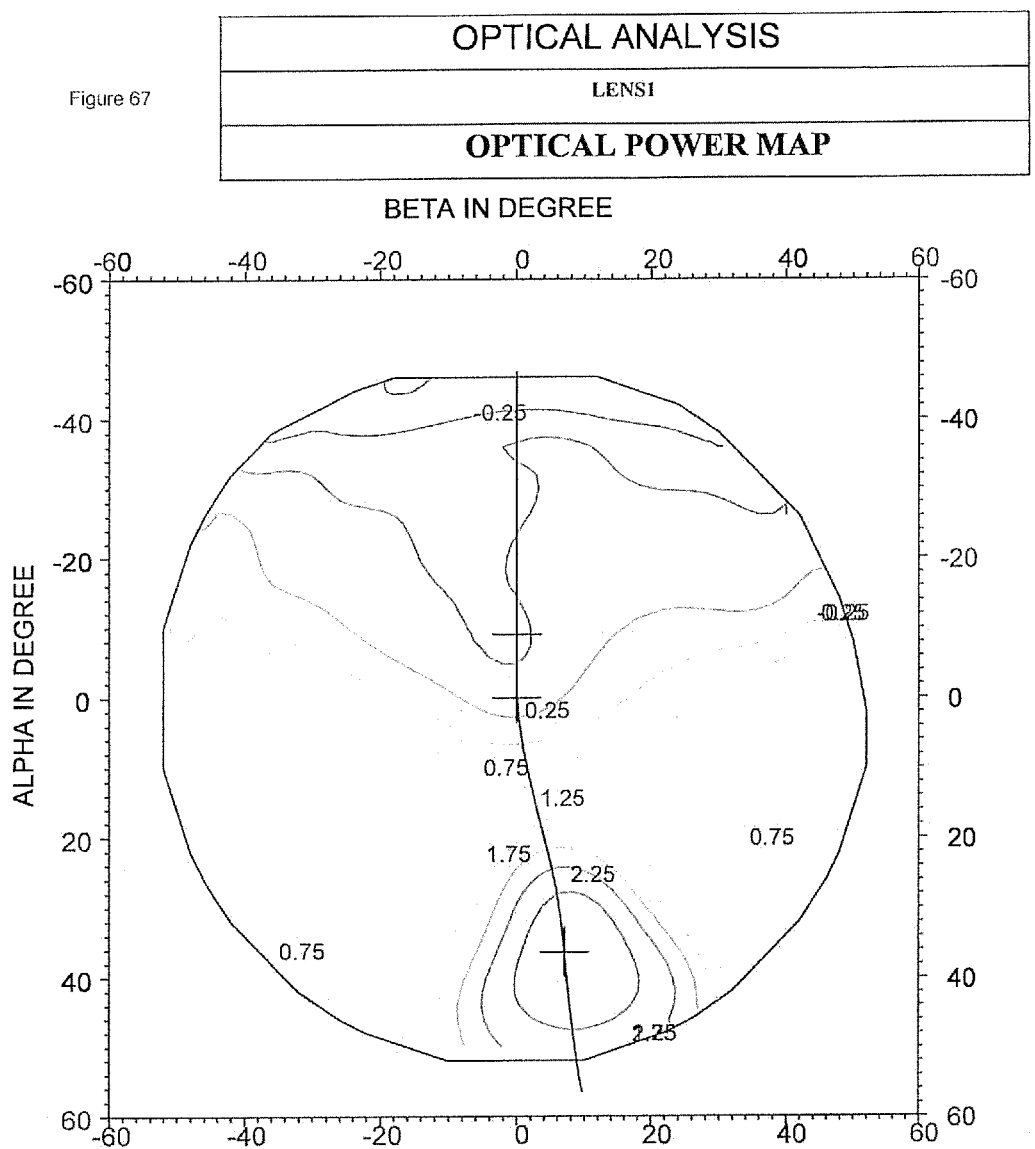
Figure 68:
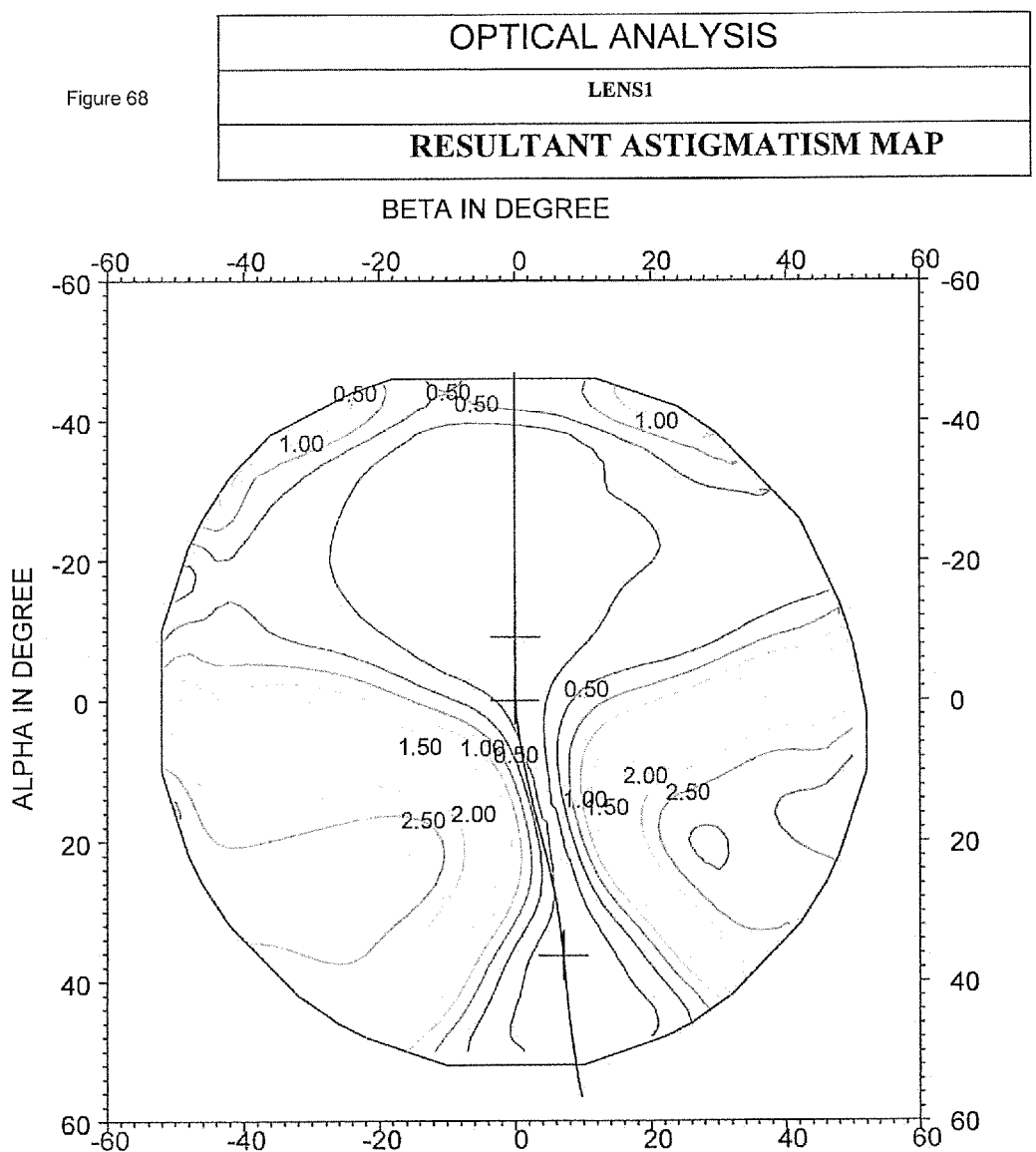
Figure 69:
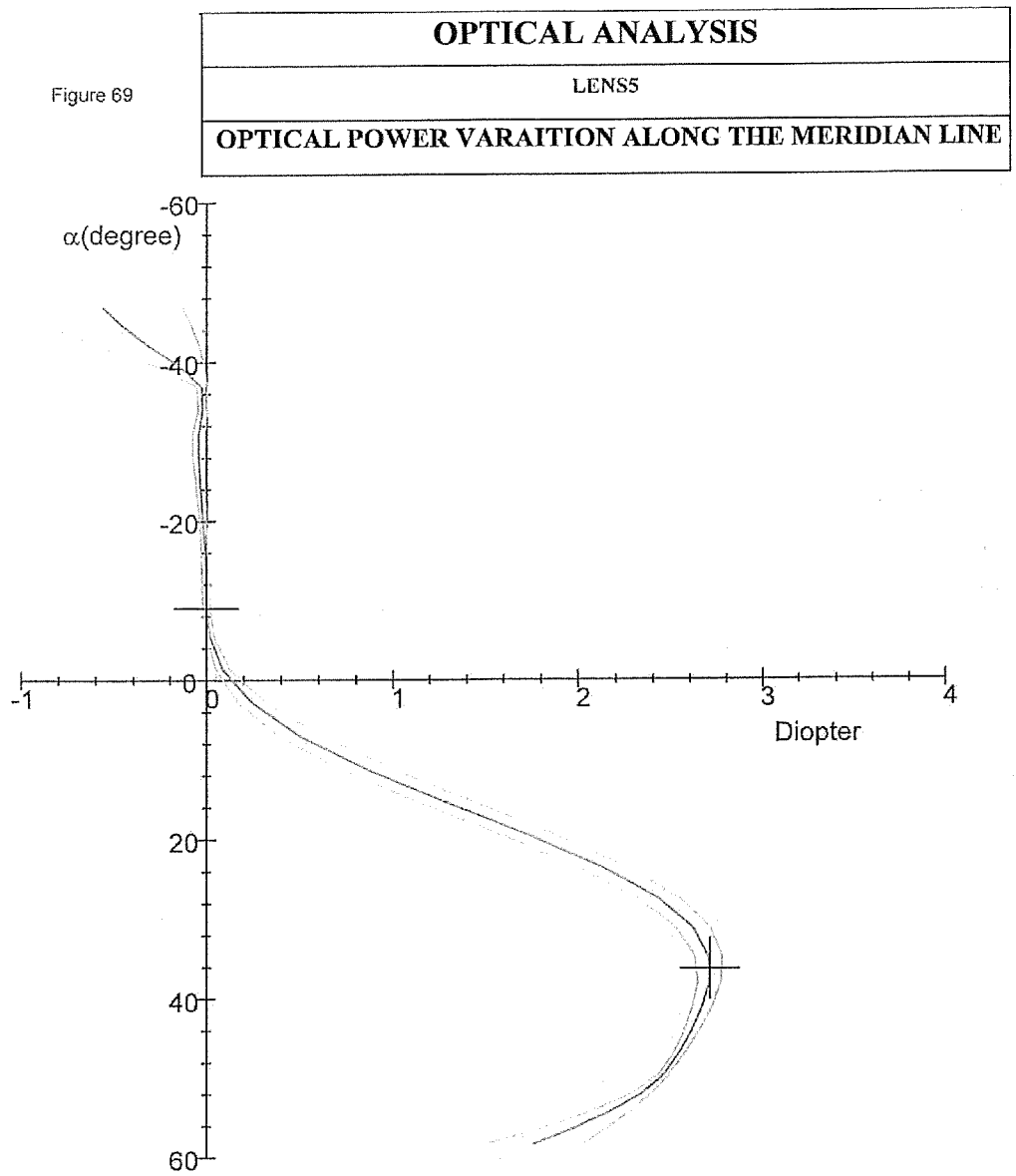
FIGS. 69 to 71 give optical analysis of the performances of the lens according to the third embodiment of the invention when positioning defect occurs.
Figure 70:
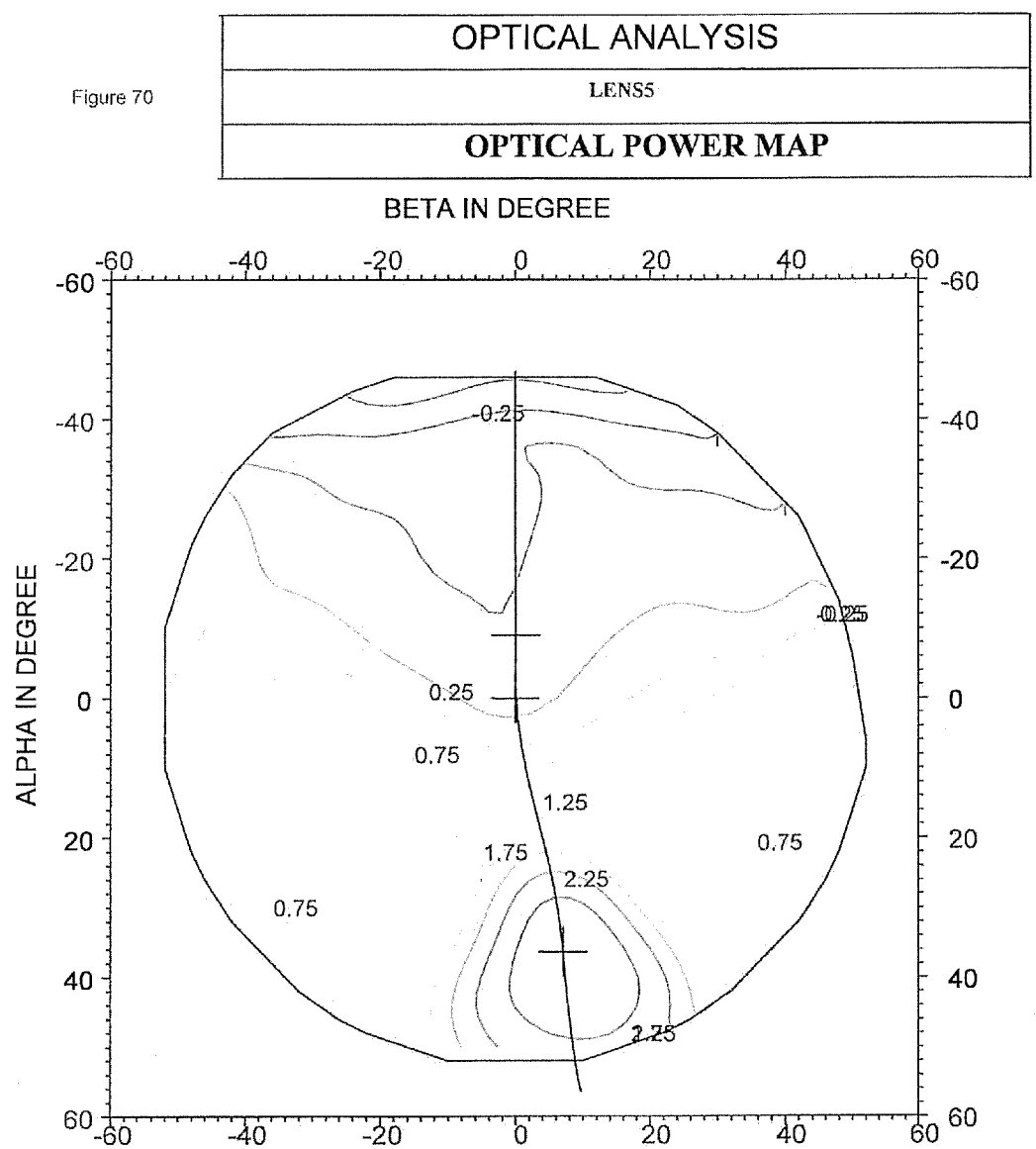
Figure 71:
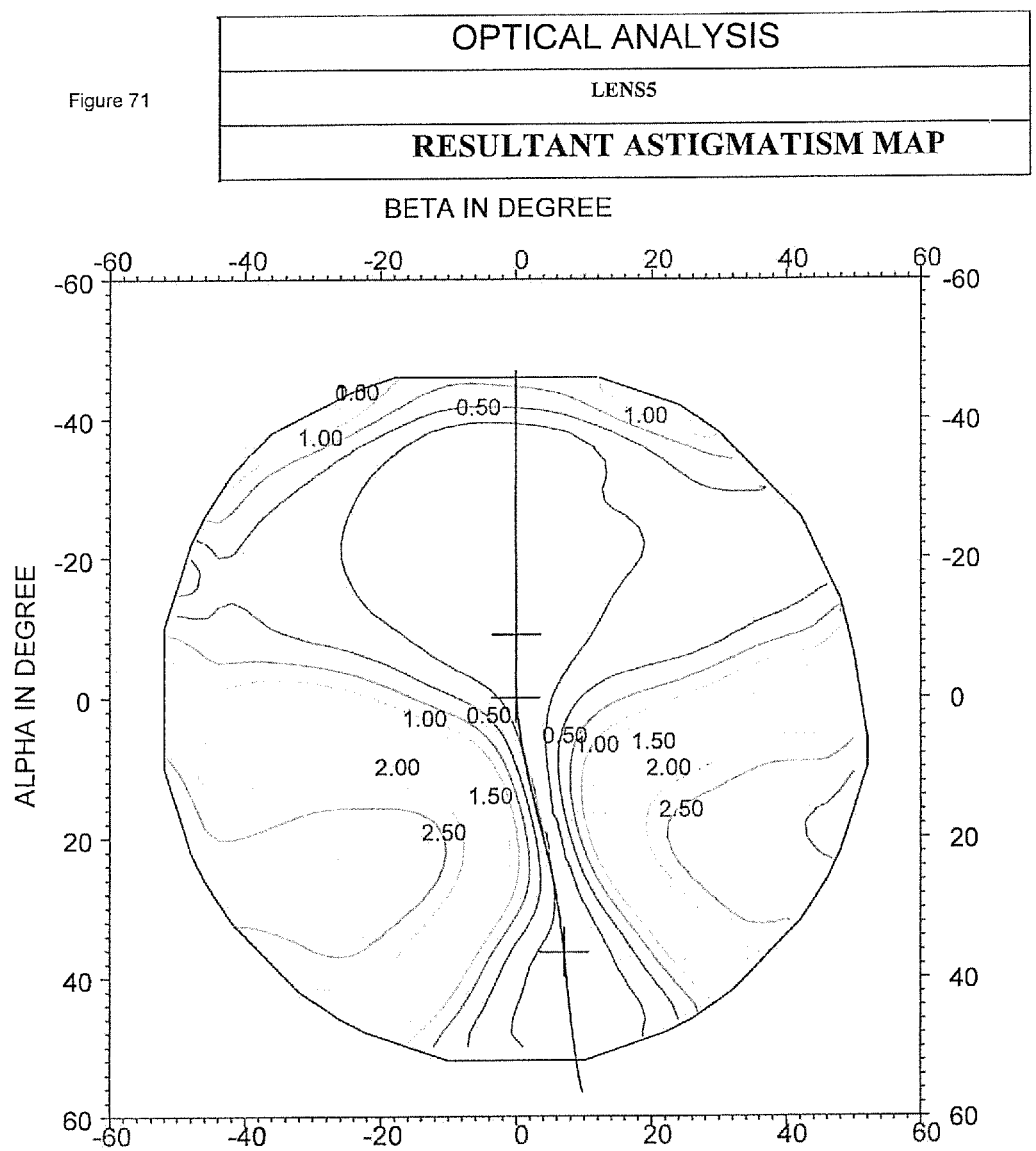
Figure 72:
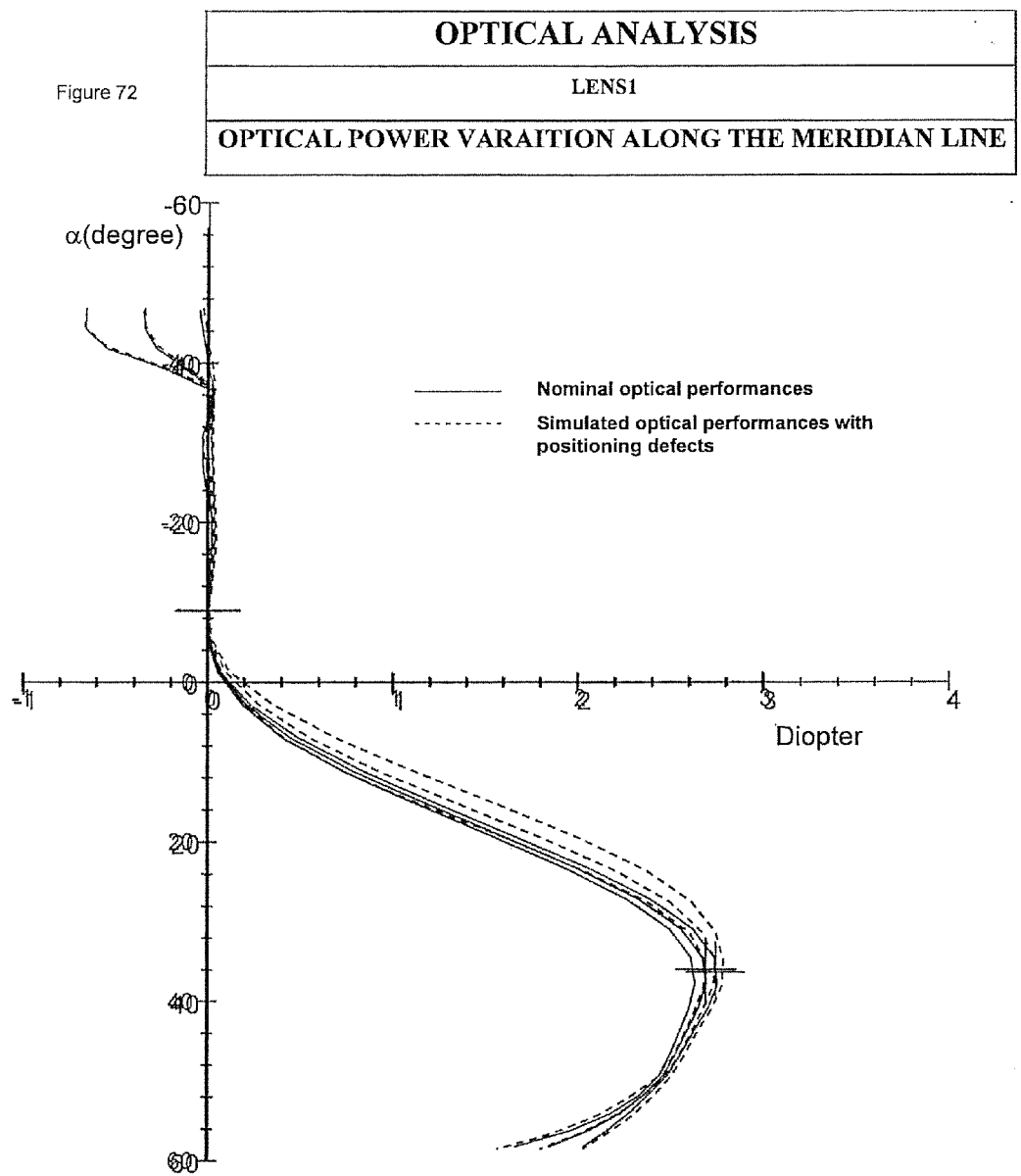
FIGS. 72 to 77 compare the optical analysis of the nominal performances and the optical analysis of the performances when positioning defects occurs.
Figure 73:
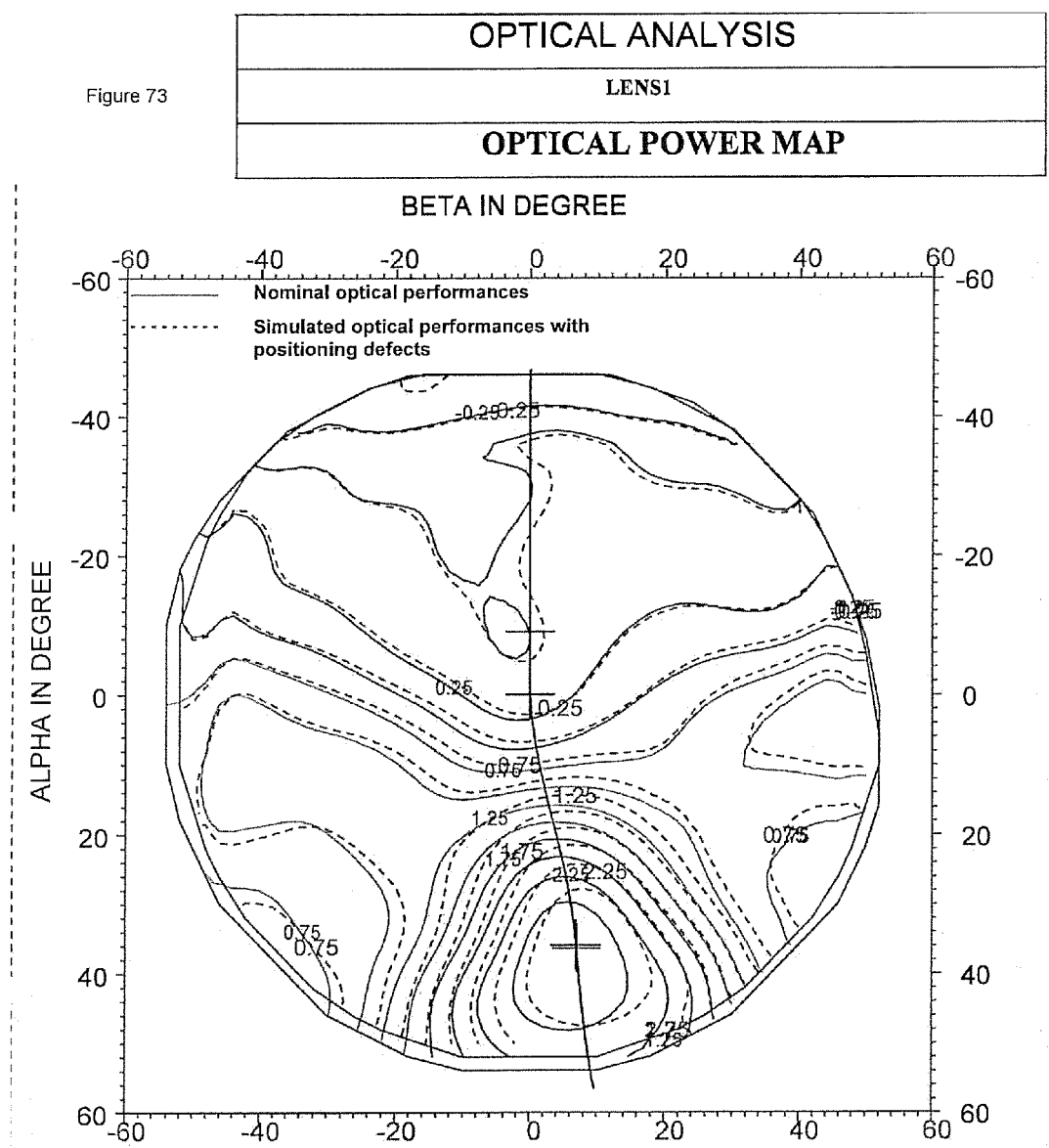
Figure 74:
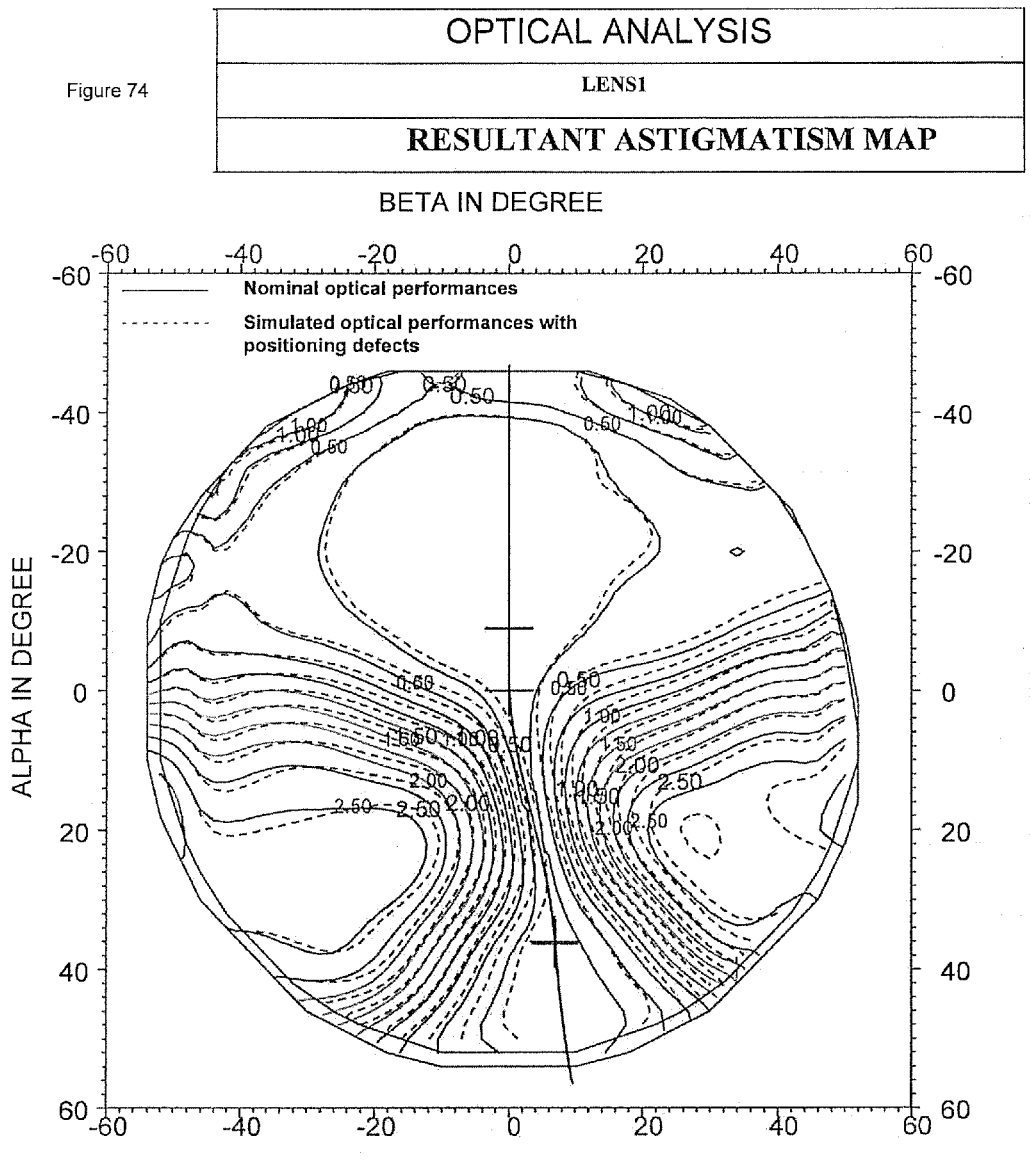
Figure 75:
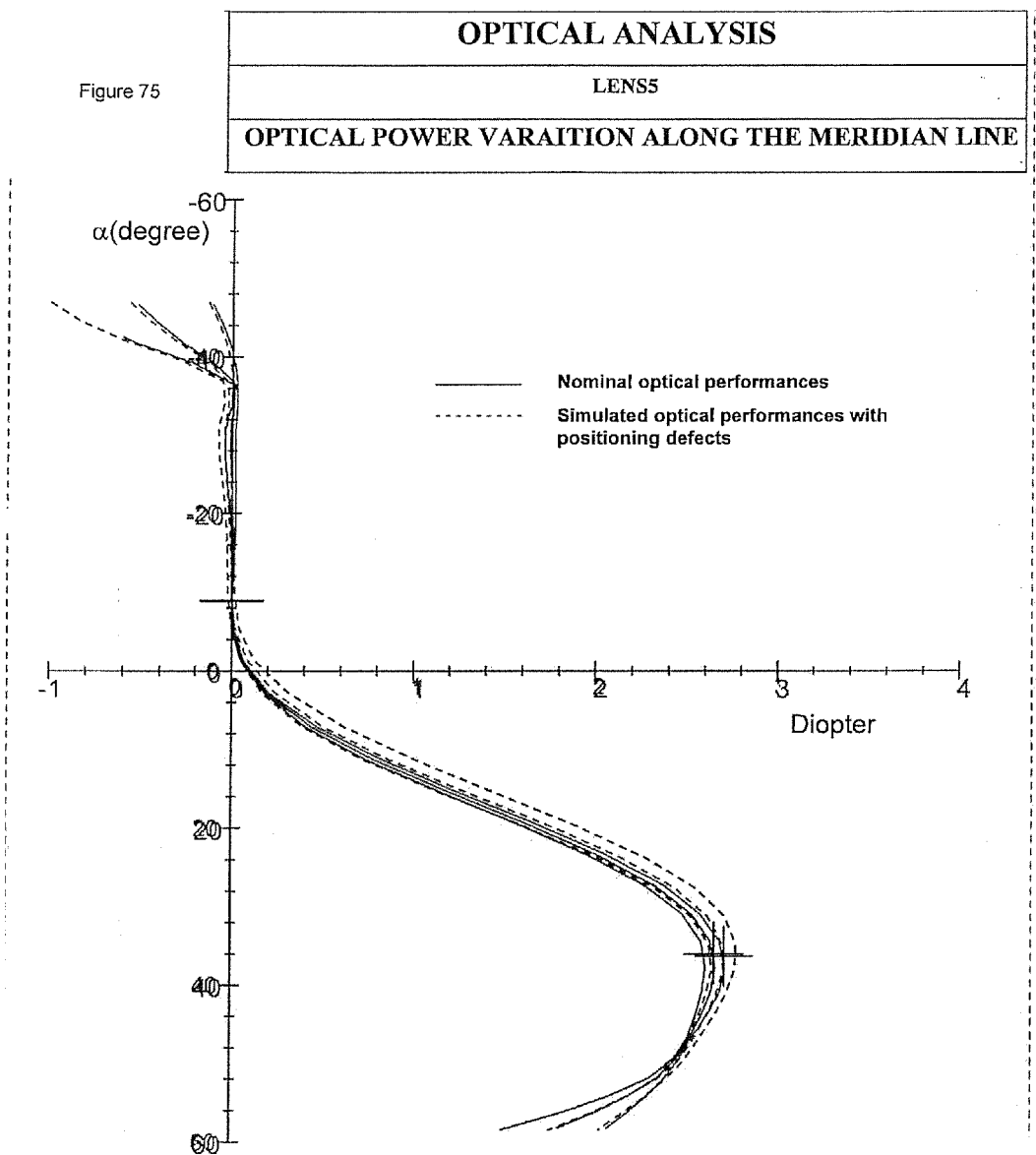
Figure 76:
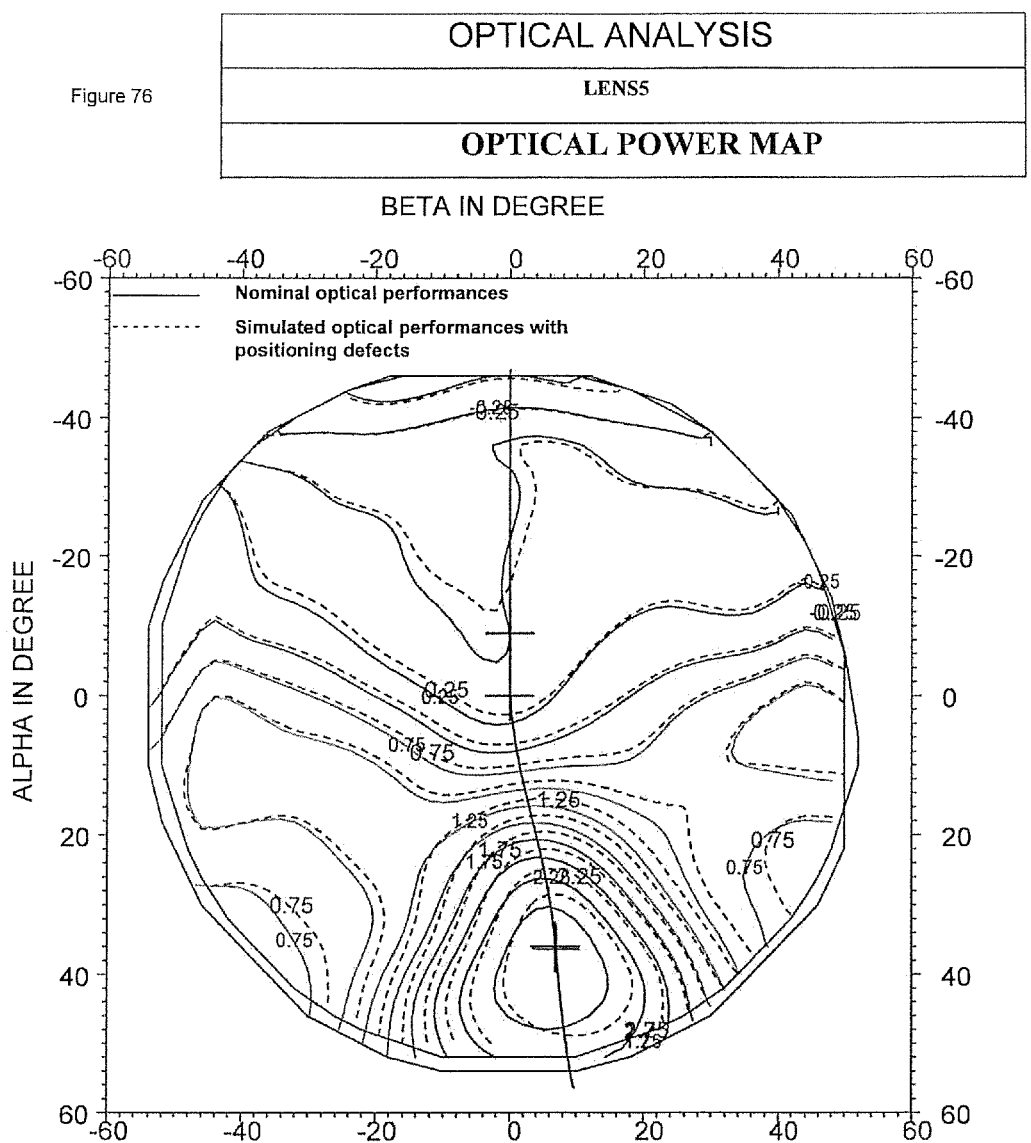
Figure 77:
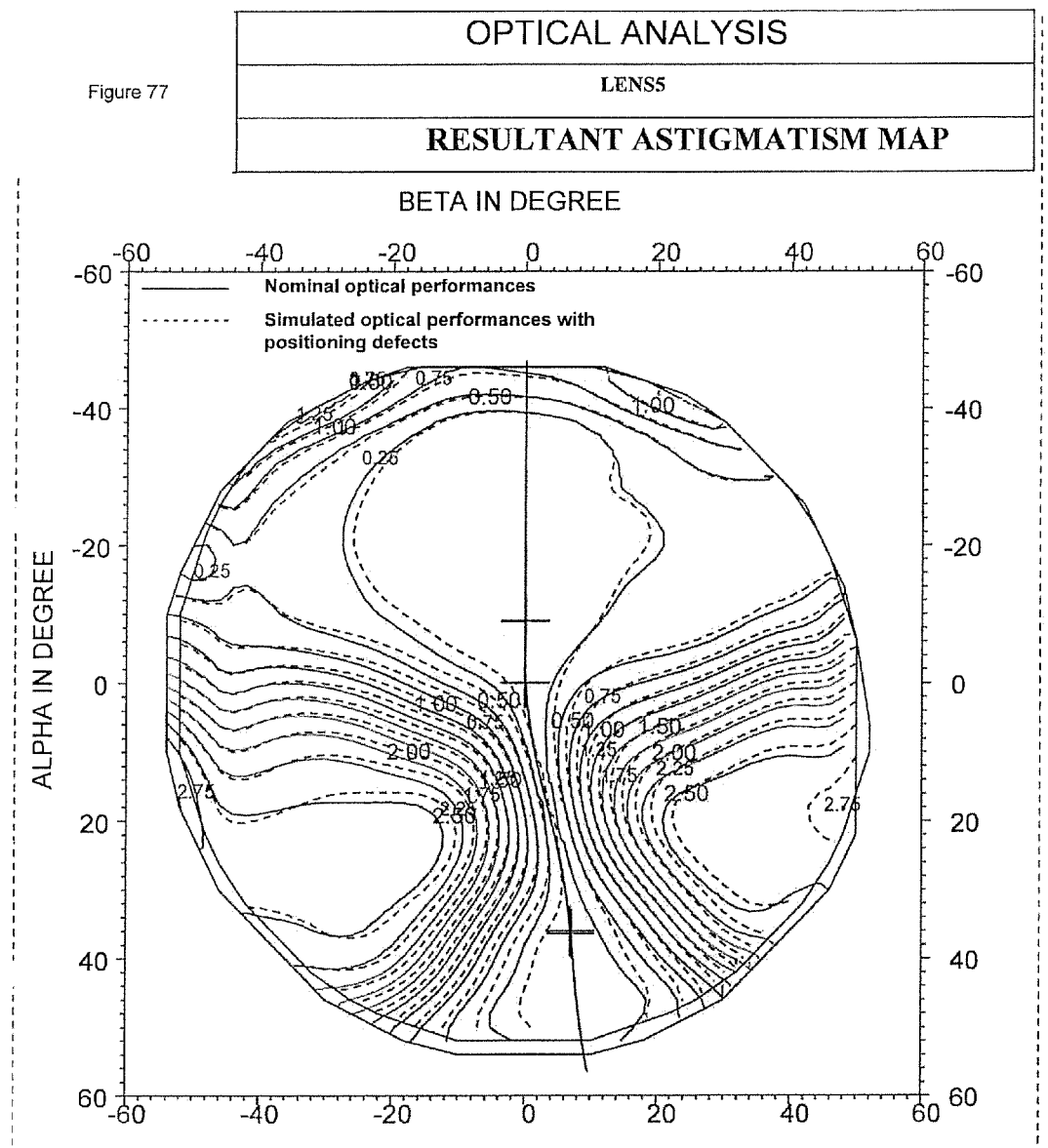
Figure 78:
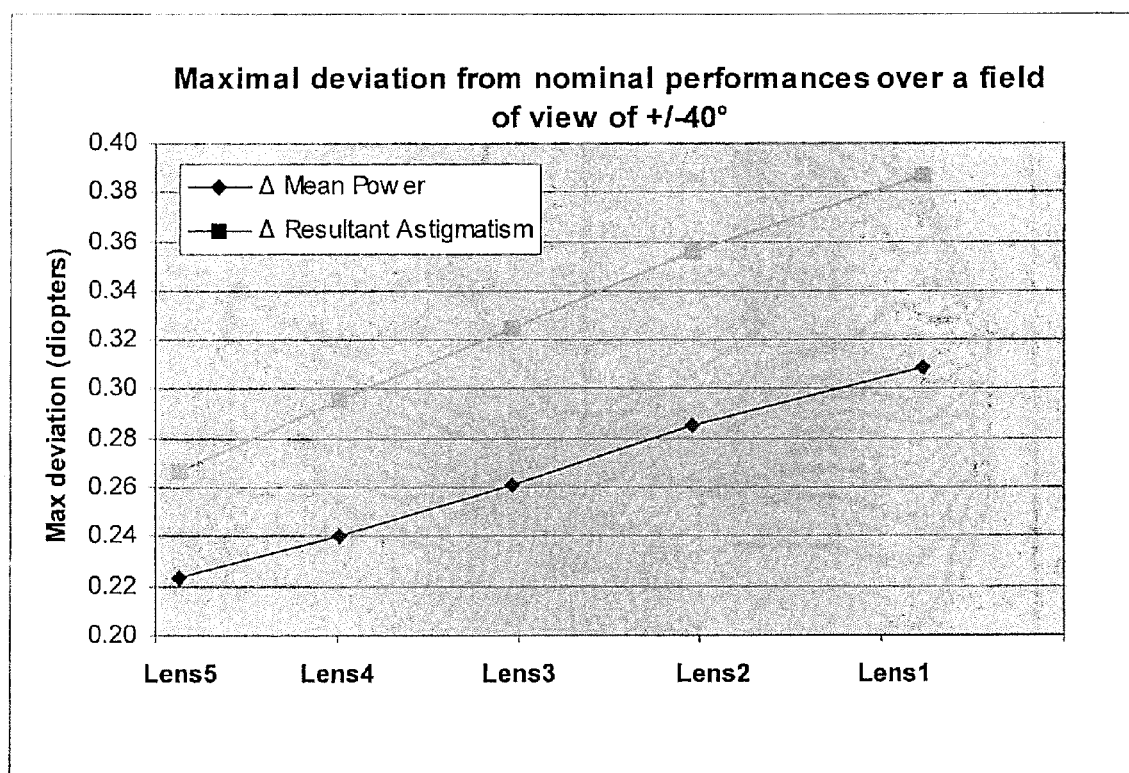
FIG. 78 is a graph showing the maximal deviation from nominal performances for each lens considered.

FIGS. 66 to 68 are optical performances of Lens 1 with simulated positioning defects of $T_X$=+0.2 mm, $T_Y$=+0.2 mm and $R_Z$=+0.5° for the front surface and of $T_X$=−0.2 mm, $T_Y$=−0.2 mm and $R_Z$=−0.5° for the rear surface. FIGS. 69 to 71 are optical performances of Lens 5 with same simulated positioning defects. FIGS. 72 to 74 are superposition of the nominal optical performances and the simulated optical performances with positioning defects for Lens 1, i.e. superposition of FIGS. 26 to 28 and FIGS. 66 to 68. FIGS. 75 to 77 are superposition of the nominal optical performances and the simulated optical performances with positioning defects for Lens 5, i.e. superposition of FIGS. 38 to 40 and FIGS. 69 to 71. FIG. 78 is a graph showing the maximal deviation between nominal performances and simulated optical performances with positioning defects for each lens considered. The impact of positioning defects was evaluated over a central portion of the lens, and notably for directions of view −40°≤α≤40° and −40<β<40°. To provide the graph of FIG. 78, the deviation between nominal power/resultant astigmatism and simulated power/resultant astigmatism was calculated for each direction of view in the central portion defined above for each lens; then the maximum deviation was evaluated from among the deviation values for all directions of view in the central portion of the lens. It is immediately apparent that lenses having a front regressive surface according to the invention have lesser deviation from nominal performances that lenses having front regressive surface according to comparative examples even though same positioning defects have been simulated. Thus, lenses manufactured from a lens blank according to the invention will have enhanced optical quality once manufactured.

The maximum values set for sphere gradients, cylinder gradients and fourth derivative when defining the regressive front surface of the lens ensure that the rear surface can be manufactured without creating to much defects—during grinding and polishing as explained above—but also ensure that small positioning defects only slightly impact the optical performances of the manufactured lens—acuity of the wearer is not truly affected.

Several studies have been made to analyze visual acuity of a wearer with respect to power and resultant astigmatism defects; notably publication "Influence of combined power error and astigmatism on visual acuity" in Ophthalmic and Visual Optics Technical Digest, (Optical Society of America, Washington, D.C., 1995), Vol. 1, p 151-154) [Catherine FAUQUIER, Thierry BONNIN, Christian MIEGE, Eric ROLAND] Essilor International. It is considered that a deviation of mean power of 0.31 diopters combined with a deviation of resultant astigmatism of 0.39 diopters (Lens 1) from the nominal performances leads to an acuity reduction of more than 33% which will be substantially perceived by most wearers, whereas a deviation of mean power of 0.22 diopters combined with a deviation of resultant astigmatism of 0.27 diopters (Lens5) from the nominal performances leads to an acuity reduction of less than 25% which might be slightly perceived by some wearers.

Table III below summarizes the maximum deviation values of mean power ΔP and resultant astigmatism ΔA of the lenses considered and gives the resulting acuity reduction according to a relation given in the publication by Fauquier et al. cited above.

TABLE III

| | ΔP (diopters) | ΔA (diopters) | AC (%) |
|---|---|---|---|
| Lens 1 | 0.31 | 0.39 | 33.6 |
| Lens 2 | 0.29 | 0.36 | 31.4 |
| Lens 3 | 0.26 | 0.32 | 28.3 |
| Lens 4 | 0.24 | 0.3 | 26.5 |
| Lens 5 | 0.22 | 0.27 | 24.2 |

Applicant regards an acuity reduction AC (%) of 30% as being discriminative.

The normalized limit value of $5.0 \cdot 10^{-5}$ mm$^{-2}$·diopter$^{-1}$ for the fourth derivative $D_4$ and/or the limit values of $7.5 \cdot 10^{-1}$ mm$^{-1}$/1.45 mm$^{-1}$ for the sphere/cylinder gradients over at least a central portion of the front regressive surface provide that the lens can be easily manufactured while fulfilling the nominal optical performances.

The semi-finished lens blank of the invention may be manufactured by digital surfacing or moulding. The first surface of the semi-finished lens blank is determined by setting a regression of the mean sphere value between the far vision zone 26 and the near visions zone 28, and a fourth derivative with respect to altitude $D_4$ value less than $5.0 \cdot 10^5$ mm$^{-2}$·diopter$^{-1}$ at any point in a central portion. Other criteria as defined above, notably limit values of sphere gradients and cylinder gradients, may also be used when determining the first surface of the semi-finished lens blank.

Data relative to the determined first surface will be used to control machining of a mould or to control a digital surfacing machine to produce the first surface of the semi-finished lens blank.

A progressive lens can be manufactured using a semi-finished lens blank according to the invention.

Figure 83:
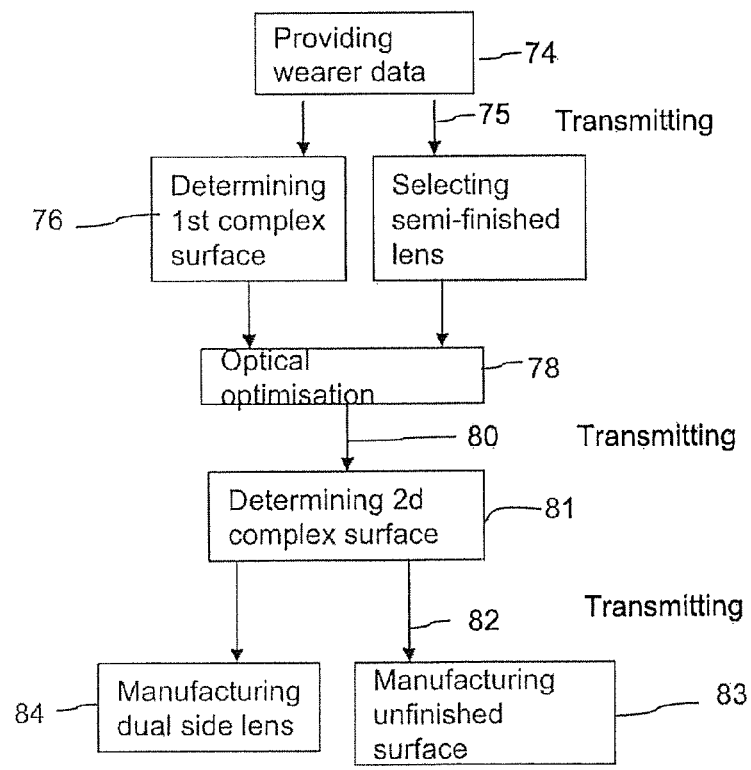
FIG. 83 is a flowchart of the steps of a method of manufacturing a lens according to the invention.

FIG. 83 is a flowchart of an example of the steps that can be carried out for manufacturing a progressive ophthalmic lens according to the invention.

Data relative to a wearer are provided (step 74). This can be done at a first location, i.e. a spectacle seller (optician). The data are transmitted (step 75) from the first location to a second location where a semi-finished lens blank is selected (step 77) and where an optical optimization of the lens based on the data relative to the wearer and on data relative to the first regressive surface of the semi-finished lens blank is carried out (step 78). This can be done in a laboratory of a lens designer. The semi-finished lens blank can be selected based on the wearer data, for instance the prescribed addition. The result of the optical optimization are transmitted (step 80) and a second surface of the lens is determined (step 81) according to the result of the optical optimization. This can be done in the same laboratory, or in a different laboratory. The data relative to the second surface are transmitted (step 82) to a lens manufacturer. Using the selected lens blank, the lens manufacturer surfaces the unfinished surface of the blank according to the determined second surface (step 83). The unfinished surface of the blank can be made by digital surfacing or molding.

The progressive lens of the invention can also be manufactured without using a semi-finished lens blank.

Data relative to a wearer are provided (step 74). The data are transmitted (step 75) from the first location to a second location where a first surface is determined (step 76). This can be done in a laboratory of a lens designer. The first surface is determined using the criteria defined previously, and notably, a regression of the mean sphere value between at least a portion of the far vision zone 26 and at least a portion of the near visions zone 28, a sphere gradient value less than $7.50 \cdot 10^{-1}$ mm$^{-1}$ at any point in a central portion of the lens, a cylinder gradient value less than 1.45 mm$^{-1}$ at any point in the central portion of the lens and a fourth derivative with respect to altitude ($D_4$) value less than $5 \cdot 10^{-5}$ mm$^{-2}$·diopter$^{-1}$ at any point in the central portion of the lens.

The data relative to the first surface are transmitted and an optical optimization of the lens based on the data relative to the wearer and on data relative to the first surface is carried out (step 78). This can be done in the same laboratory as the determination of the first surface, or in a different laboratory. The results of the optical optimization are transmitted (step 80) and a second surface of the lens is determined (step 81) according to the result of the optical optimization. This can still be done in the same laboratory, or in a different laboratory. The data relative to the first and second surface are transmitted (step 82) to a lens manufacturer and the lens is produced by double side digital surfacing (step 84) or by molding.

These methods can be implemented on a computer. Computer program products can be provided comprising one or more stored sequence of instruction that is accessible to a processor and which, when executed by the processor, causes the processor to carry out the steps of the methods are also proposed.

Such computer programs may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. A computer-readable medium carrying one or more sequences of instructions of the computer program product is thus proposed. This enables to carry out the method in any location.

A set of apparatuses for manufacturing a progressive ophthalmic lens, wherein the apparatuses are adapted to carry out the method for manufacturing is also proposed.

The invention claimed is:

1. A progressive ophthalmic lens comprising:
a front surface and a rear surface, each surface having in each point an altitude, a mean sphere value, and a cylinder value,
the front surface of the lens comprising:
a far vision zone having a far vision reference point,
a near vision zone having a near vision reference point, and
a main meridian,
wherein the front surface is a regressive surface which is a continuous aspheric surface having a zone of decreasing mean sphere value connecting the far vision zone and the near vision zone and has:
a sphere gradient normalized value of less than $7.50 \cdot 10^{-1}$ mm$^{-1}$ at any point in a central portion of the lens including a portion of the main meridian, the far vision reference point, and the near vision reference point, and
a cylinder gradient normalized value of less than 1.45 mm$^{-1}$ at any point in the central portion of the lens.

2. The progressive ophthalmic lens according to claim 1, wherein at least one surface comprises two micro-markings and a central point located at the center of a segment linking the two micro-markings, and
wherein the central portion of the lens is a circle of 40 mm diameter centered on the central point.

3. A semi-finished spectacle lens blank comprising:
a first regressive surface which is a continuous aspheric surface having a zone of decreasing mean sphere value connecting the far vision zone and the near vision zone, and a second unfinished surface,
the first regressive surface having in each point an altitude, a mean sphere value, and a cylinder value,
the first regressive surface comprising:
a far vision zone having a far vision reference point,
a near vision zone having a near vision reference point, and
a main meridian,
wherein the first regressive surface has a fourth derivative with respect to altitude normalized value of less than $5.0 \cdot 10^{-5}$ mm$^{-2}$·diopter$^{-1}$ at any point in at least a central portion of the blank including a portion of the main meridian, the far vision reference point, and the near vision reference point, and
wherein the first regressive surface has:
a sphere gradient normalized value of less than $7.50 \cdot 10^{-1}$ mm$^{-1}$ at any point in the central portion, and
a cylinder gradient normalized value of less than 1.45 mm$^{-1}$ at any point in the central portion.

4. The semi-finished spectacle lens blank of claim 3, further comprising markings defining a position of a central point of the blank,
wherein the central portion of the blank is a circle of 40 mm diameter centered on the central point.

5. A method for manufacturing a progressive ophthalmic lens, comprising:
providing data relative to a wearer;
selecting a semi-finished lens blank according to claim 4;
carrying out an optical optimization of the lens based on the data relative to the wearer and on data relative to the first regressive surface of the blank; and
providing the selected semi-finished lens blank and surfacing or molding the unfinished surface of the blank according to the result of the optical optimization.

6. A method for manufacturing a progressive ophthalmic lens, the method comprising:
providing data relative to a wearer;
selecting a semi-finished lens blank according to claim 3;
carrying out an optical optimization of the lens based on the data relative to the wearer and on data relative to the first regressive surface of the blank; and
providing the selected semi-finished lens blank and surfacing or molding the unfinished surface of the blank according to the result of the optical optimization.

7. A set of apparatuses for manufacturing a progressive ophthalmic lens and/or a semi-finished lens blank, wherein the apparatuses are configured to execute the method according to claim 6.

8. A computer program product comprising one or more stored sequence of instruction that is accessible to a processor and which, when executed by the processor, causes the processor to execute the method of claim 6.

9. A semi-finished spectacle lens blank comprising:
a first regressive surface which is a continuous aspheric surface having a zone of decreasing mean sphere value connecting the far vision zone and the near vision zone, and a second unfinished surface,
the first regressive surface having in each point an altitude, a mean sphere value, and a cylinder value,
the first regressive surface comprising:
a far vision zone having a far vision reference point,
a near vision zone having a near vision reference point, and
a main meridian,
wherein the first regressive surface has:
a sphere gradient normalized value of less than $7.50 \cdot 10^{-1}$ mm$^{-1}$ at any point in a central portion of the blank including a portion of the main meridian, the far vision reference point, and the near vision reference point, and
a cylinder gradient normalized value of less than 1.45 mm$^{-1}$ at any point in the central portion.

10. The semi-finished spectacle lens blank of claim 9, further comprising markings defining a position of a central point of the blank,
wherein the central portion of the blank is a circle of 40 mm diameter centered on the central point.

11. A method for manufacturing a progressive ophthalmic lens, the method comprising:
providing data relative to a wearer;
selecting a semi-finished lens blank according to claim 9;
carrying out an optical optimization of the lens based on the data relative to the wearer and on data relative to the first regressive surface of the blank; and
providing the selected semi-finished lens blank and surfacing or molding the unfinished surface of the blank according to the result of the optical optimization.

12. A method for manufacturing semi-finished lens blank, the method comprising:
defining a first surface and a second unfinished surface, the first surface having in each point an altitude, a mean sphere value, and a cylinder value;
defining a far vision zone having a far vision reference point, a near vision zone having a near vision reference point, a main meridian, and a central portion of the first surface including a portion of the main meridian, the far vision reference point, and the near vision reference point;
determining the first surface being a first regressive surface which is a continuous aspheric surface having a zone of decreasing mean sphere value connecting the far vision zone and the near vision zone and having:
a regression of the mean sphere value between at least a portion of the far vision zone and at least a portion of the near visions zone,
a sphere gradient normalized value of less than $7.50 \cdot 10^{-1}$ mm$^{-1}$ at any point in the central portion, and
a cylinder gradient normalized value of less than 1.45 mm$^{-1}$ at any point in the central portion; and
surfacing or molding the first surface.

13. A set of apparatuses for manufacturing a progressive ophthalmic lens and/or a semi-finished lens blank, wherein the apparatuses are configured to execute the method according to claim 12.

14. A computer program product comprising one or more stored sequence, of instruction that is accessible to a processor and which, when executed by the processor, causes the processor to execute the method of claim 12.

15. A non-transitory computer readable medium carrying out one or more sequences of instructions of the computer program product of claim 14.

16. A method for manufacturing a progressive ophthalmic lens, comprising:
providing data relative to a wearer;
defining far vision zone having a far vision reference point, a near vision zone having a near vision reference point, and a main meridian;
defining a first surface of the lens being a first regressive surface which is a continuous aspheric surface having a zone of decreasing mean sphere value connecting the far vision zone and the near vision zone and having:
a regression of the mean sphere value between at least a portion of the far vision zone and at least a portion of the near visions zone,
a sphere gradient normalized value of less than $7.50 \cdot 10^{-1}$ mm$^{-1}$ at any point in a central portion of the lens including a portion of the main meridian, the far vision reference point and the near vision reference point, and
a cylinder gradient normalized value of less than 1.45 mm$^{-1}$ at any point in the central portion of the lens;
carrying out an optical optimization of the lens based on the data relative to the wearer and on data relative to the first surface of the lens;
determining a second surface of the lens according to the result of the optical optimization; and
surfacing or molding the first and second surfaces.

17. A set of apparatuses for manufacturing a progressive ophthalmic lens and/or a semi-finished lens blank, wherein the apparatuses are configured to execute the method according to claim 16.

18. A computer program product comprising one or more stored sequence of instruction that is accessible to a processor and which, when executed by the processor, causes the processor to execute the method of claim 16.

* * * * *